(12) United States Patent
Ueki et al.

(10) Patent No.: US 8,654,050 B2
(45) Date of Patent: Feb. 18, 2014

(54) MULTIPLE-PRIMARY-COLOR LIQUID CRYSTAL DISPLAY DEVICE

(75) Inventors: Shun Ueki, Osaka (JP); Kohzoh Nakamura, Osaka (JP); Akiko Miyazaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 646 days.

(21) Appl. No.: 12/676,421

(22) PCT Filed: Sep. 11, 2008

(86) PCT No.: PCT/JP2008/002517
§ 371 (c)(1),
(2), (4) Date: Mar. 4, 2010

(87) PCT Pub. No.: WO2009/034714
PCT Pub. Date: Mar. 19, 2009

(65) Prior Publication Data
US 2010/0207969 A1 Aug. 19, 2010

(30) Foreign Application Priority Data
Sep. 13, 2007 (JP) ................................. 2007-238126

(51) Int. Cl.
*G09G 3/36* (2006.01)
(52) U.S. Cl.
USPC ............... 345/88; 345/694; 345/89; 345/690; 345/695; 345/614
(58) Field of Classification Search
USPC ......... 345/77, 89, 204, 600, 614, 690, 83, 88, 345/694, 695; 358/455–458
See application file for complete search history.

(56) References Cited

U.S. PATENT DOCUMENTS 4,800,375 A    1/1989   Silverstein et al.
(Continued)

FOREIGN PATENT DOCUMENTS

| | | |
|---|---|---|
| JP | 09-251160 A | 9/1997 |
| JP | 2001-209047 A | 8/2001 |
| JP | 2001-306023 A | 11/2001 |
| WO | 2004/068460 A1 | 8/2004 |

OTHER PUBLICATIONS

English translation of Official Communication issued in corresponding International Application PCT/JP2008/002517, mailed on Apr. 15, 2010.

(Continued)

*Primary Examiner* — Lun-Yi Lao
*Assistant Examiner* — Shaheda Abdin
(74) *Attorney, Agent, or Firm* — Keating & Bennett, LLP

(57) ABSTRACT

A multi-primary-color liquid crystal display device according to the present invention is adapted to conduct a display operation in at least four primary colors. The device has a plurality of pixels that form at least two different types of subsets. The device can perform rendering processing in which at least one of the pixels that form a first one of the at least two different types of subsets lends a luminance to a second type of subset. Each pixel includes a first sub-pixel and a second sub-pixel that could have mutually different luminance. The second type of subset borrows a luminance from one of the first and second sub-pixels of the at least one pixel that has the higher luminance.

17 Claims, 49 Drawing Sheets

(56) References Cited

U.S. PATENT DOCUMENTS

| | | | |
|---|---|---|---|
| 6,097,367 A * | 8/2000 | Kuriwaki et al. | 345/589 |
| 6,570,584 B1 * | 5/2003 | Cok et al. | 345/690 |
| 6,958,791 B2 | 10/2005 | Shimoshikiryo | |
| 7,268,757 B2 | 9/2007 | Ben-David et al. | |
| 7,483,095 B2 * | 1/2009 | Roth et al. | 349/106 |
| 2004/0174389 A1 * | 9/2004 | Ben-David et al. | 345/694 |
| 2005/0122294 A1 | 6/2005 | Ben-David et al. | |
| 2005/0134785 A1 | 6/2005 | Roth et al. | |
| 2005/0225575 A1 | 10/2005 | Brown Elliott et al. | |
| 2005/0264587 A1 | 12/2005 | Kurumisawa | |
| 2006/0017675 A1 | 1/2006 | Shimoshikiryoh | |
| 2006/0164354 A1 | 7/2006 | Lee et al. | |
| 2007/0024557 A1 | 2/2007 | Rho et al. | |
| 2007/0052887 A1 * | 3/2007 | Brown Elliot et al. | 349/108 |
| 2007/0063946 A1 | 3/2007 | Nakamura et al. | |
| 2008/0024409 A1 | 1/2008 | Tomizawa et al. | |
| 2008/0036718 A1 | 2/2008 | Lee | |

OTHER PUBLICATIONS

Official Communication issued in corresponding European Patent Application No. 08830167.6, mailed on Nov. 19, 2010.

Official Communication issued in International Patent Application No. PCT/JP2008/002517, mailed on Oct. 21, 2008.

Pointer; "The Gamut of Real Surface Colours"; Color Research and Application; 1980; pp. 145-155; vol. 5; No. 3.

Yang et al.; "31.1: Development of Six Primary-Color LCD"; Society for Information Display, 2005 International Symposium Digest of Technical Papers; May 25-27, 2005; pp. 1210-1213; vol. XXXVI, Book II.

Chino et al.; "25.1: Invited Paper: Development of Wide-Color-Gamut Mobile Displays With Four-Primary-Color LCDS"; Society for Information Display, 2006 International Symposium Digest of Technical Papers; Jun. 7-9, 2006; pp. 1221-1224; vol. XXXVII, Book II.

"Improving LCD TV Color Using Multi-Primary Technology"; FPD International 2005 Forum; Oct. 19, 2005; Total of 66 pages.

\* cited by examiner

FIG.1

|    |    |   |    |    |   |    |    |   |    |    |   |
|----|----|---|----|----|---|----|----|---|----|----|---|
| R1 | Ye | B | R1 | Ye | B | R1 | Ye | B | R1 | Ye | B |
| R2 | G  | C | R2 | G  | C | R2 | G  | C | R2 | G  | C |
| R1 | Ye | B | R1 | Ye | B | R1 | Ye | B | R1 | Ye | B |
| R2 | G  | C | R2 | G  | C | R2 | G  | C | R2 | G  | C |

FIG.2

|    |    |   |    |    |   |    |    |   |    |    |   |
|----|----|---|----|----|---|----|----|---|----|----|---|
| R1 | Ye | B | R1 | Ye | B | R1 | Ye | B | R1 | Ye | B |
| R2 | G  | C | R2 | G  | C | R2 | G  | C | R2 | G  | C |
| R1 | Ye | B | R1 | Ye | B | R1 | Ye | B | R1 | Ye | B |
| R2 | G  | C | R2 | G  | C | R2 | G  | C | R2 | G  | C |

*FIG.11*
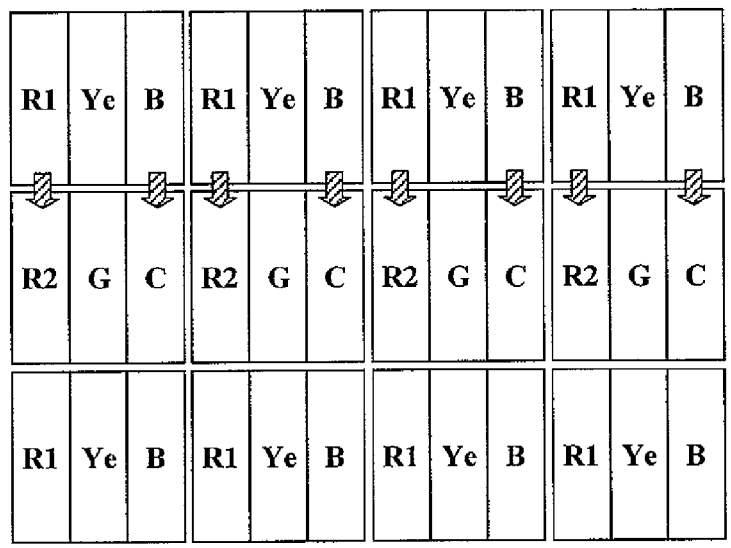
*FIG.12*
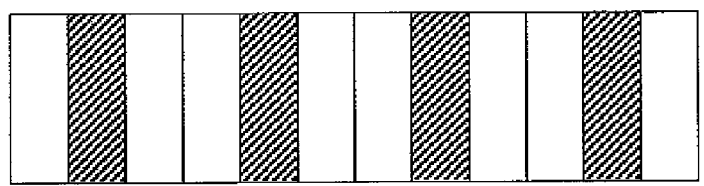
L1
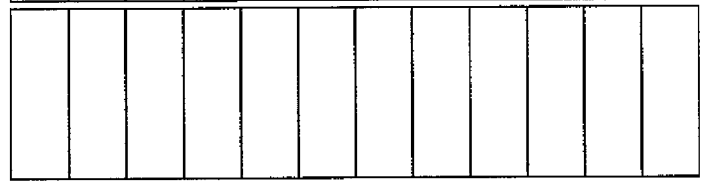
L2
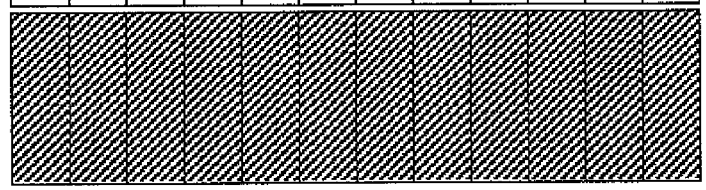
L3

LUMINANCE-BORROWING SUBSET   LUMINANCE-LENDING SUBPIXEL

FIG.38    C1    C2    C3    C4
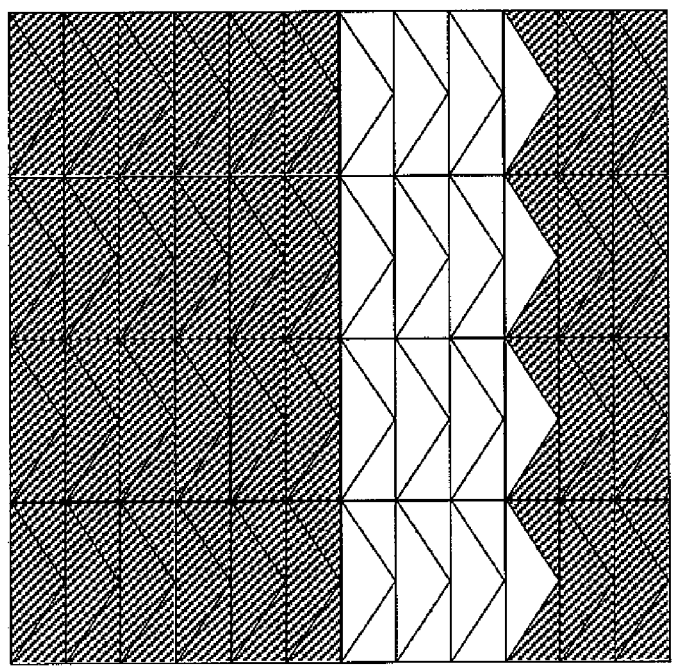
FIG.39
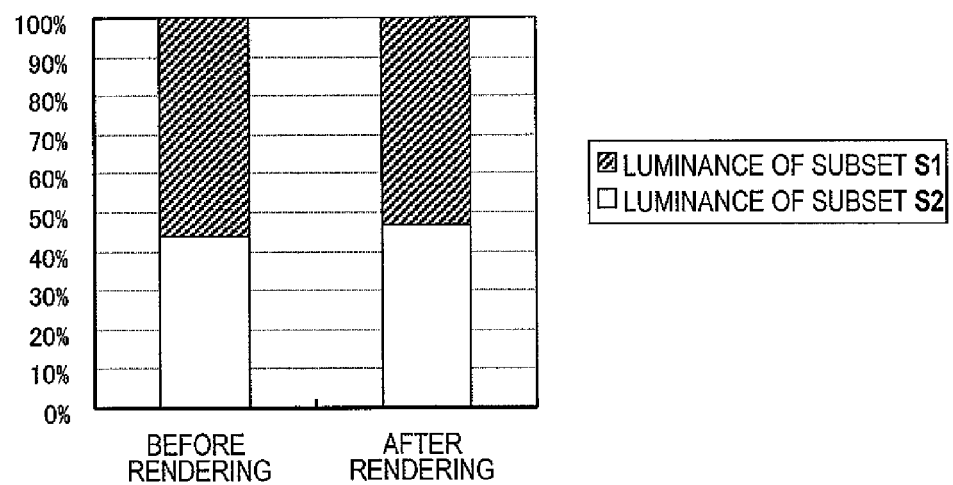

| | | | | | | | | | | | |
|---|---|---|---|---|---|---|---|---|---|---|---|
| L1 | C H | M L | Ye H | C L | M H | Ye L | C H | M L | Ye H | C L | M H | Ye L |
| | L | H | L | H | L | H | L | H | L | H | L | H |
| L2 | R H | G L | B H | R L | G H | B L | R H | G L | B H | R L | G H | B L |
| | L | H | L | H | L | H | L | H | L | H | L | H |
| L3 | C H | M L | Ye H | C L | M H | Ye L | C H | M L | Ye H | C L | M H | Ye L |
| | L | H | L | H | L | H | L | H | L | H | L | H |

300

☐ : SUBSET S1 BEFORE RENDERING
▨ : SUBSET S2 BEFORE RENDERING
○ : SUBSET S1 AFTER RENDERING
◉ : SUBSET S2 AFTER RENDERING
▲ : D65 STANDARD LIGHT SOURCE

□ : SUBSET S1 BEFORE RENDERING
▨ : SUBSET S2 BEFORE RENDERING
○ : SUBSET S1 AFTER RENDERING
◉ : SUBSET S2 AFTER RENDERING
▲ : D65 STANDARD LIGHT SOURCE

| R2 | G | C | R1 | Ye | B | R2 | G | C | R1 | Ye | B |
|---|---|---|---|---|---|---|---|---|---|---|---|
| H | L | H | L | H | L | H | L | H | L | H | L |
| L | H | L | H | L | H | L | H | L | H | L | H |

| R2 | G | C | R1 | Ye | B | R2 | G | C | R1 | Ye | B |
|---|---|---|---|---|---|---|---|---|---|---|---|
| H | H | L | L | H | H | L | L | H | H | L | L |
| L | L | H | H | L | L | H | H | L | L | H | H |

+ + − − + + − − + + − −

FIG. 87
(a)
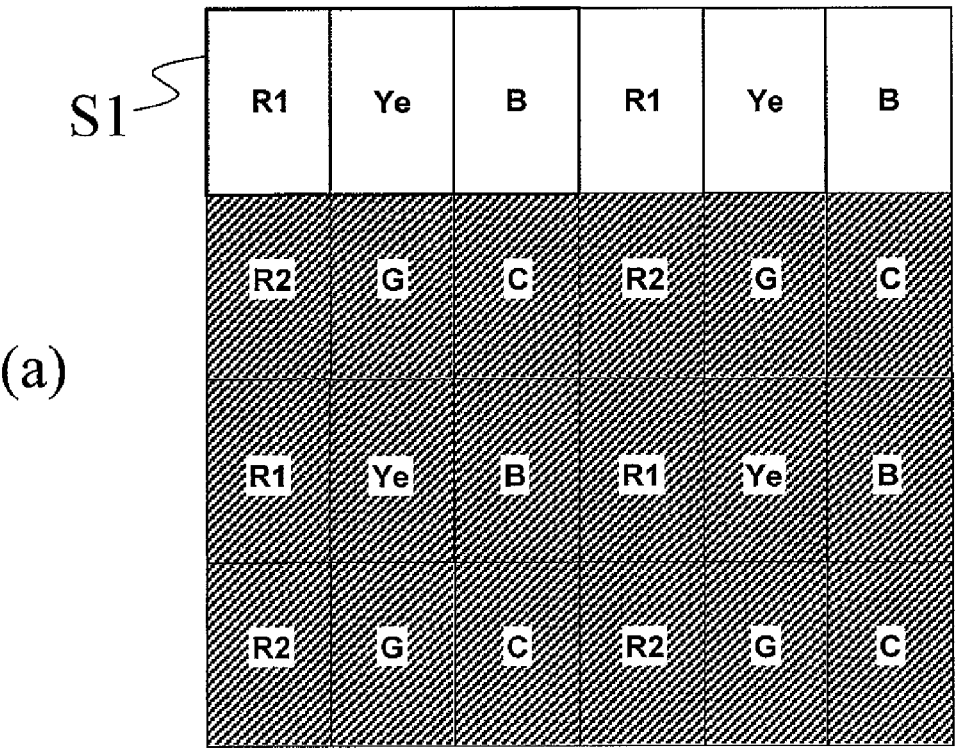
(b)
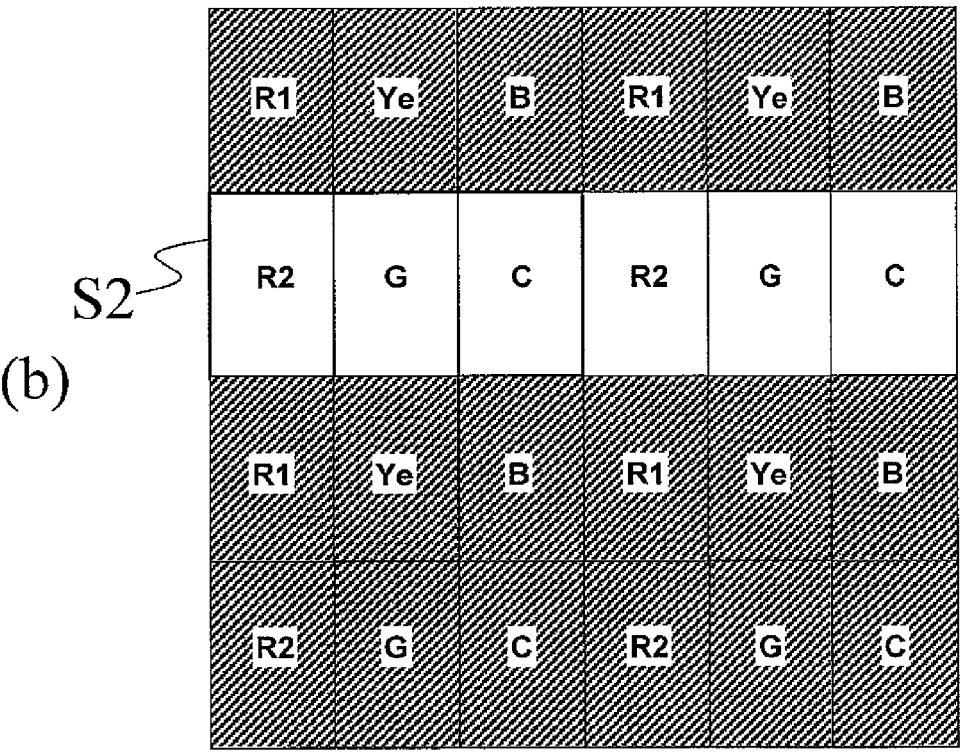

MULTIPLE-PRIMARY-COLOR LIQUID CRYSTAL DISPLAY DEVICE

TECHNICAL FIELD

The present invention generally relates to a liquid crystal display device and more particularly relates to a multi-primary-color liquid crystal display device for conducting a display operation using four or more primary colors.

BACKGROUND ART

Liquid crystal display devices are currently used in a variety of applications. In a general display device, one picture element consists of three pixels respectively representing red, green and blue, which are the three primary colors of light, thereby conducting a display operation in colors.

A conventional liquid crystal display device, however, can reproduce colors that fall within only a narrow range (which is usually called a "color reproduction range"), which is a problem. FIG. 81 shows the color reproduction range of a conventional liquid crystal display device that conducts a display operation using the three primary colors. Specifically, FIG. 81 shows an xy chromaticity diagram according to the XYZ color system, in which the triangle, formed by the three points corresponding to the three primary colors of red, green and blue, represents the color reproduction range. Also plotted by crosses x in FIG. 81 are the colors of various objects existing in Nature, which were disclosed by Pointer (see Non-Patent Document No. 1). As can be seen from FIG. 81, there are some object colors that do not fall within the color reproduction range, and therefore, a liquid crystal display device that conducts a display operation using the three primary colors cannot reproduce some object colors.

Thus, to broaden the color reproduction range of liquid crystal display devices, a technique that increases the number of primary colors used for display purposes to four or more has recently been proposed. For example, Patent Document No. 1 discloses a liquid crystal display device in which one picture element P consists of six pixels R, G, B, Ye, C and M representing the colors red, green, blue, yellow, cyan and magenta, respectively, as shown in FIG. 82. The color reproduction range of such a liquid crystal display device is shown in FIG. 83. As shown in FIG. 83, the color reproduction range, represented by a hexagon of which the six vertices correspond to those six primary colors, covers almost all object colors. By increasing the number of primary colors for use in display in this manner, the color reproduction range can be broadened.

Patent Document No. 1 also discloses a liquid crystal display device in which one picture element consists of four pixels representing the colors red, green, blue and yellow and a liquid crystal display device in which one picture element consists of five pixels representing the colors red, green, blue, yellow and cyan. In any case, by using four or more primary colors, the color reproduction range can be broadened compared to conventional liquid crystal display devices that use only the three primary colors for display purposes. Such liquid crystal display devices that conduct a display operation using four or more primary colors will be collectively referred to herein as "multi-primary-color liquid crystal display devices".

In order to further improve the display quality of such multi-primary-color liquid crystal display devices, other techniques have recently been proposed. For example, Patent Document No. 2 discloses a technique for representing a brighter color red by providing two pixels representing the color red (i.e., first and second red pixels R1 and R2) for each picture element P in a multi-primary-color liquid crystal display device as shown in FIG. 84.

Patent Document No. 1: PCT International Application Japanese National Stage Publication No. 2004-529396

Patent Document No. 2: Pamphlet of PCT International Application Publication No. 2007-034770

Non-Patent Document No. 1: M. R. Pointer, "The Gamut of Real Surface Colors," Color Research and Application, Vol. 5, No. 3, pp. 145-155 (1980)

DISCLOSURE OF INVENTION

Problems to be Solved by the Invention

A plurality of pixels of a multi-primary-color liquid crystal display device include at least one pixel representing a different primary color from the three primary colors, and therefore, can form two or more different subsets, each of which can represent the color white. For example, each set of pixels of a multi-primary-color liquid crystal display device that conducts a display operation using the six primary colors of red, green, blue, yellow, cyan and magenta can form a subset S1 consisting of red, green and blue pixels R, G and B and a subset S2 consisting of cyan, magenta and yellow pixels C, M and Ye as shown in FIG. 85. On the other hand, each set of pixels of the multi-primary-color liquid crystal display device disclosed in Patent Document No. 2 can form a subset S1 consisting of first red, blue and yellow pixels R1, B and Ye and a subset S2 consisting of second red, green and cyan pixels R2, G and C as shown in FIG. 86. By using these two different subsets S1 and S2 as display units, a display operation can be carried out with even higher resolution.

Nevertheless, since one of those two subsets S1 and S2 consists of pixels representing different colors from those of the pixels that form the other subset, the color white represented by one subset S1 does not exactly match the color white represented by the other subset S2. For example, in a situation where a white line is displayed by using the one subset S1 as shown in FIG. 87(a) and in a situation where a white line is displayed by using the other subset S2 as shown in FIG. 87(b), the white lines will have mutually different luminances, chromaticities and/or color temperatures.

To overcome such a problem, the present inventors tentatively adjusted the luminance of the color white that was displayed using one of the two subsets by lighting some of the pixels included in the other subset at a predetermined luminance. For example, when a white line is displayed using the subset S2, the first red and blue pixels R1 and B included in the other subset S1 may be lit at a predetermined luminance as shown in FIG. 88. Then, the difference in luminance, chromaticity or color temperature between the two white lines displayed by using the two subsets S1 and S2 would be reduced.

Nevertheless, as can be seen from FIG. 88, if the first red and blue pixels R1 and B, included in the subset S1, were lit, then the white line displayed by the subset S2 would seem to have an increased width. As a result, the resolution would decrease and the display operation could not be carried out smoothly and with high definition.

It is therefore an object of the present invention to get a display operation done more smoothly and with higher definition by a multi-primary-color liquid crystal display device.

Means for Solving the Problems

A multi-primary-color liquid crystal display device according to the present invention is adapted to conduct a display operation in at least four primary colors. The device has a plurality of pixels that form at least two different types of subsets. The device can perform rendering processing in which at least one of the plurality of pixels that form a first one of the at least two different types of subsets lends a luminance to a second type of subset. Each of the plurality of pixels includes a first subpixel and a second subpixel that could have mutually different luminances. The second type of subset borrows a luminance from one of the first and second subpixels of the at least one pixel that has the higher luminance.

In one preferred embodiment, the subpixel that has the higher luminance in the at least one pixel and that lends a luminance to the second type of subset is adjacent to the second type of subset.

In this particular preferred embodiment, in dividing each of the plurality of pixels into the first and second subpixels, a pattern applied to a pixel representing a particular primary color is different from a pattern applied to another pixel.

In a specific preferred embodiment, the pixel representing the particular primary color includes a subpixel that lends a luminance to the second type of subset.

In another preferred embodiment, the first and second subpixels have mutually different shapes, and a correlation between the luminance ranking of the first and second subpixels and the shapes of the first and second subpixels in the pixel representing the particular primary color is different from another pixel.

In this particular preferred embodiment, the pixel representing the particular primary color includes the subpixel that lends a luminance to the second type of subset.

In still another preferred embodiment, a plurality of subsets of the first type and a plurality of subsets of the second type are arranged in matrix.

In a specific preferred embodiment, the first type of subsets and the second type of subsets are arranged alternately in a predetermined direction, and an arbitrary one of the subsets of the second type borrows a luminance from one of the two subsets of the first type that are adjacent to itself on one and the other sides thereof, respectively, in the predetermined direction.

In another specific preferred embodiment, the first type of subsets and the second type of subsets are arranged alternately in a predetermined direction, and an arbitrary one of the subsets of the second type borrows a luminance from both of the two subsets of the first type that are adjacent to itself on one and the other sides thereof, respectively, in the predetermined direction.

In still another preferred embodiment, each of the plurality of pixels includes a liquid crystal layer and a plurality of electrodes for applying an electric field to the liquid crystal layer. The subsets of the first type and the subsets of the second type are alternately arranged in a predetermined direction. The pixels included in each said subset of the first type and the pixels included in each said subset of the second type are also arranged in the predetermined direction within their subset. The sum of the number of pixels included in each said subset of the first type and that of pixels included in each said subset of the second type is an even number. The direction of the electric field applied to the liquid crystal layer of each said pixel inverts every two pixels in the predetermined direction.

In yet another preferred embodiment, the at least four primary colors include red, green and blue.

In this particular preferred embodiment, the at least four primary colors further include yellow and cyan.

In a specific preferred embodiment, one of the first and second types of subsets includes a first red pixel representing the color red, a blue pixel representing the color blue, and a yellow pixel representing the color yellow, while the other type of subset includes a second red pixel representing the color red, a green pixel representing the color green, and a cyan pixel representing the color cyan.

In an alternative preferred embodiment, one of the first and second types of subsets includes a red pixel representing the color red, a green pixel representing the color green, and a cyan pixel representing the color cyan, while the other type of subset includes a blue pixel representing the color blue and a yellow pixel representing the color yellow.

In another preferred embodiment, the at least four primary colors further include magenta.

In this particular preferred embodiment, one of the first and second types of subsets includes a red pixel representing the color red, a green pixel representing the color green, and a blue pixel representing the color blue, while the other type of subset includes a cyan pixel representing the color cyan, a magenta pixel representing the color magenta, and a yellow pixel representing the color yellow.

In yet another preferred embodiment, the rendering processing is carried out so that a difference in luminance, chromaticity and/or color temperature between respective colors white represented by the first and second types of subsets decreases compared to a situation where the rendering processing is not carried out.

Effects of the Invention

A multi-primary-color liquid crystal display device according to the present invention has a plurality of pixels that are classified into at least two different types of subsets, and can perform rendering processing in which at least one of the pixels that form a first type of subset lends a luminance to a second type of subset. As a result, the difference in luminance, chromaticity and/or color temperature between the respective colors white represented by the first and second types of subsets can be narrowed. Also, in the multi-primary-color liquid crystal display device of the present invention, each pixel includes first and second subpixels that could have mutually different luminances, and the second type of subset borrows a luminance from one of the first and second subpixels that has the higher luminance. That is to say, in the multi-primary-color liquid crystal display device of the present invention, a luminance is lent and borrowed on a subpixel-by-subpixel basis. Consequently, the device of the present invention can get a display operation done more smoothly and with higher definition than a conventional device.

BRIEF DESCRIPTION OF DRAWINGS

FIG. 1 illustrates a pixel arrangement for a multi-primary-color liquid crystal display device 100 as a preferred embodiment of the present invention.

FIG. 2 illustrates the pixel arrangement for the multi-primary-color liquid crystal display device 100 as the preferred embodiment of the present invention.

FIG. 11 schematically illustrates how to lend and borrow a luminance in a multi-primary-color liquid crystal display device, of which no pixel is divided into multiple subpixels.

FIG. 12 illustrates what subpixels are lit by lending and borrowing a luminance as shown in FIG. 10.

FIG. 38 illustrates what subpixels are lit by lending and borrowing a luminance as shown in FIG. 37.

FIG. 39 is a graph showing how the Y (luminance) values of respective colors white represented by subsets S1 and S2 change before and after the rendering processing (in which a luminance is lent and borrowed) is performed as shown in FIG. 37.

Figure 54:
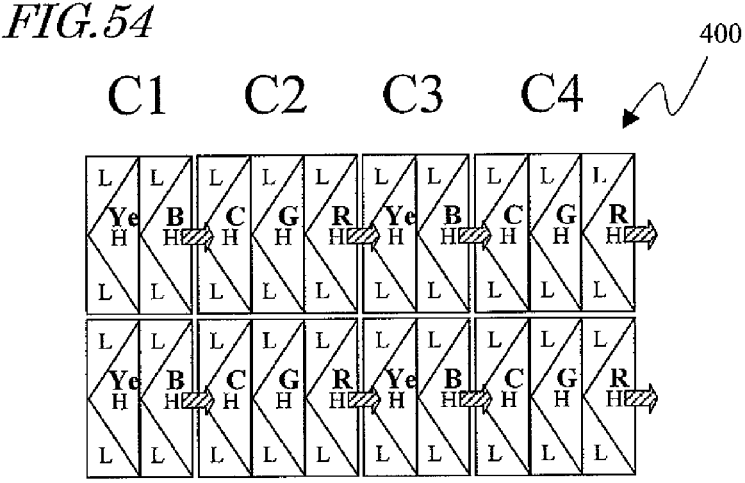
FIG. 54 schematically illustrates how to lend and borrow a luminance in the multi-primary-color liquid crystal display device 400.
Figure 56:
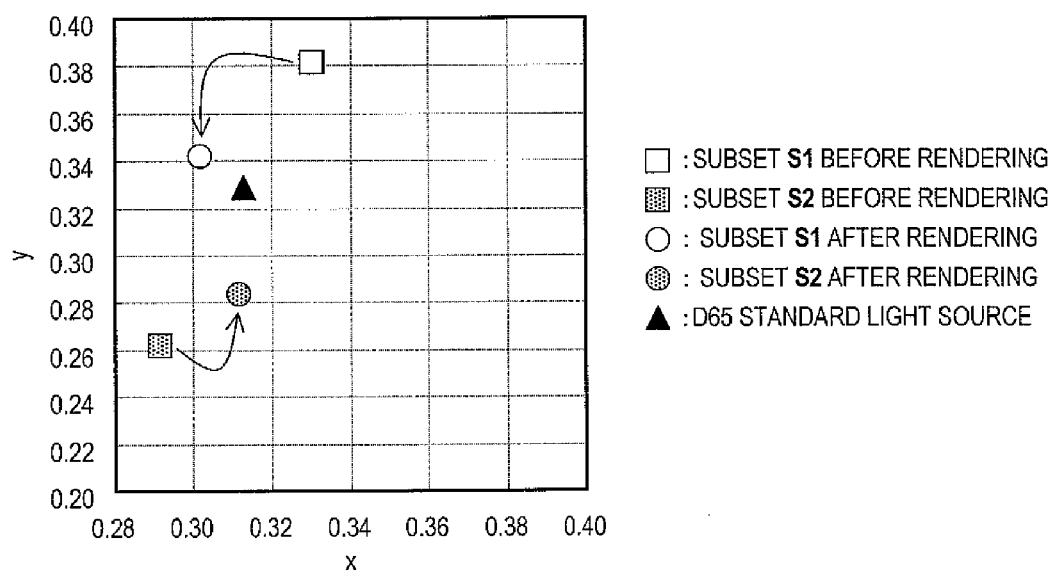

FIG. 56 is a graph showing how the xy chromaticity values of respective colors white represented by subsets S1 and S2 change before and after the rendering processing (in which a luminance is lent and borrowed) is performed as shown in FIG. 54.

Figure 57:
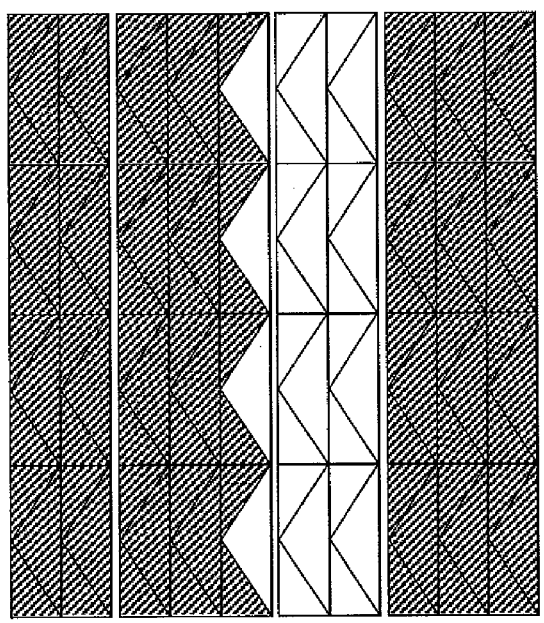

FIG. 57 illustrates what subpixels are lit by lending and borrowing a luminance as shown in FIG. 54.

Figure 58:
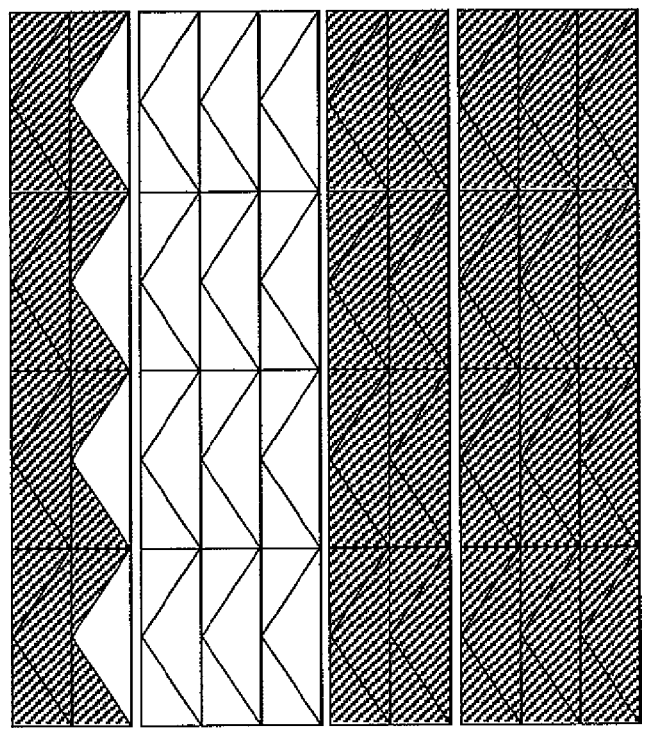

FIG. 58 illustrates what subpixels are lit by lending and borrowing a luminance as shown in FIG. 54.

Figure 59:
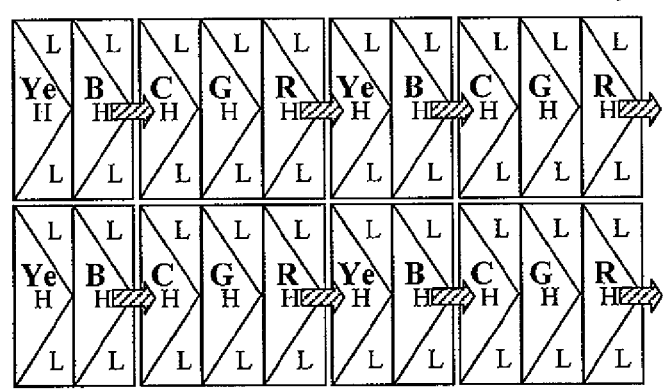

FIG. 59 schematically illustrates how to lend and borrow a luminance in the multi-primary-color liquid crystal display device 400.

Figure 60:
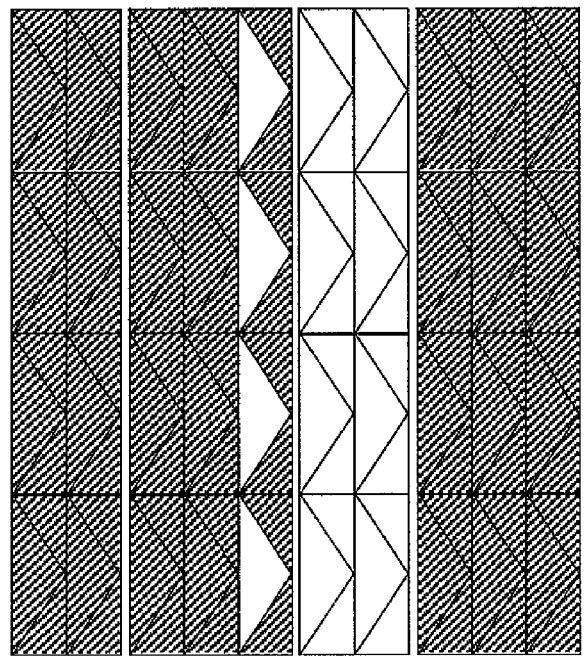

FIG. 60 illustrates what subpixels are lit by lending and borrowing a luminance as shown in FIG. 59.

Figure 61:
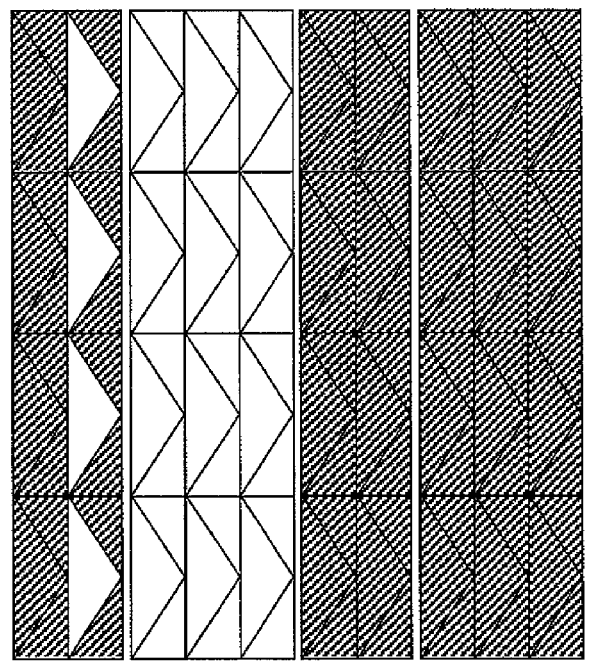

FIG. 61 illustrates what subpixels are lit by lending and borrowing a luminance as shown in FIG. 59.

Figure 62:
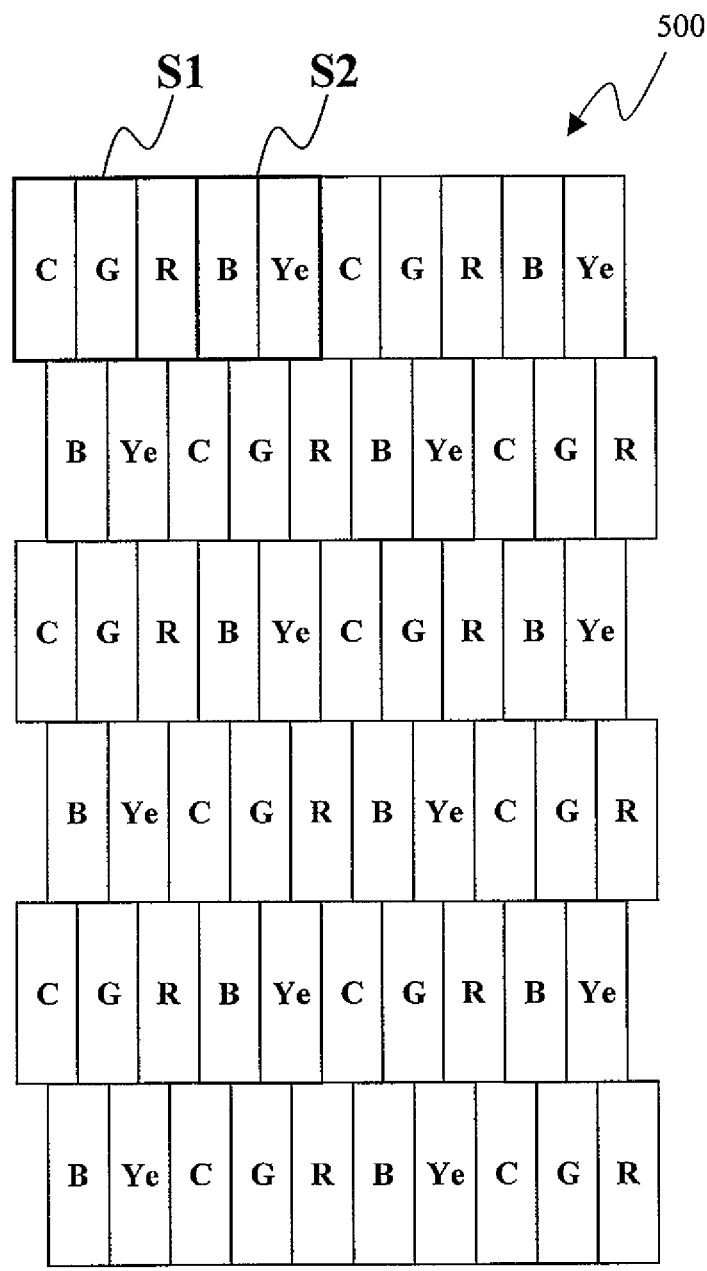

FIG. 62 illustrates a pixel arrangement for a multi-primary-color liquid crystal display device 500 as yet another preferred embodiment of the present invention.

Figure 63:
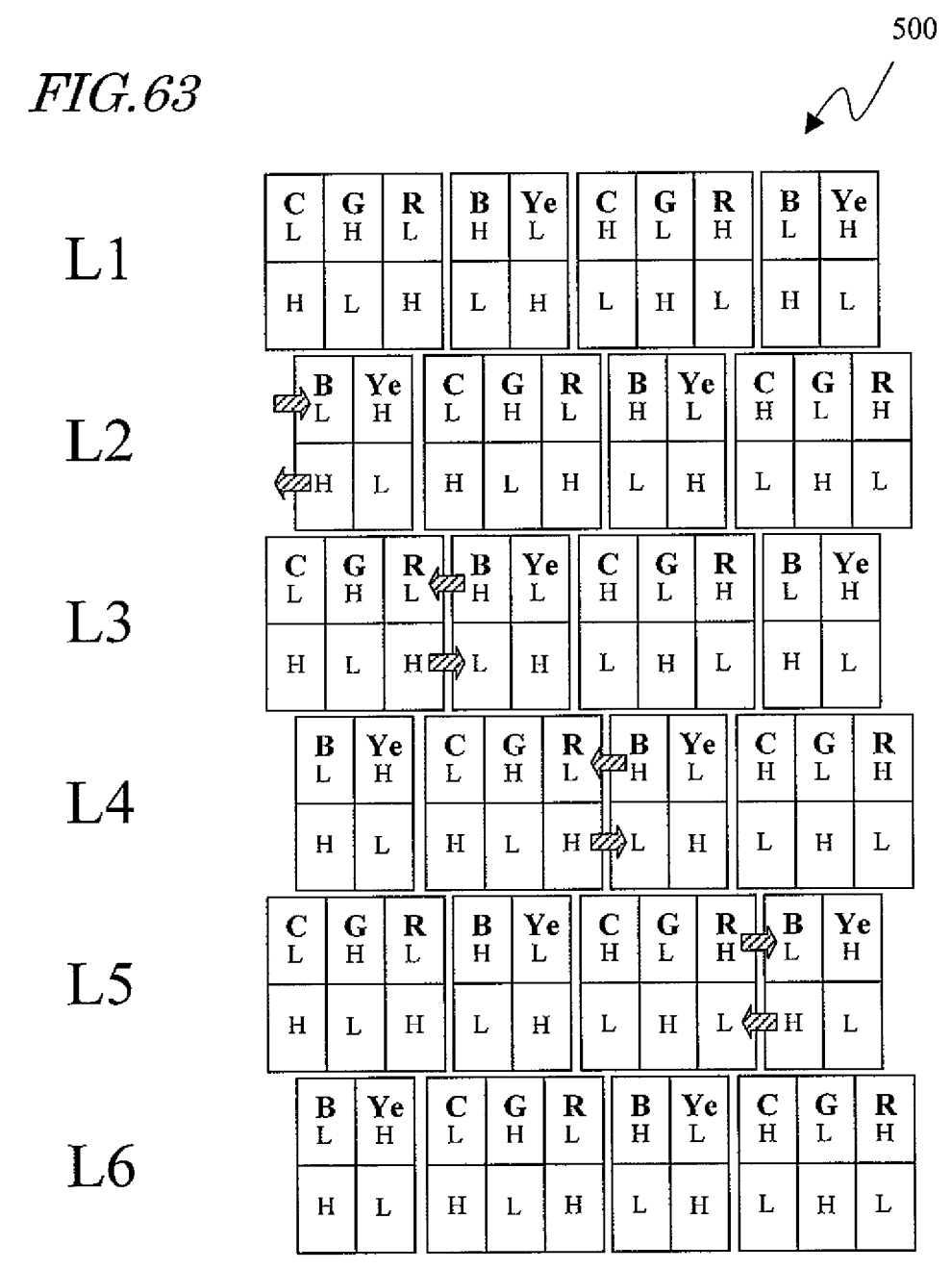

FIG. 63 schematically illustrates how to lend and borrow a luminance in the multi-primary-color liquid crystal display device 500.

Figure 64:
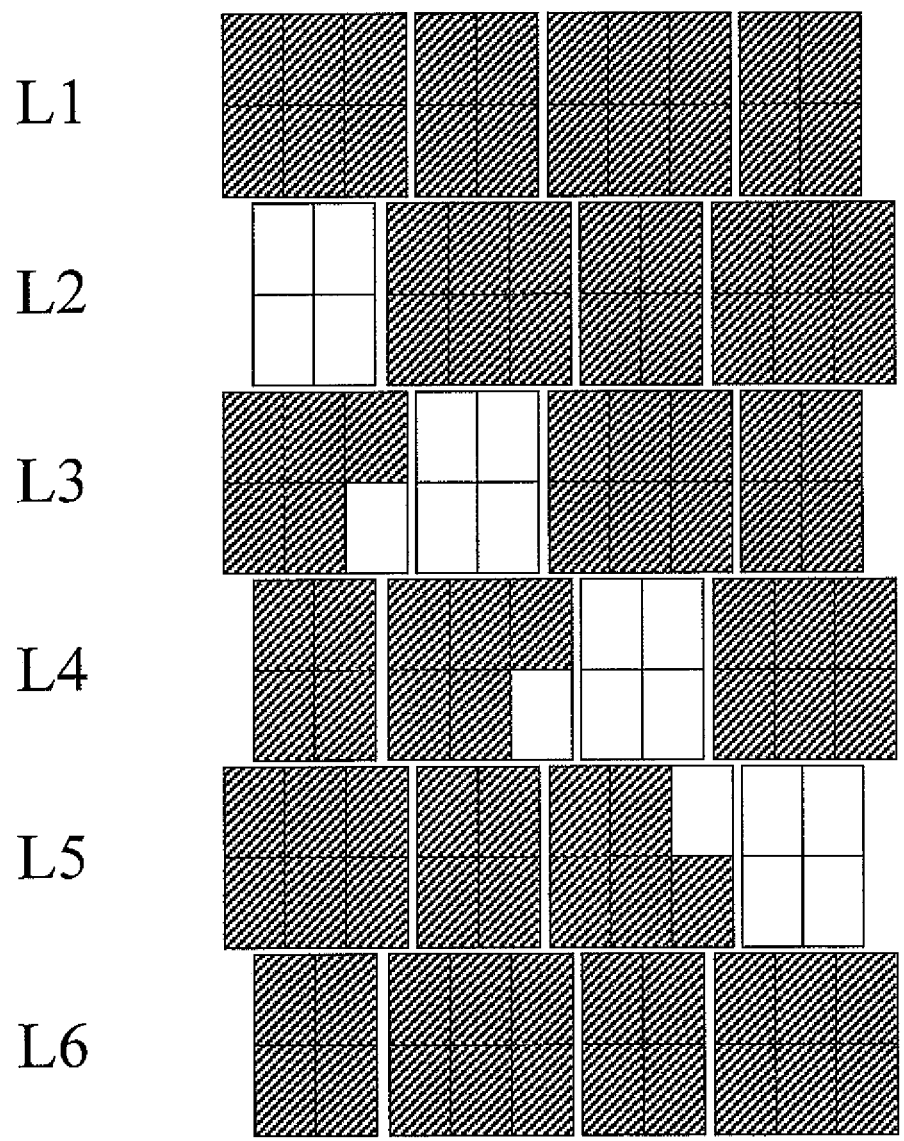

FIG. 64 illustrates what subpixels are lit by lending and borrowing a luminance as shown in FIG. 63.

Figure 65:
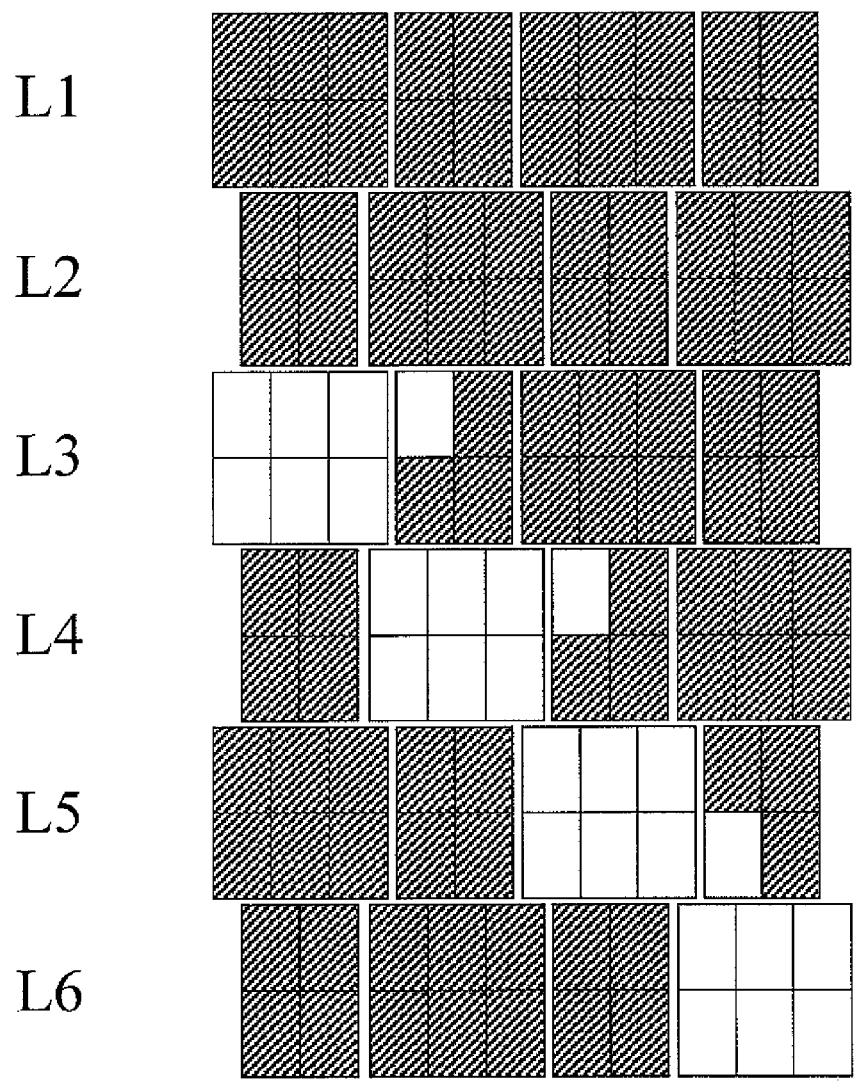

FIG. 65 illustrates what subpixels are lit by lending and borrowing a luminance as shown in FIG. 63.

Figure 66:
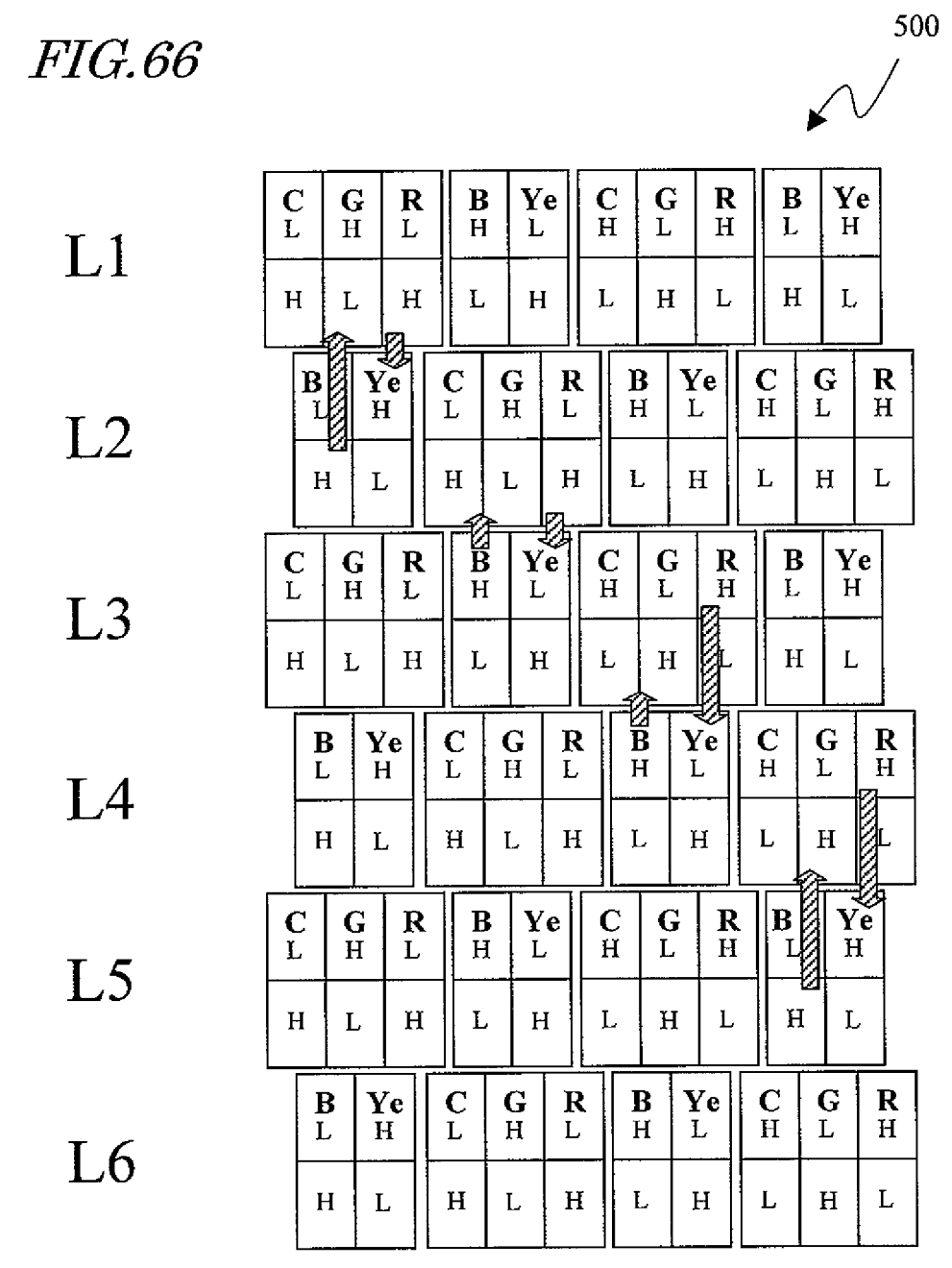

FIG. 66 schematically illustrates how to lend and borrow a luminance in the multi-primary-color liquid crystal display device 500.

Figure 67:
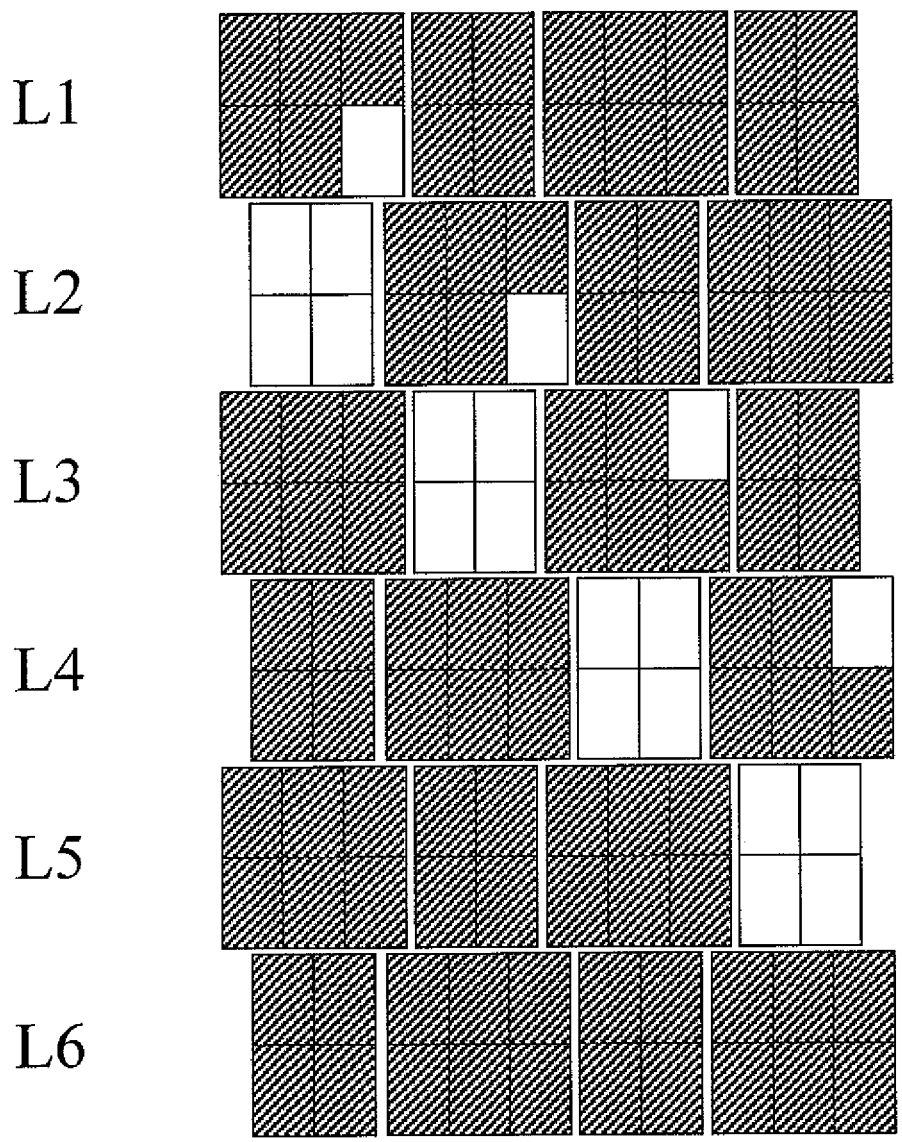

FIG. 67 illustrates what subpixels are lit by lending and borrowing a luminance as shown in FIG. 66.

Figure 68:
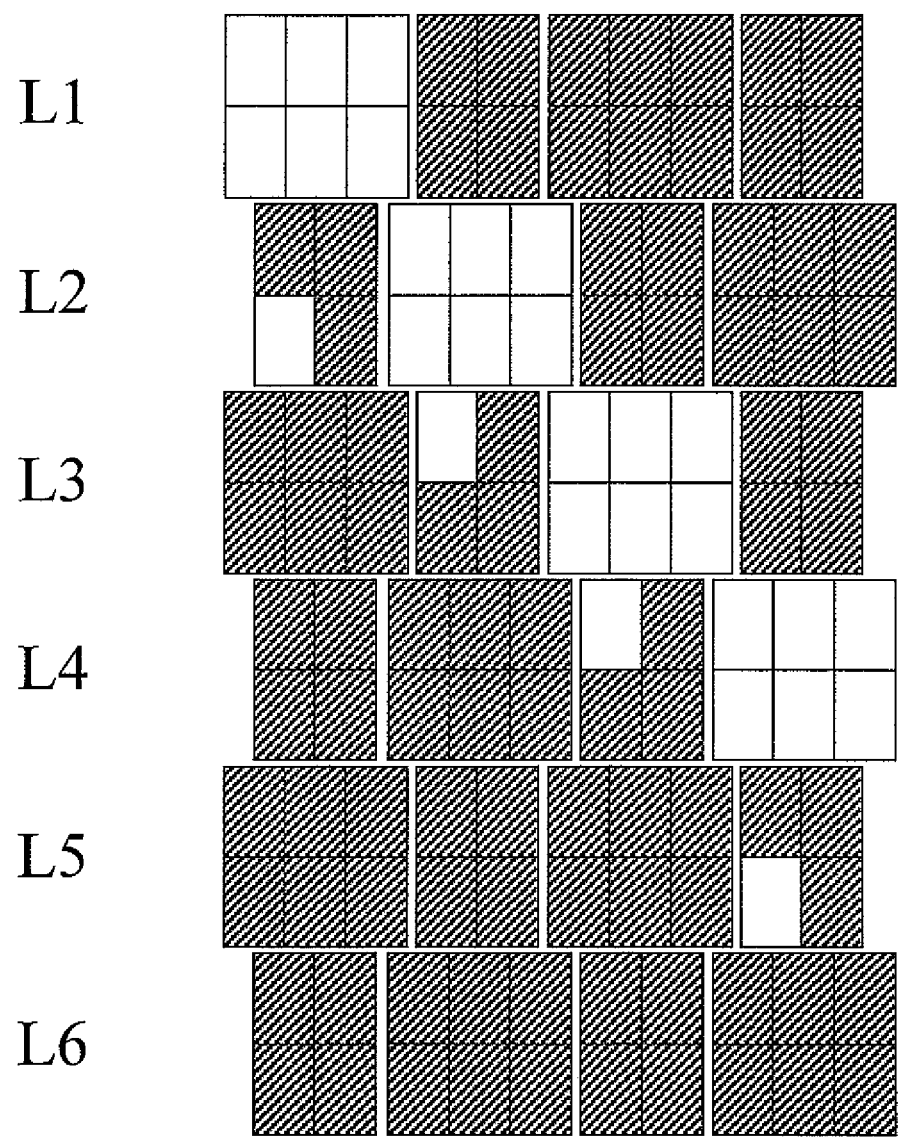

FIG. 68 illustrates what subpixels are lit by lending and borrowing a luminance as shown in FIG. 66.

Figure 69:
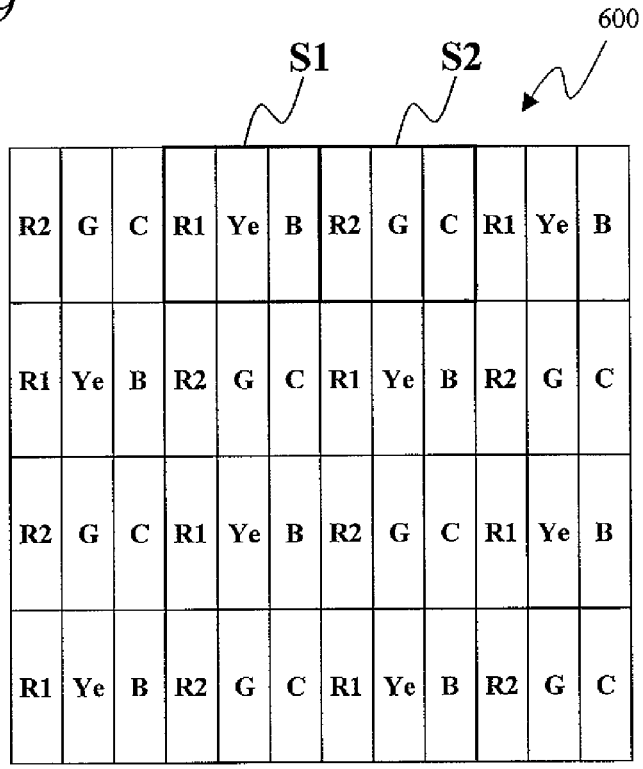

FIG. 69 illustrates a pixel arrangement for a multi-primary-color liquid crystal display device 600 as yet another preferred embodiment of the present invention.

Figure 70:
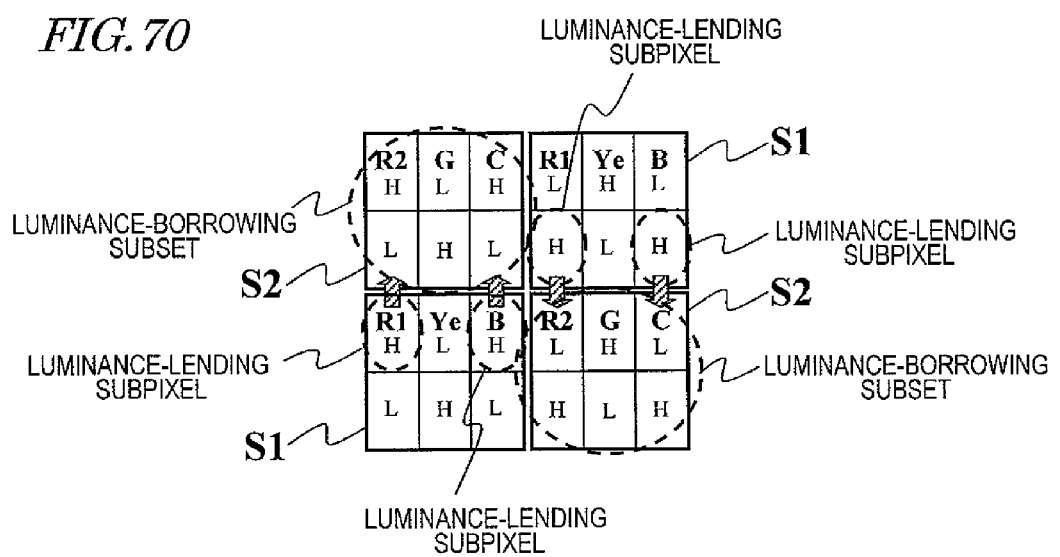

FIG. 70 schematically illustrates how to lend and borrow a luminance in the multi-primary-color liquid crystal display device 600.

Figure 71:
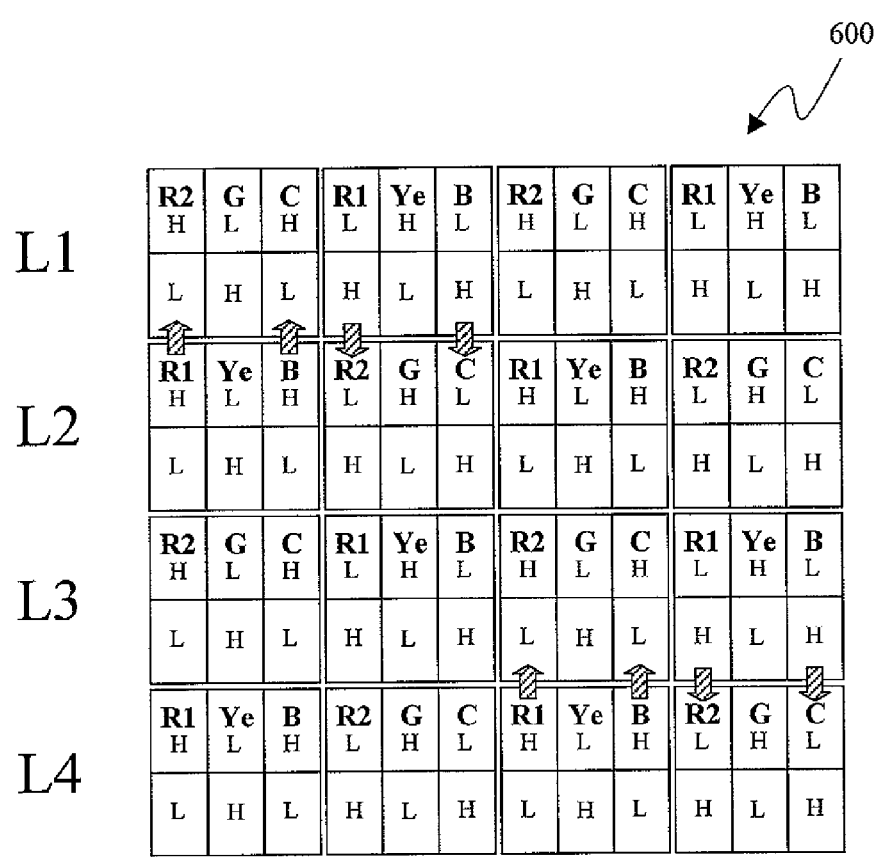

FIG. 71 schematically illustrates how to lend and borrow a luminance in the multi-primary-color liquid crystal display device 600.

Figure 72:
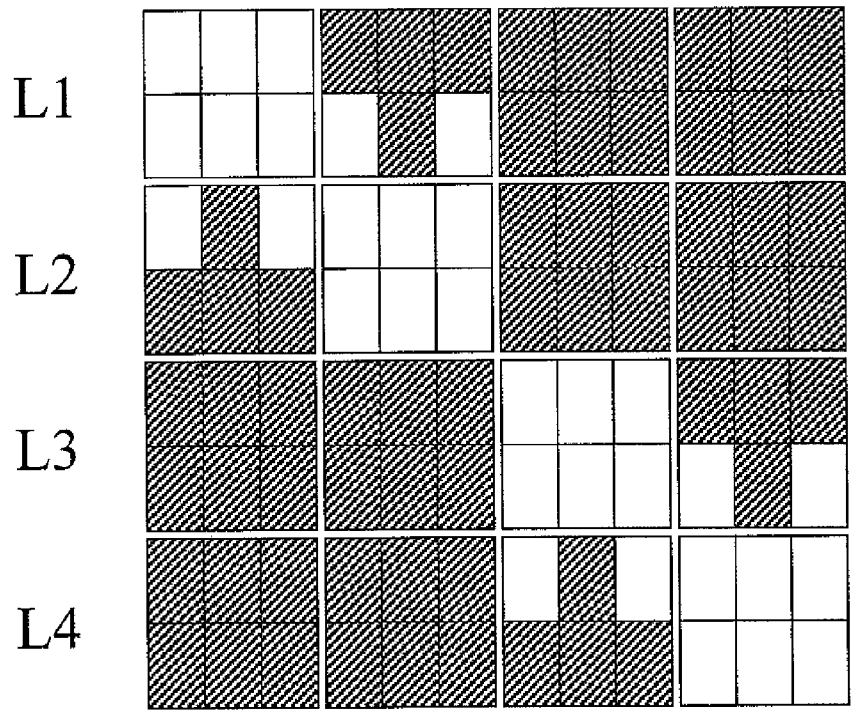

FIG. 72 illustrates what subpixels are lit by lending and borrowing a luminance as shown in FIG. 71.

Figure 73:
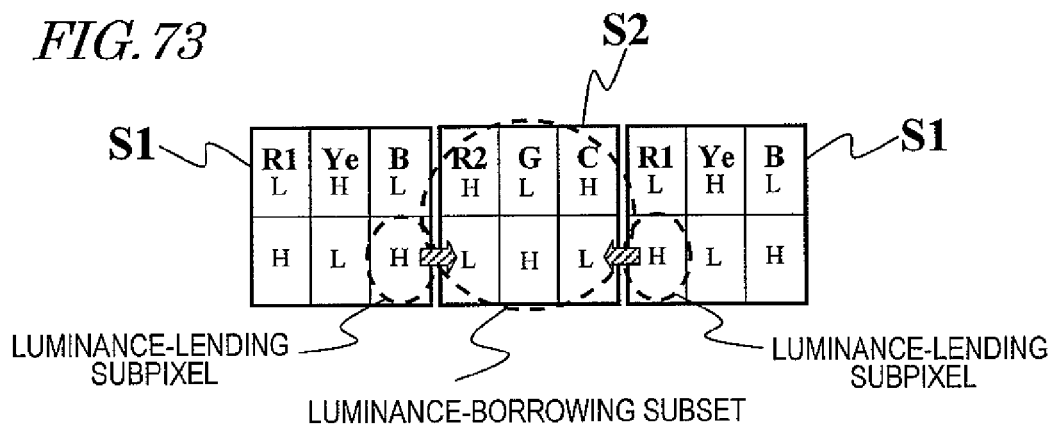

FIG. 73 schematically illustrates how to lend and borrow a luminance in the multi-primary-color liquid crystal display device 600.

Figure 74:
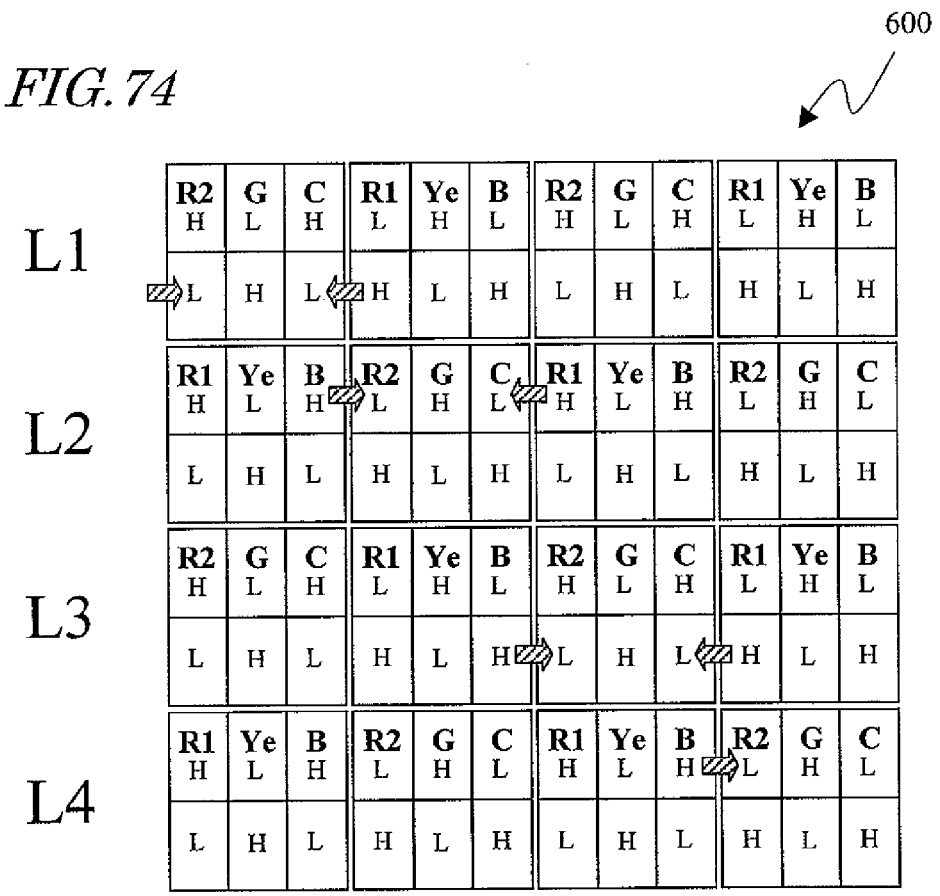

FIG. 74 schematically illustrates how to lend and borrow a luminance in the multi-primary-color liquid crystal display device 600.

Figure 75:
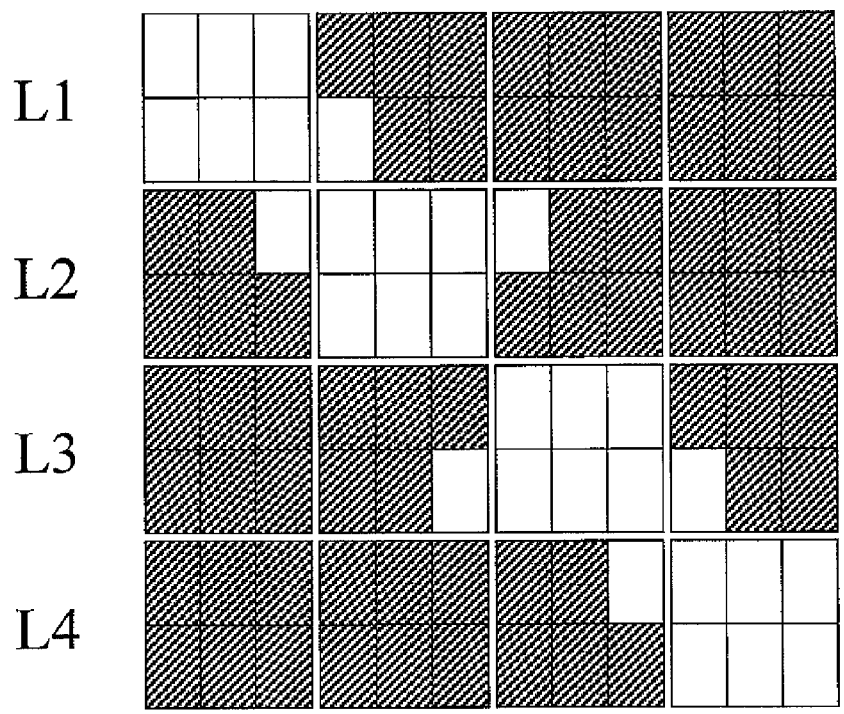

FIG. 75 illustrates what subpixels are lit by lending and borrowing a luminance as shown in FIG. 74.

FIG. 76 indicates the directions of an electric field applied to the liquid crystal layer of each pixel when a dot inversion drive is carried out in the multi-primary-color liquid crystal display device 600.

FIG. 77 indicates the directions of an electric field applied to the liquid crystal layer of each pixel when a two-source-line inversion drive is carried out in the multi-primary-color liquid crystal display device 600.

Figure 78:
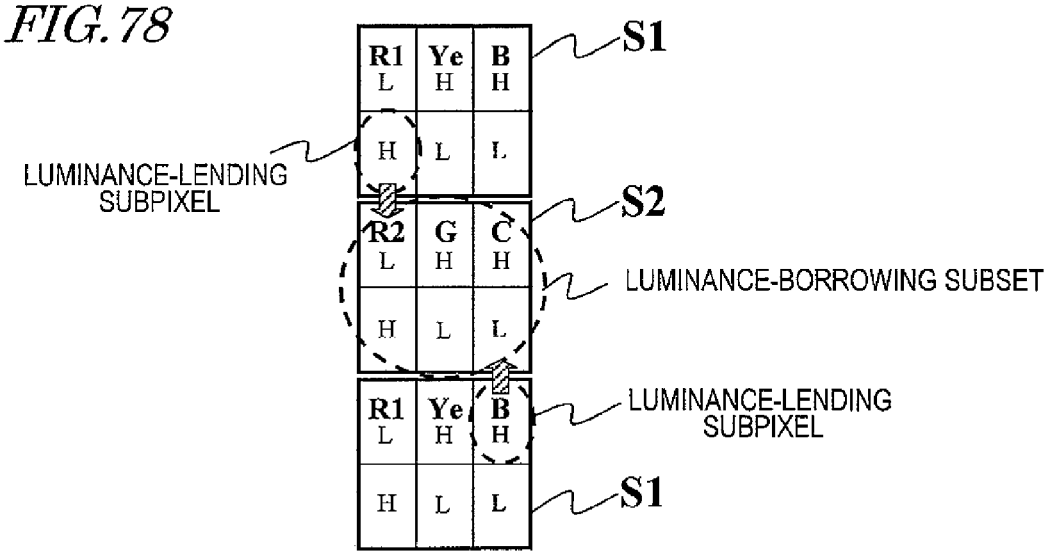

FIG. 78 schematically illustrates how to lend and borrow a luminance in the multi-primary-color liquid crystal display device 600.

Figure 79:
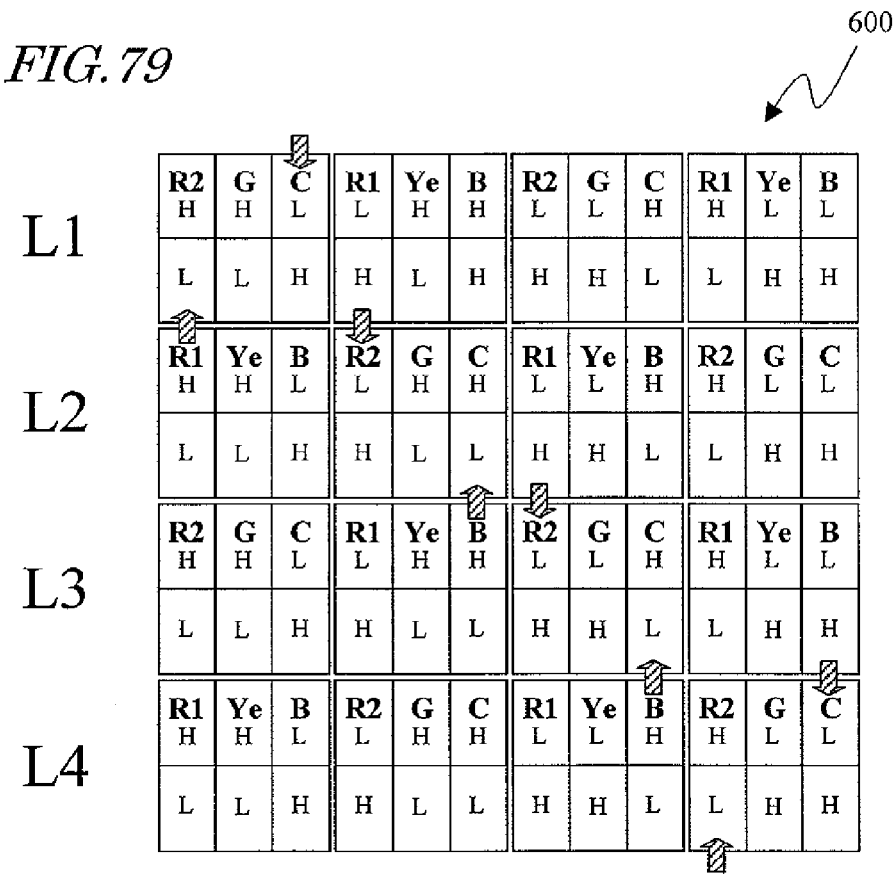

FIG. 79 schematically illustrates how to lend and borrow a luminance in the multi-primary-color liquid crystal display device 600.

Figure 80:
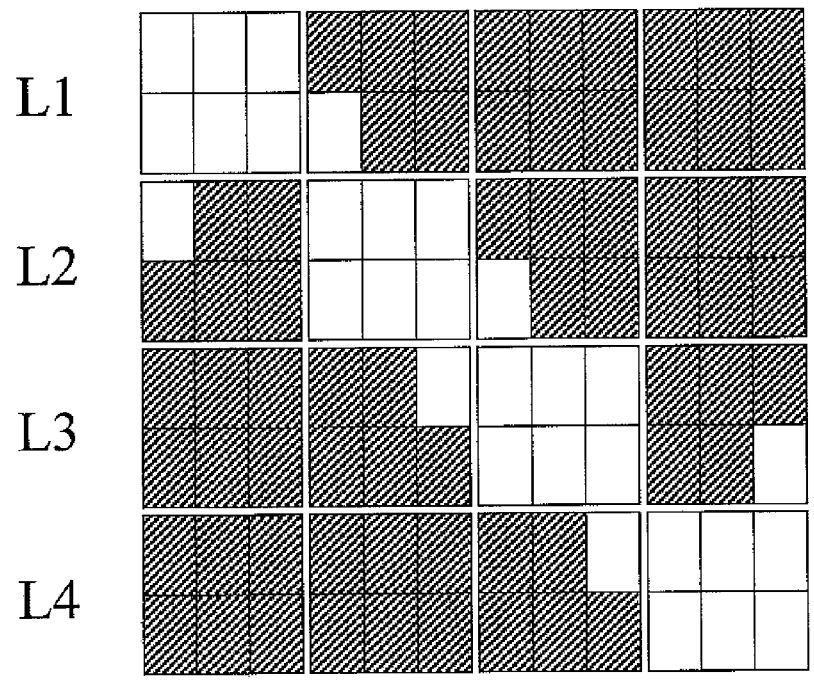

FIG. 80 illustrates what subpixels are lit by lending and borrowing a luminance as shown in FIG. 79.

Figure 81:
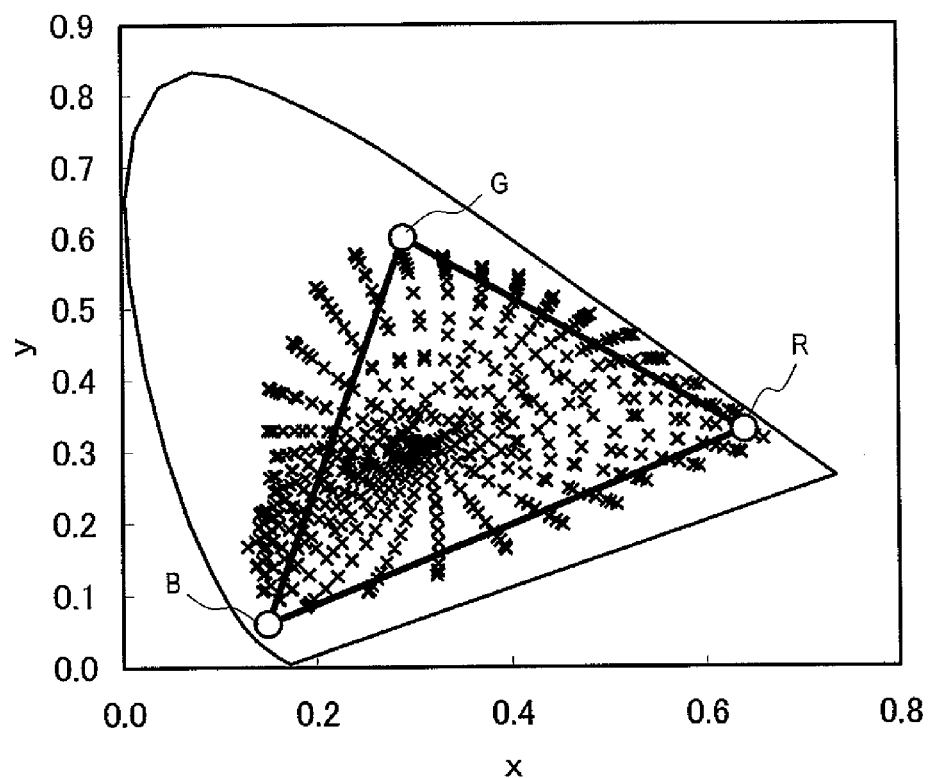

FIG. 81 shows the color reproduction range of a conventional liquid crystal display device that conducts a display operation using the three primary colors.

Figure 82:
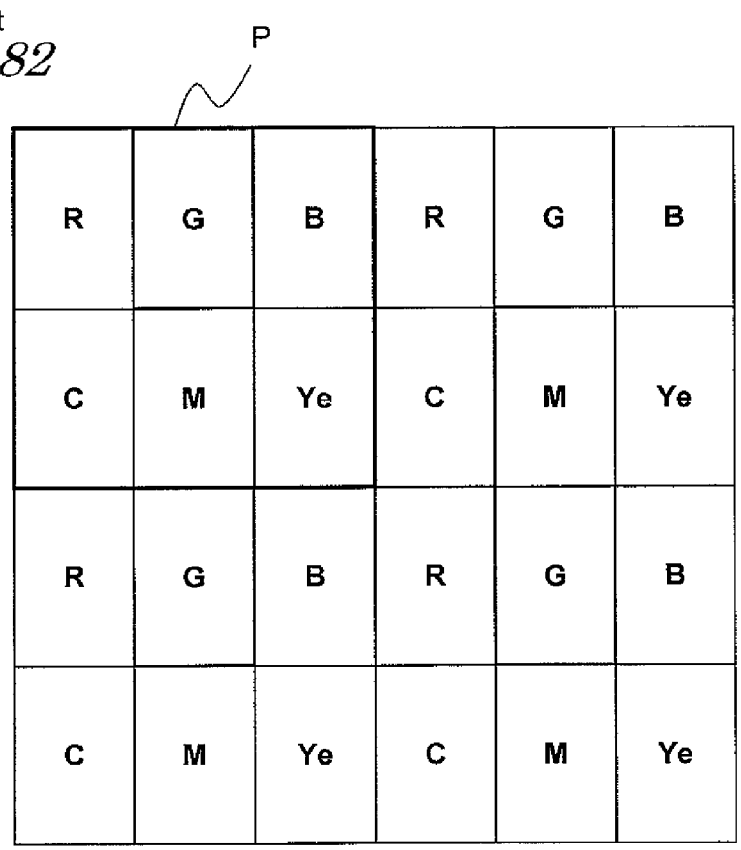

FIG. 82 schematically illustrates a conventional multi-primary-color liquid crystal display device.

Figure 83:
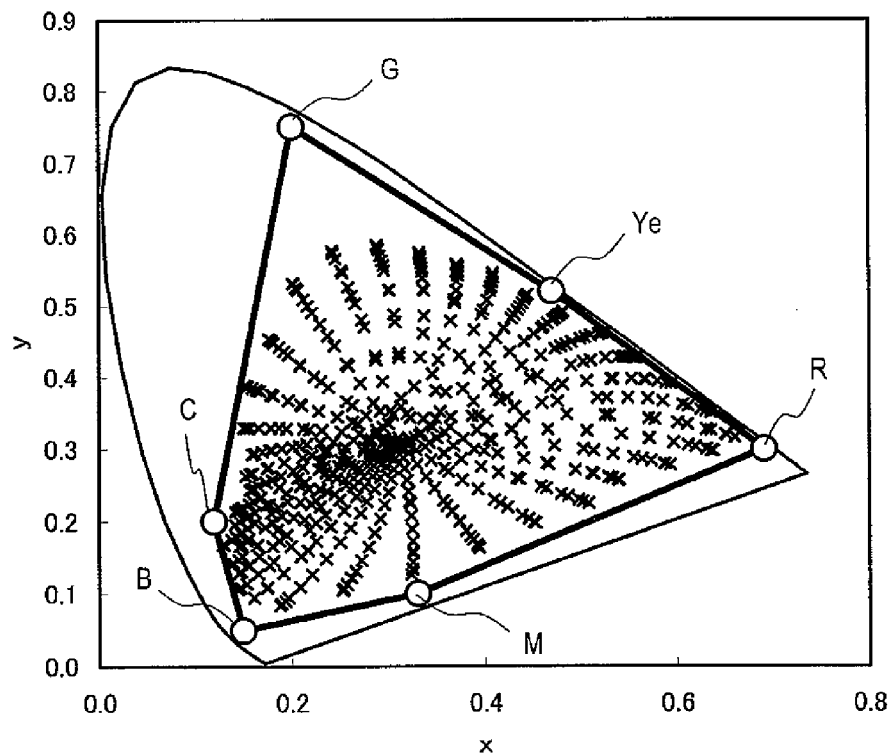

FIG. 83 shows the color reproduction range of the multi-primary-color liquid crystal display device shown in FIG. 82.

Figure 84:
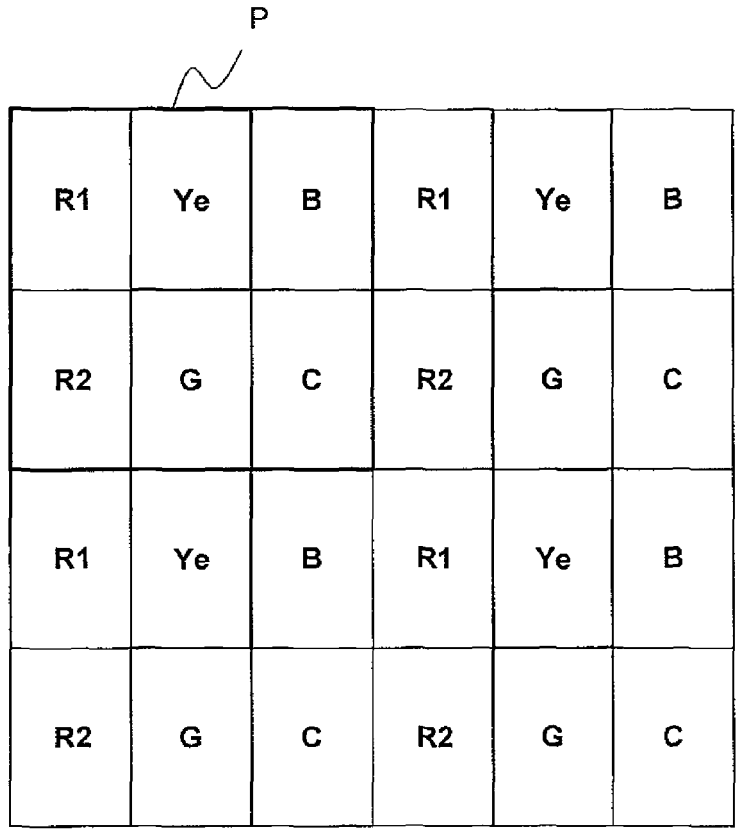

FIG. 84 schematically illustrates another conventional multi-primary-color liquid crystal display device.

Figure 85:
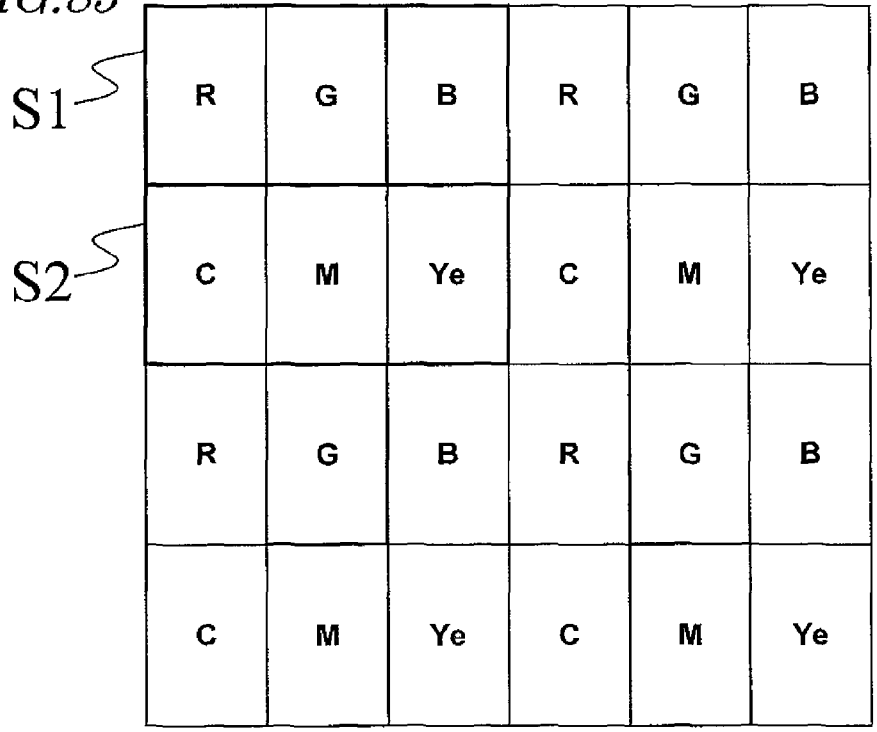

FIG. 85 illustrates two different types of subsets formed by multiple pixels in the conventional multi-primary-color liquid crystal display device shown in FIG. 82.

Figure 86:
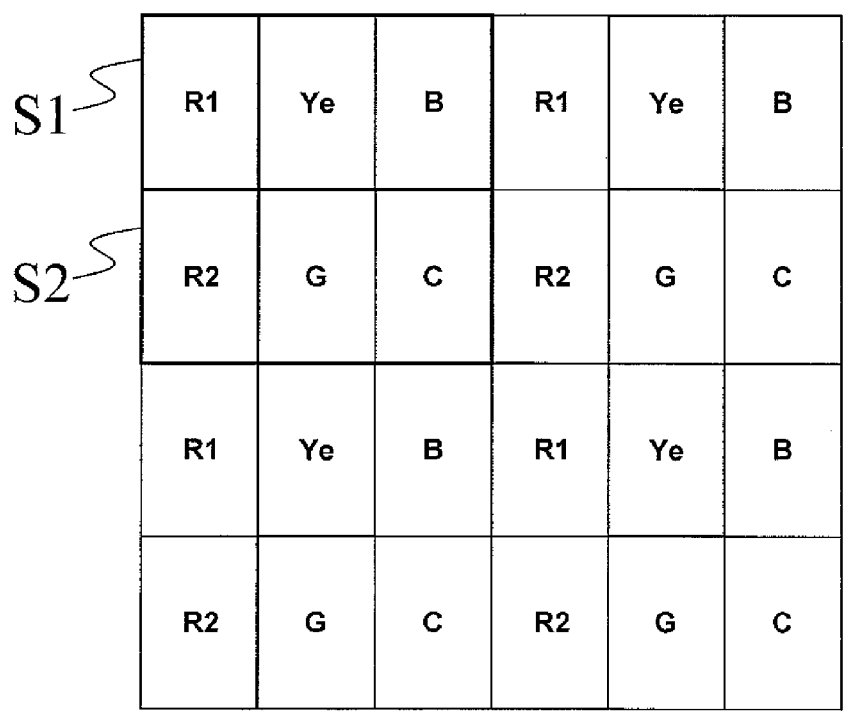

FIG. 86 illustrates two different types of subsets formed by multiple pixels in the conventional multi-primary-color liquid crystal display device shown in FIG. 84.

FIG. 87(*a*) illustrates a situation where a white line is displayed using one of the two different types of subsets and FIG. 87(*b*) illustrates a situation where a white line is displayed using the other type of subset.

Figure 88:
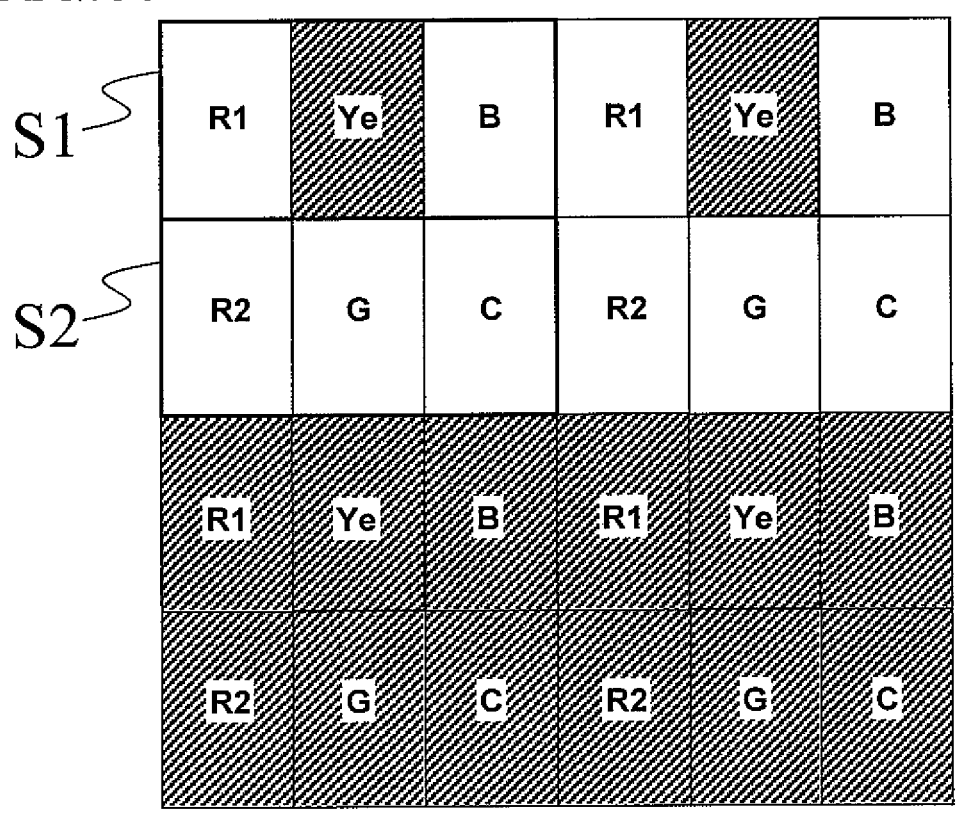

FIG. 88 illustrates a situation where when a white line is displayed using one type of subset, some pixels in the other type of subset are lit as supplementary pixels at a predetermined luminance.

| DESCRIPTION OF REFERENCE NUMERALS | |
|---|---|
| R | red pixel |
| R1 | first red subpixel |
| R2 | second red subpixel |
| G | green subpixel |
| B | blue subpixel |
| C | cyan subpixel |
| M | magenta subpixel |
| Ye | yellow subpixel |
| S1, S2 | subset |
| 10 | pixel |
| 10a | first subpixel |
| 10b | second subpixel |
| 12 | scan line |
| 14, 14a, 14b | signal line |
| 16a, 16b | TFT |
| 18a, 18b | subpixel electrode |
| 22a, 22b | storage capacitor |
| 24a, 24b | storage capacitor line |
| 100, 200, 300 | multi-primary-color liquid crystal display device |
| 400, 500, 600 | multi-primary-color liquid crystal display device |

BEST MODE FOR CARRYING OUT THE INVENTION

Hereinafter, preferred embodiments of the present invention will be described with reference to the accompanying drawings. However, the present invention is in no way limited to the specific preferred embodiments to be described below but is broadly applicable to any multi-primary-color liquid crystal display device in general as long as the device carries out a display operation in four or more primary colors.

Embodiment 1

FIG. 1 illustrates a pixel arrangement for a multi-primary-color liquid crystal display device 100 (which will be simply referred to herein as an "LCD 100"). As Shown in FIG. 1, the LCD 100 includes first and second red pixels R1 and R2 representing the color red, a green pixel G representing the color green, a blue pixel B representing the color blue, a yellow pixel Ye representing the color yellow, and a cyan pixel C representing the color cyan. These pixels are arranged in columns and rows to form a matrix pattern. More specifically, rows of pixels, in each of which the first red, yellow and blue pixels R1, Ye and B are arranged cyclically, and rows of pixels, in each of which the second red, green and cyan pixels R2, G and C are arranged cyclically, are alternately arranged in the column direction. Each pixel includes a liquid crystal layer and a plurality of electrodes for applying an electric field to the liquid crystal layer.

As shown in FIG. 1, the LCD 100 can conduct a display operation using these six pixels, namely, the first and second red pixels R1 and R2, the green pixel G, the blue pixel B, the yellow pixel Ye and the cyan pixel C, as the minimum unit of color display (i.e., as a single picture element P). This LCD 100 uses a larger number of primary colors for display purposes than a normal LCD that conducts a display operation in the three primary colors, and therefore, realizes a broader color reproduction range and can display any of various object colors inclusively. On top of that, the LCD 100 includes the first and second red pixels R1 and R2 representing the color(s) red, and therefore, can represent a bright color red as disclosed in Patent Document No. 2. It should be noted that the colors red represented by the first and second red subpixels R1 and R2 could be either different from each other or identical with each other.

Also, as shown in FIG. 2, the pixels of the LCD 100 can form two different types of subsets S1 and S2, each of which can represents the color white. One S1 of the two different types of subsets includes the first red, yellow and blue pixels R1, Ye and B, while the other type of subset S2 includes the second red, green and cyan pixels R2, G and C. A plurality of subsets of the first type S1 and a plurality of subsets of the second type S2 are arranged in matrix. Specifically, a plurality of subsets of either the first type S1 or the second type S2 are arranged in the row direction, while the first and second types of subsets S1 and S2 are arranged alternately in the column direction. In this manner, as multiple pixels can form first and second types of subsets S1 and S2, the LCD 100 can conduct a display operation with even higher resolution by using those subsets S1 and S2 as display units.

Nevertheless, the color white represented by the subset S1 does not exactly match the color white represented by the subset S2. That is why in representing the color white using one of the two different types of subsets S1 and S2, the LCD 100 of this preferred embodiment lights at least one of the pixels included in the other type of subset. In this manner, if any of the pixels that form one type of subset (which will be referred to herein as a "first type of subset" for convenience sake) is lit as a supplementary pixel when the other type of subset (which will be referred to herein as a "second type of subset" for convenience sake) displays the color white, then such an act will be referred herein as "the pixel of the first type of subset lending a luminance to the second type of subset" or "the second type of subset borrowing a luminance from the pixel of the first type of subset". The LCD 100 of this preferred embodiment carries out such rendering processing so that at least one of the pixels included in one of the two different types of subsets S1 and S2 (which will be referred to herein as a "first type of subset") lends a luminance to the other type of subset (which will be referred to herein as a "second type of subset"). As a result, the difference in luminance, chromaticity and/or color temperature between the respective colors white represented by those two types of subsets can be reduced.

If the rendering processing described above were simply performed, the resolution would decrease as already described with reference to FIG. 88. The LCD 100 of this preferred embodiment, however, has a special type of arrangement to be described below, and therefore, can minimize the decrease in resolution even if the rendering processing described above is performed.

Figure 3:
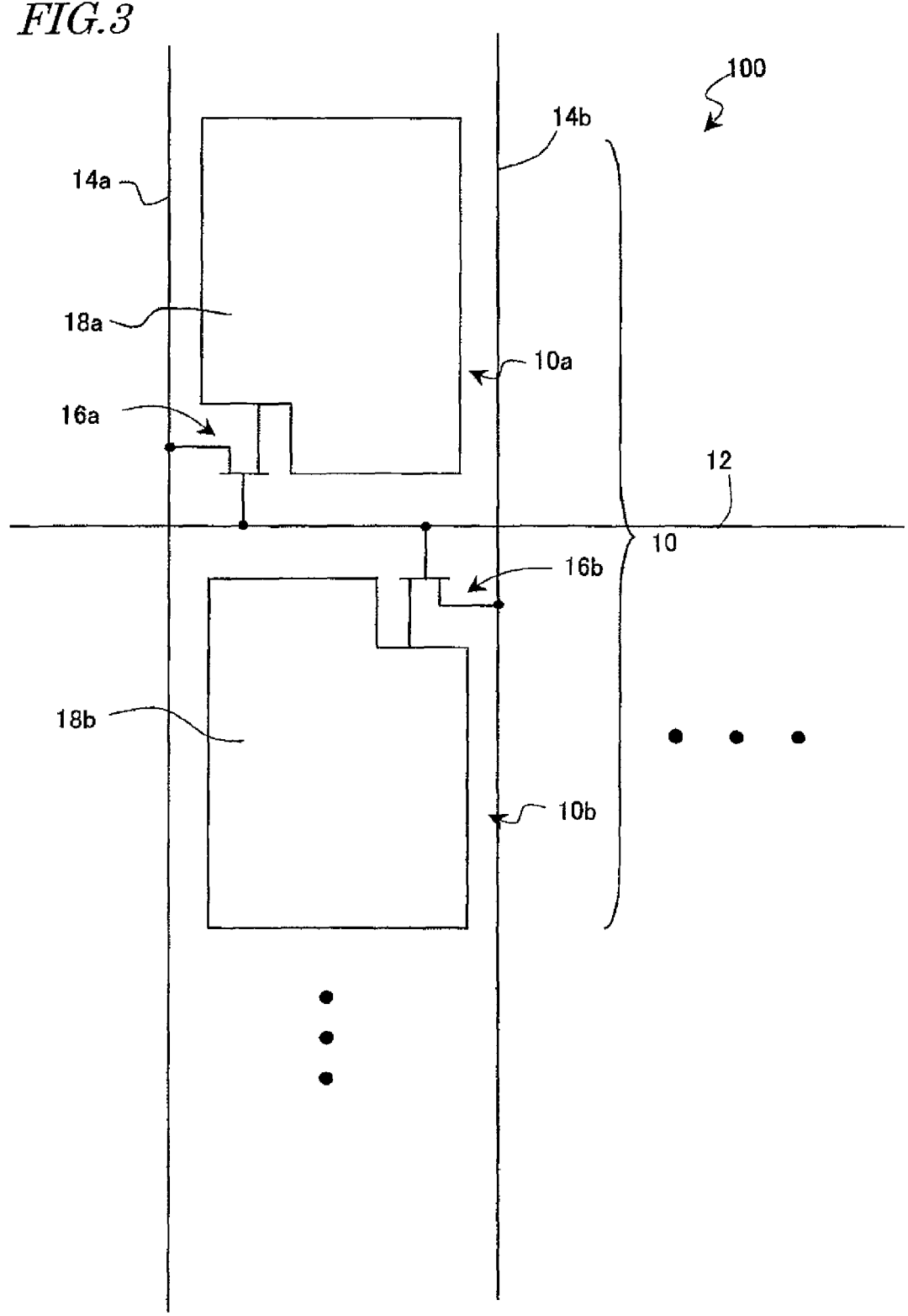
FIG. 3 illustrates an exemplary specific pixel structure for the multi-primary-color liquid crystal display device 100.

FIG. 3 illustrates a specific structure for each pixel 10 of the LCD 100. As shown in FIG. 3, each pixel 10 includes first and second subpixels 10*a* and 10*b*, which can have mutually different luminances. That is to say, each pixel 10 can be driven so that when a certain grayscale is displayed, mutually different voltages are applied to respective portions of the liquid crystal layer for the first and second subpixels 10*a* and 10*b*. It should be noted that the number of subpixels that a single pixel 10 has (which will also be referred to herein as "a pixel division number") does not have to be two. Optionally, a third subpixel (not shown), to which a different voltage from the one for the first or second subpixel 10*a*, 10*b* can be applied, may be further provided.

If each pixel 10 is divided into multiple subpixels 10*a*, 10*b* that can have mutually different luminances, then a mixture of multiple different γ characteristics will be observed. As a result, the viewing angle dependence of the γ characteristic (which is a phenomenon that the characteristic when the screen is viewed straight from in front of the panel is different from the one when the screen is viewed obliquely) can be reduced. Since the γ characteristic represents the degree of grayscale dependence of the luminance displayed, the variation in γ characteristic according to whether the viewing direction is straight or oblique means that the grayscale display state will also vary according to the viewing direction. Such a technique for reducing the viewing angle dependence of the γ characteristic by dividing a single pixel into multiple subpixels is called a "multi-pixel drive" and disclosed in Japanese Patent Application Laid-Open Publication No. 2004-62146, for example.

To apply effective voltages of mutually different amplitudes to respective portions of the liquid crystal layer for the first and second subpixels 10*a* and 10*b*, any of various structures as disclosed in not only Japanese Patent Application Laid-Open Publication No. 2004-62146 mentioned above but also Japanese Patent Application Laid-Open Publications Nos. 2006-39130, 2006-201764, 2007-226242 and so on could be used.

For example, the arrangement shown in FIG. 3 may be adopted. In a conventional LCD, a single pixel has only one pixel electrode that is connected to a signal line via a switching element (such as a TFT). On the other hand, the single pixel 10 shown in FIG. 3 includes two subpixel electrodes 18*a* and 18*b* that are connected to two different signal lines 14*a* and 14*b* via their associated TFTs 16*a* and 16*b*, respectively.

As the first and second subpixels 10*a* and 10*b* form one pixel 10, the respective gates of the TFTs 16*a* and 16*b* are connected in common to the same scan line (gate line) 12 and have their ON and OFF states controlled in response to the same scan signal. On the other hand, signal voltages (i.e., grayscale voltages) are supplied onto the signal lines (source lines) 14*a* and 14*b* so that the first and second subpixels 10*a* and 10*b* have mutually different luminances.

Figure 4:
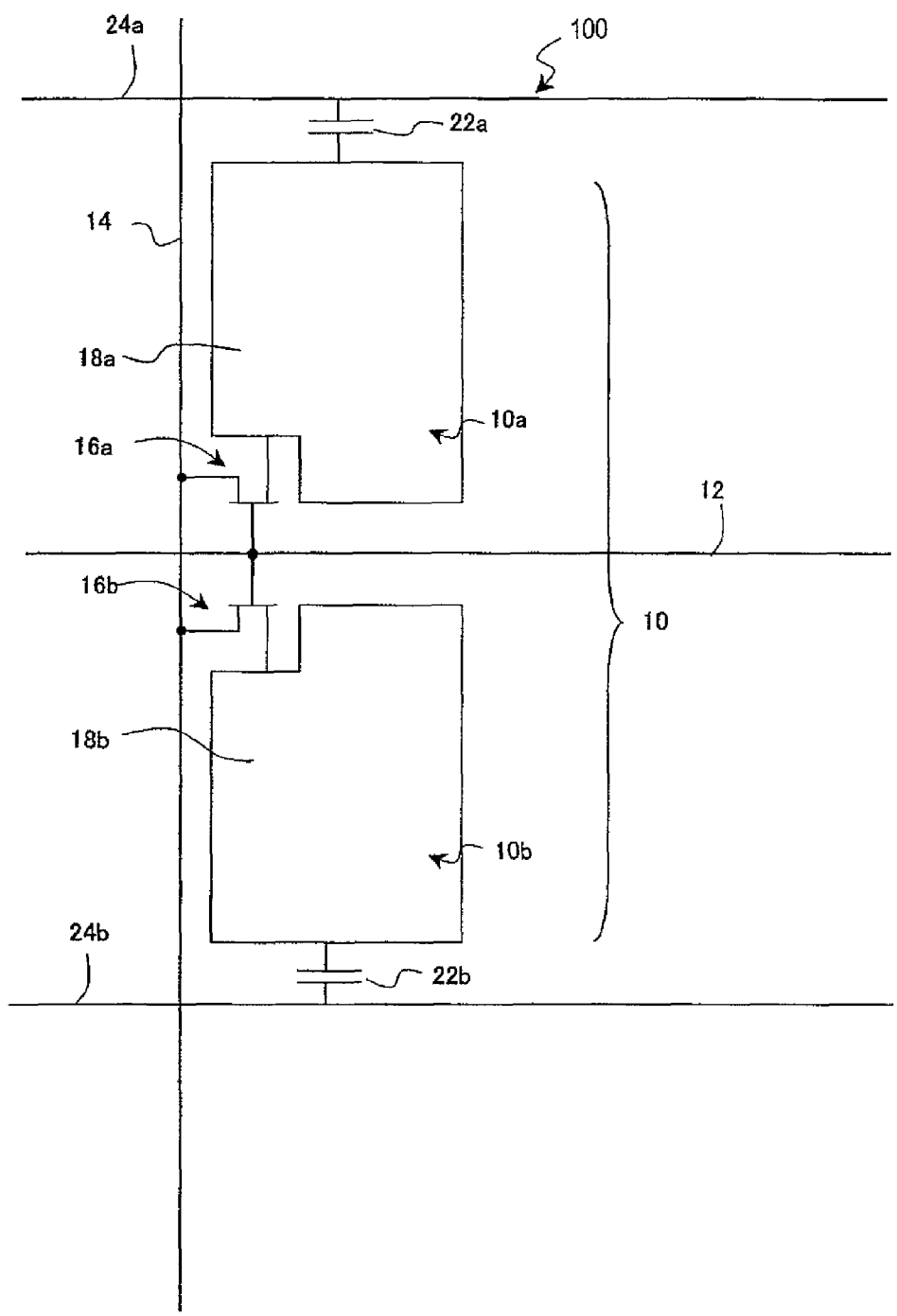
FIG. 4 illustrates another exemplary specific pixel structure for the multi-primary-color liquid crystal display device 100.

Alternatively, the arrangement shown in FIG. 4 may also be adopted. In the arrangement shown in FIG. 4, the respective source electrodes of the TFTs 16*a* and 16*b* are connected in common to the same signal line 14. Also, storage capacitors (CS) 22a and 22b are provided for the first and second subpixels 10a and 10b, respectively, and connected to storage capacitor lines (CS lines) 24a and 24b, respectively. Each of these storage capacitors 22a and 22b consists of a storage capacitor electrode that is electrically connected to the subpixel electrode 18a or 18b, a storage capacitor counter electrode that is electrically connected to the storage capacitor line 24a or 24b, and an insulating layer interposed between them (none of those members are shown in FIG. 4). The storage capacitor counter electrodes of the storage capacitors 22a and 22b are independent of each other and are designed so as to be supplied with mutually different voltages (which will be referred to herein as "storage capacitor counter voltages") through the storage capacitor lines 24a and 24b, respectively. By changing the storage capacitor counter voltages applied to the storage capacitor counter electrodes, mutually different effective voltages can be applied to respective portions of the liquid crystal layer for the first and second subpixels 10a and 10b by utilizing capacitance division.

In the arrangement illustrated in FIG. 3, mutually independent TFTs 16a and 16b are connected to the first and second subpixels 10a and 10b, respectively, and have their source electrode connected to their associated signal lines 14a and 14b, respectively. That is why arbitrary effective voltages can be applied to the respective portions of the liquid crystal layer for the subpixels 10a and 10b. However, the number of signal lines 14a, 14b to be provided and the number of signal line drivers to be provided both need to be doubled compared to a conventional LCD.

On the other hand, if the arrangement shown in FIG. 4 is adopted, there is no need to apply mutually different signal voltages to the subpixel electrodes 18a and 18b, and therefore, the TFTs 16a and 16b may be connected in common to the same signal line 14 and may be supplied with the same signal voltage. That is why this LCD may have the same number of signal lines 14, and a signal line driver with the same configuration, as the conventional LCD.

Figure 5:
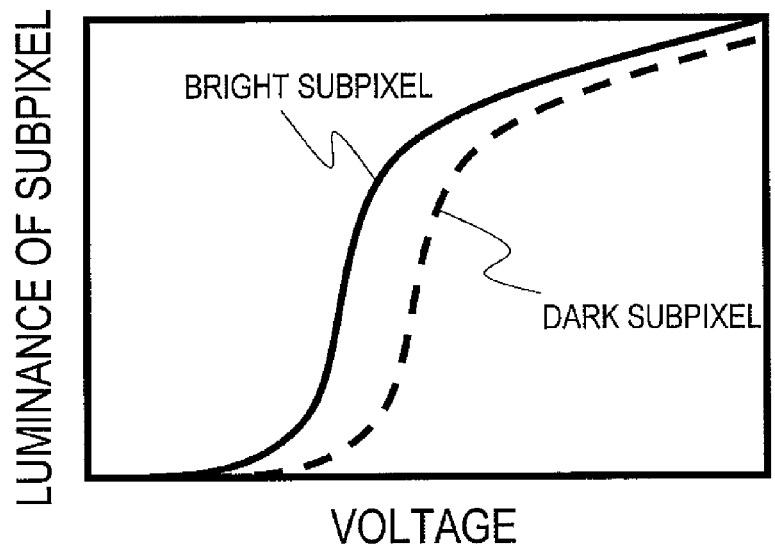
FIG. 5 is a graph showing how the luminances of the first and second subpixels of each pixel change with the voltage in the multi-primary-color liquid crystal display device 100.

FIG. 5 shows how the luminances of the first and second subpixels 10a and 10b change with the voltage (which is a signal voltage applied to the subpixel electrodes 18a and 18b) in a situation where the arrangement shown in FIG. 4 is adopted. As can be seen from FIG. 5, even though the same voltage is applied to the two subpixels, one subpixel has a higher luminance than the other. In the following description, the one subpixel with the higher luminance will be referred to herein as a "bright subpixel" and the other subpixel with the lower luminance a "dark subpixel".

When the LCD 100 of this preferred embodiment performs rendering processing, the subset to be a luminance borrower (i.e., the second type of subset) borrows a luminance from the bright subpixel of a pixel included in the subset to be a luminance lender (i.e., the first type of subset). That is to say, the pixel in the first type of subset does not lend a luminance by lighting itself entirely but lends a luminance on a subpixel-by-subpixel basis by lighting only one of its two subpixels (i.e., the bright subpixel).

Figure 6:
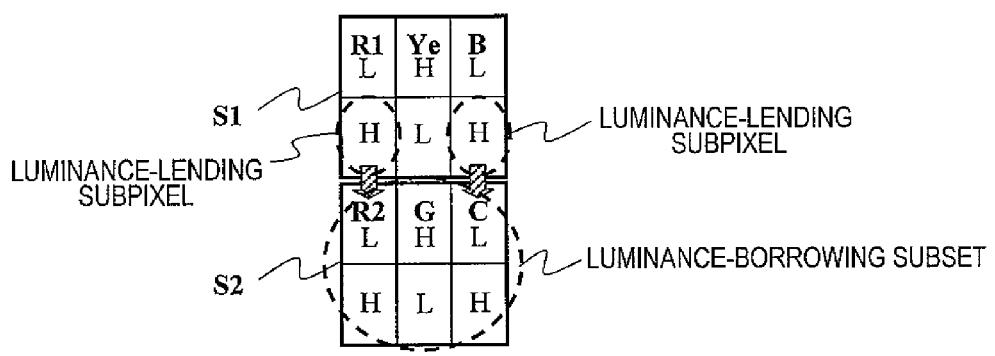
FIG. 6 schematically illustrates how to lend and borrow a luminance in the multi-primary-color liquid crystal display device 100.
Figure 7:
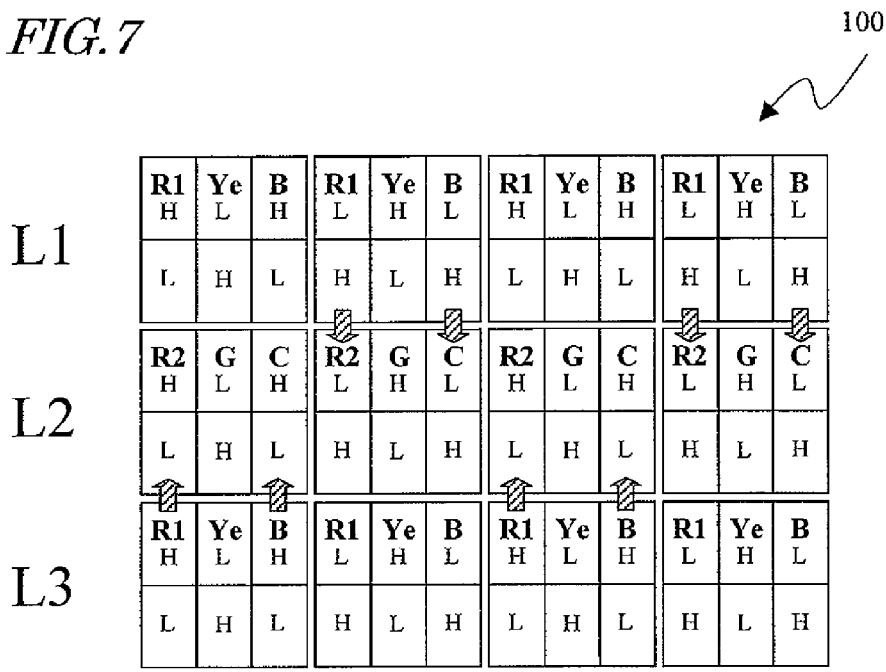
FIG. 7 schematically illustrates how to lend and borrow a luminance in the multi-primary-color liquid crystal display device 100.

FIGS. 6 and 7 schematically illustrate how to lend and borrow a luminance in that way. In the examples illustrated in FIGS. 6 and 7, the bright subpixel of each pixel is identified by "H" and the dark subpixel thereof by "L". To minimize a flicker on the screen, the luminance ranking of subpixels (i.e., the order of magnitudes of their luminance) is preferably shuffled as randomly as possible. To realize an ideal display condition, most preferred is an arrangement in which no subpixels of the same luminance rank are adjacent to each other in the column or row direction. That is to say, such subpixels of the same luminance rank are preferably arranged in a checkerboard pattern as shown in FIGS. 6 and 7.

Figure 8:
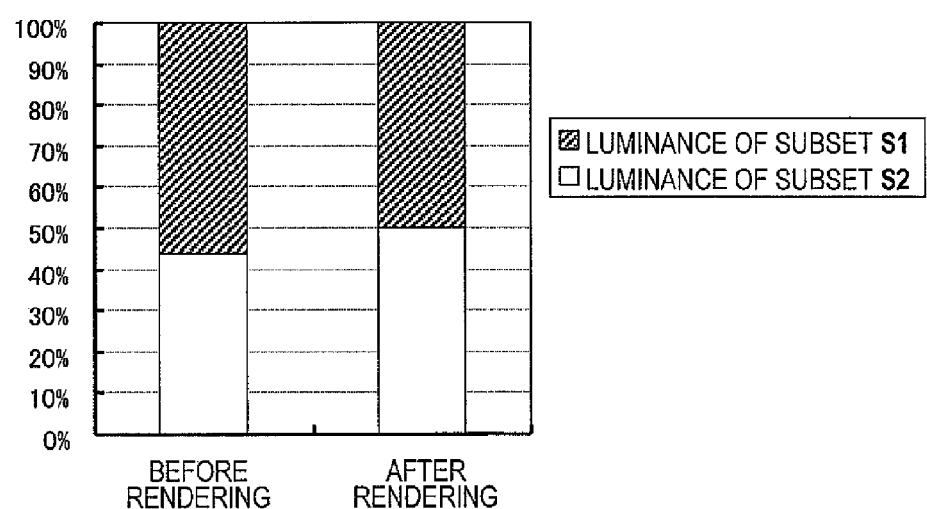
FIG. 8 is a graph showing how the Y (luminance) values of the colors white represented by subsets S1 and S2 change before and after rendering processing (i.e., lending and borrowing a luminance) is carried out.
Figure 9:
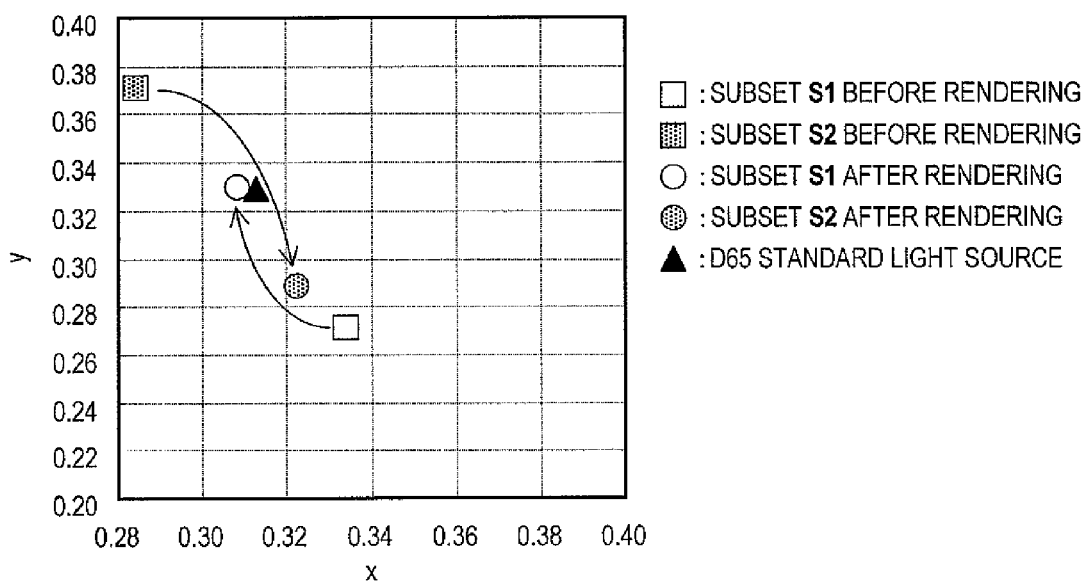
FIG. 9 is a graph showing how the xy chromaticity values of the colors white represented by subsets S1 and S2 change before and after rendering processing (i.e., lending and borrowing a luminance) is carried out.

In the LCD 100 of this preferred embodiment, the subset S2 borrows a luminance from the respective bright subpixels of the first red pixel R1 and the blue pixel B included in the subset S1 as indicated by the shadowed arrows in FIGS. 6 and 7. The following Tables 1 and 2 and FIGS. 8 and 9 show how the Y values and xy chromaticity values of respective pixels and the Y values (i.e., luminance values), xy chromaticity values and color temperatures of the colors white represented by the subsets S1 and S2 change before and after the rendering processing described above is carried out. The Y values shown are relative values with the sum of the Y values of the two subsets supposed to be 100%.

TABLE 1

| Before rendering | | Y | x | y | Y(w) | x(w) | y(w) | Tc(w)/K |
|---|---|---|---|---|---|---|---|---|
| S1 | R1 | 7.9 | 0.6581 | 0.3219 | 56.0 | 0.3340 | 0.2715 | 5360 |
|  | Ye | 43.1 | 0.4637 | 0.5248 | | | | |
|  | B | 5.0 | 0.1471 | 0.0502 | | | | |
| S2 | R2 | 7.9 | 0.6581 | 0.3219 | 44.0 | 0.2842 | 0.3714 | 7529 |
|  | G | 21.3 | 0.2521 | 0.6579 | | | | |
|  | C | 14.8 | 0.152 | 0.2404 | | | | |
|  | total | 100.0 | | | 100.0 | | | |

TABLE 2

| After rendering | | Y | x | y | Y(w) | x(w) | y(w) | Tc(w)/K |
|---|---|---|---|---|---|---|---|---|
| S1 | R1 | 2.8 (35%) | 0.6581 | 0.3219 | 50.0 | 0.3224 | 0.2885 | 6189 |
|  | Ye | 43.1 | 0.4637 | 0.5248 | | | | |
|  | B | 4.2 (83%) | 0.1471 | 0.0502 | | | | |
| S2 | (B) | 0.85 (17%) | 0.1471 | 0.0502 | 50.0 | 0.3083 | 0.3302 | 5514 |
|  | R2 | 7.9 | 0.6581 | 0.3219 | | | | |
|  | G | 21.3 | 0.2521 | 0.6579 | | | | |
|  | C | 14.8 | 0.152 | 0.2404 | | | | |
|  | (R1) | 5.1 (65%) | 0.6581 | 0.3219 | | | | |
|  | total | 100.0 | | | 100.0 | | | |

Before the rendering processing is carried out, the luminances, chromaticity values and color temperatures of the colors white represented by the subsets S1 and S2 are quite different from each other as can be seen from Table 1 and FIGS. 8 and 9. However, after the rendering processing has been carried out (the first red pixel R1 and the blue pixel B of the subset S1 respectively lend 65% and 17% of their own luminance to the subset S2 as can be seen from Table 2), the luminances of the colors white represented by the subsets S1 and S2 exactly agree with each other and their differences in chromaticity and color temperature have also decreased as can be seen from Table 2 and FIGS. 8 and 9.

In this manner, by carrying out the rendering processing, the differences in luminance, chromaticity and color temperature between the respective colors white represented by the two different types of subsets S1 and S2 can be narrowed. In the example described above, the difference in luminance between the colors white is supposed to be decreased first and foremost by carrying out the rendering processing. However, a higher priority can be given to the difference in chromaticity or color temperature instead. In any case, all of those differences in luminance, chromaticity and color temperature between the subsets can be narrowed by carrying out the rendering processing.

Figure 10:
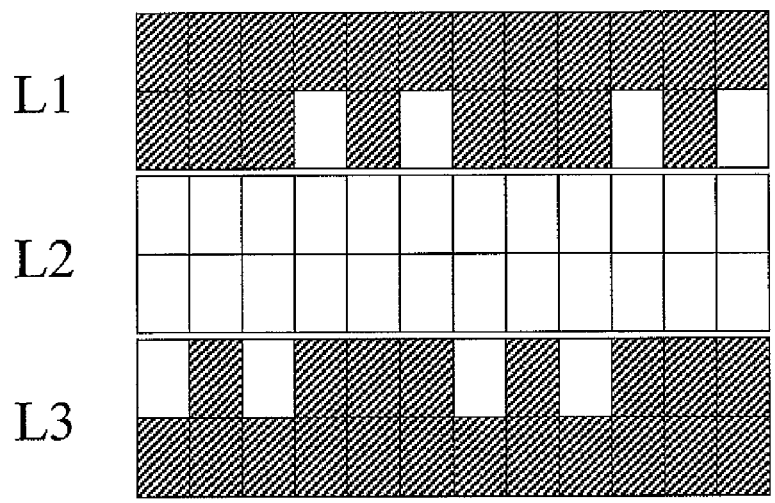
FIG. 10 illustrates what subpixels are lit by lending and borrowing a luminance as shown in FIG. 7.

Next, it will be described with reference to FIG. 10 what subpixels are lit as a result of the rendering processing. Specifically, FIG. 10 illustrates what subpixels need to be lit to display a horizontal white line on a black background using the subsets S2. In FIG. 10, the open rectangles represent lighted subpixels (i.e., subpixels in non-black display state), while the shadowed rectangles represent non-lighted subpixels (i.e., in black display state). As can be seen from FIG. 10, not only entire pixels (i.e., both of their first and second subpixels) in each subset S2 on the row L2 but also some subpixels on the rows L1 and L3 are lit so that the rendering processing for lending a luminance is carried out on a sub-pixel-by-subpixel basis.

For the purpose of comparison, it will be described what pixels are lit in a situation where the rendering processing is carried out on a multi-primary-color liquid crystal display device in which no pixel is divided into multiple subpixels. For example, if the rendering processing in which each subset S2 borrows a luminance from the first red pixel R1 and the blue pixel B of its associated subset S1 has been carried out as shown in FIG. 11, lighted pixels will be as shown in FIG. 12. As can be seen from FIG. 12, not only all pixels in each subset S2 on the row L2 but also some pixels on the row L1 are lit, and the rendering processing for lending a luminance has been carried out on a pixel-by-pixel basis. And comparing FIGS. 10 and 12 to each other, it can be seen easily that the white line displayed can look thinner, and the display operation can get done more smoothly and with higher definition, by lending and borrowing a luminance on a subpixel-by-subpixel basis as is done in this preferred embodiment.

In the example illustrated in FIG. 7, the bright subpixels of each pair of first red and blue pixels R1 and B that lend their luminance are both adjacent to its associated subset S2. In other words, to borrow a luminance from adjacent bright subpixels, each subset S2 chooses either the subset S1 that is adjacent to the subset S2 on one side in the column direction or the subset S1 that is adjacent to the subset S2 on the other side in the column direction. For example, some subsets S2 on the row L2 (such as the leftmost and third leftmost subsets S2) borrow a luminance from the subsets S1 on the lower row L3, while the other subsets S2 on the same row L2 (such as the second leftmost and rightmost subsets S2) borrow a luminance from the subsets S1 on the upper row L1. To get a display operation done more smoothly and with higher definition, the bright subpixels that lend their luminance are preferably adjacent to each subset of the second type (i.e., each subset of the second type preferably borrows a luminance from its adjacent bright subpixels).

Figure 13:
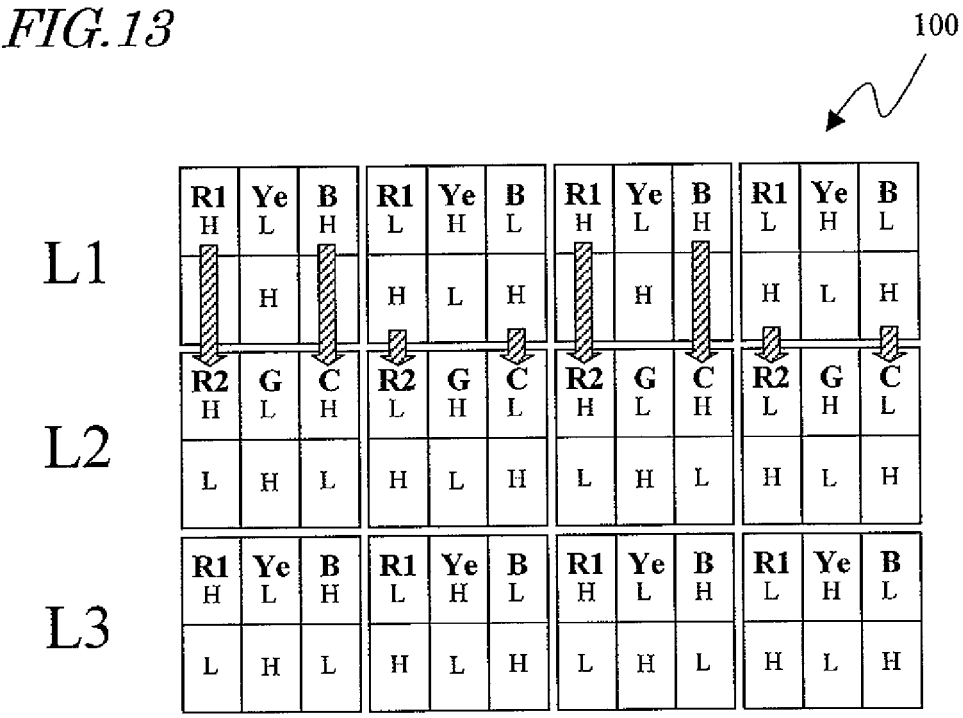
FIG. 13 schematically illustrates how to lend and borrow a luminance in the multi-primary-color liquid crystal display device 100.

Nevertheless, the second type of subset (i.e., a subset to be a luminance borrower) does not always have to borrow a luminance from its adjacent bright subpixels as shown in FIG. 13. In the example illustrated in FIG. 13, each subset S2 on the row L2 always borrows a luminance from the bright subpixels of its associated subset S1 on the row L1. That is why some subsets S2 (i.e., the second leftmost and rightmost subsets S2) on the row L2 borrow a luminance from their adjacent bright subpixels but the other subsets S2 (i.e., the leftmost and third leftmost subsets S2) on the same row L2 borrow a luminance from bright subpixels that are not adjacent to themselves.

Figure 14:
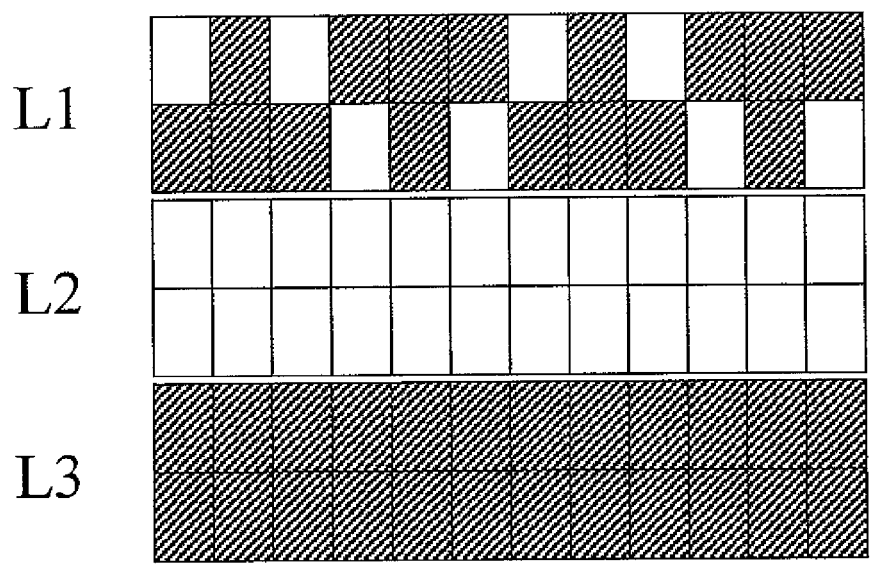
FIG. 14 illustrates what subpixels are lit by lending and borrowing a luminance as shown in FIG. 13.

FIG. 14 illustrates what subpixels will be lit when a luminance is lent and borrowed as shown in FIG. 13. As can be seen from FIG. 14, not only entire pixels (i.e., both of their first and second subpixels) in each subset S2 on the row L2 but also some subpixels in each subset S1 on the row L1 are lit, and therefore, the rendering processing for lending a luminance has also been carried out on a subpixel-by-subpixel basis. However, unlike the situation shown in FIG. 10, the lighted subpixels in the subsets S1 include not only ones adjacent to any of the subsets S2 but also ones that are not adjacent to any subset S2. Nevertheless, even if a luminance is lent and borrowed as shown in FIGS. 13 and 14, the decrease in resolution can still be less significant than a situation where a luminance is lent and borrowed on a pixel-by-pixel basis as shown in FIGS. 11 and 12.

Figure 15:
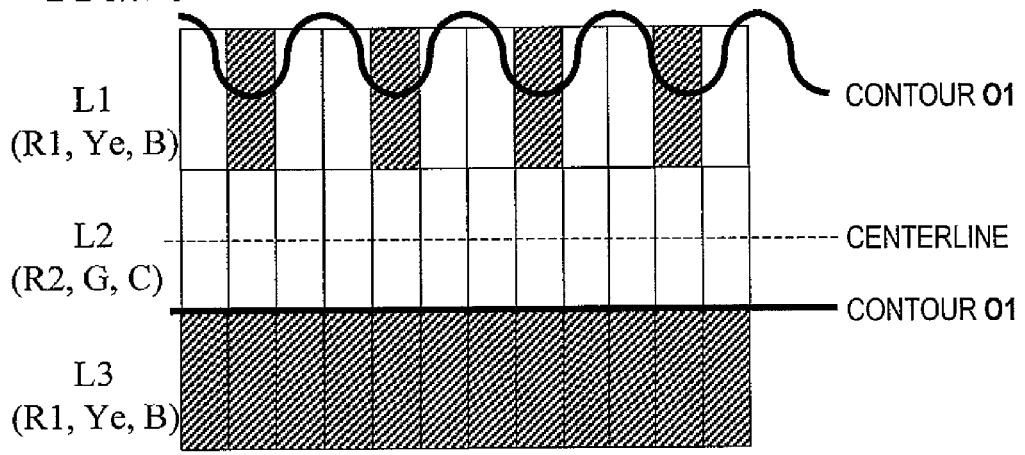
FIG. 15 illustrates the contour of a white line to be seen in the lighting state shown in FIG. 12.
Figure 16:
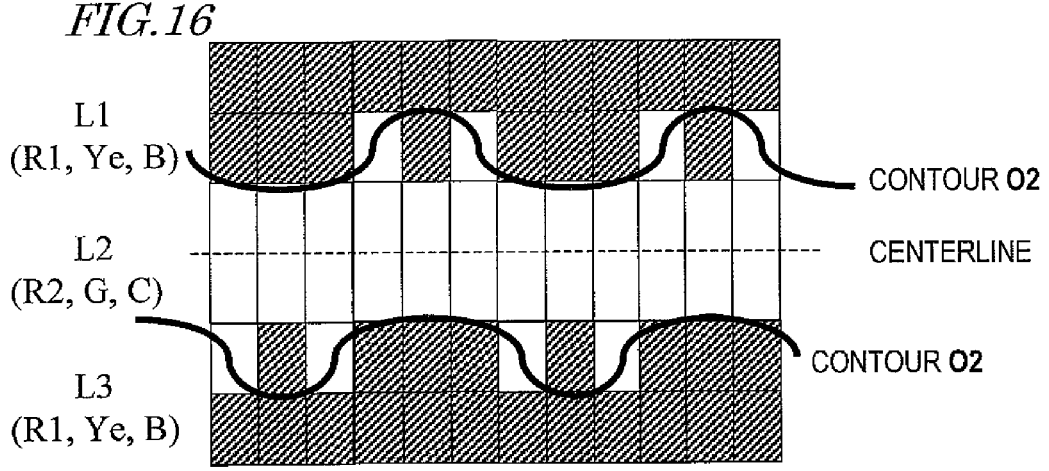
FIG. 16 illustrates the contour of a white line to be seen in the lighting state shown in FIG. 10.
Figure 17:
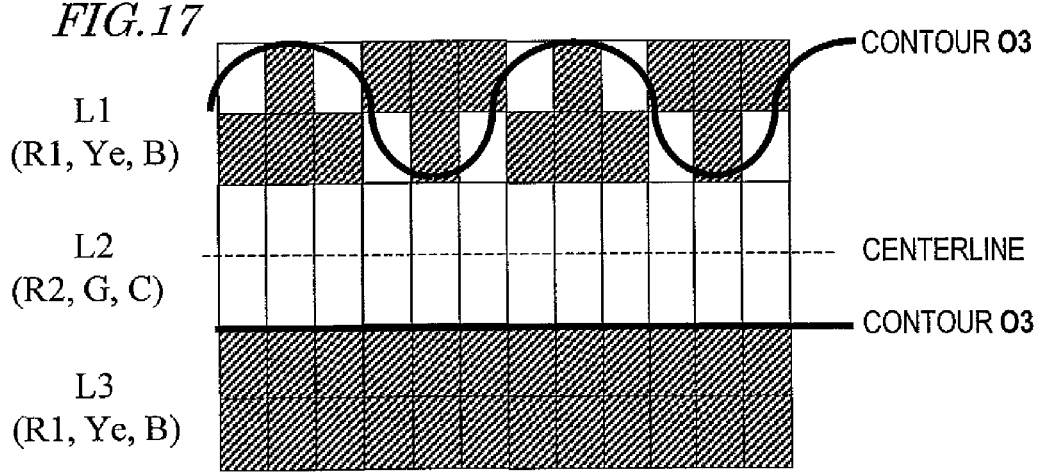
FIG. 17 illustrates the contour of a white line to be seen in the lighting state shown in FIG. 14.
Figure 18:
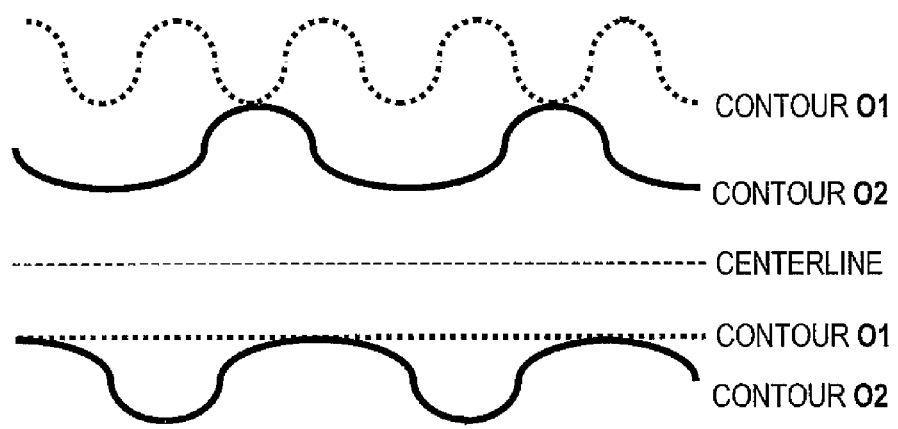
FIG. 18 illustrates, in combination, the contours O1 and O2 shown in FIGS. 15 and 16.
Figure 19:
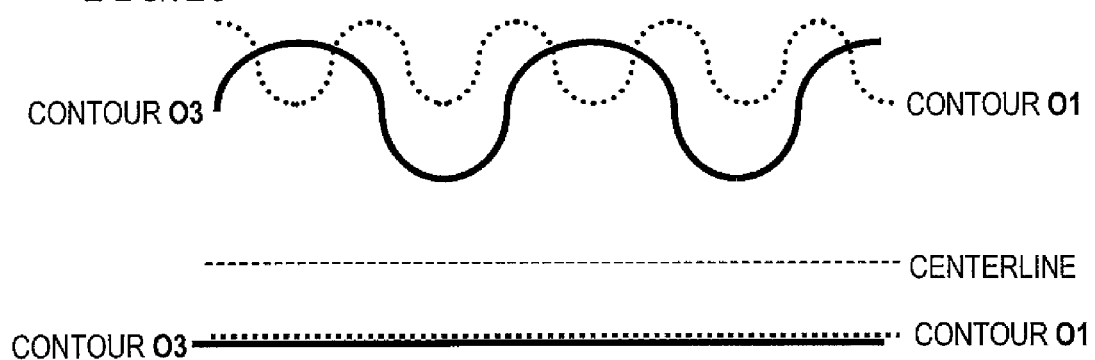
FIG. 19 illustrates, in combination, the contours O1 and O3 shown in FIGS. 15 and 17.

Such an effect of minimizing the decrease in resolution will be described more specifically with reference to FIGS. 15 through 19. FIGS. 15, 16 and 17 illustrate the contours of the white line to be seen in the lighting states shown in FIGS. 12, 10 and 14, respectively. On the other hand, FIG. 18 illustrates, in combination, the contours O1 and O2 that are shown in FIGS. 15 and 16, respectively, while FIG. 19 illustrates, in combination, the contours O1 and O3 that are shown in FIGS. 15 and 17, respectively. FIGS. 15 through 19 also show the centerline of the row L2.

Comparing the results shown in FIGS. 15 and 16 to each other by reference to FIG. 18, it can be seen that the white line displayed looks thinner by lending and borrowing a luminance on a subpixel-by-subpixel basis rather than by doing that on a pixel-by-pixel basis. The same can be said even if the results shown in FIGS. 15 and 17 are compared to each other by reference to FIG. 19. Consequently, by carrying out the rendering processing on a subpixel-by-subpixel basis, the decrease in resolution can be much less significant, and the display operation can get done far more smoothly and with much higher definition, compared to a situation where the rendering processing is carried out on a pixel-by-pixel basis.

In addition, comparing the results shown in FIGS. 16 and 17 or the ones shown in FIGS. 18 and 19 to each other, it can also be seen that if every bright subpixel to be luminance lender is adjacent to the subset S2 to be a luminance borrower, not just can the white line displayed look thinner but also can a sufficient degree of symmetry be kept with respect to the centerline. That is to say, the bright subpixel to be a luminance lender is preferably one of the first and second subpixels of a pixel in each subset of the first type (i.e., a subset including the bright subpixel to be a luminance lender) that is located closer (i.e., adjacent) to its associated subset of the second type (i.e., a subset to be luminance borrower).

Embodiment 2

Figure 20:
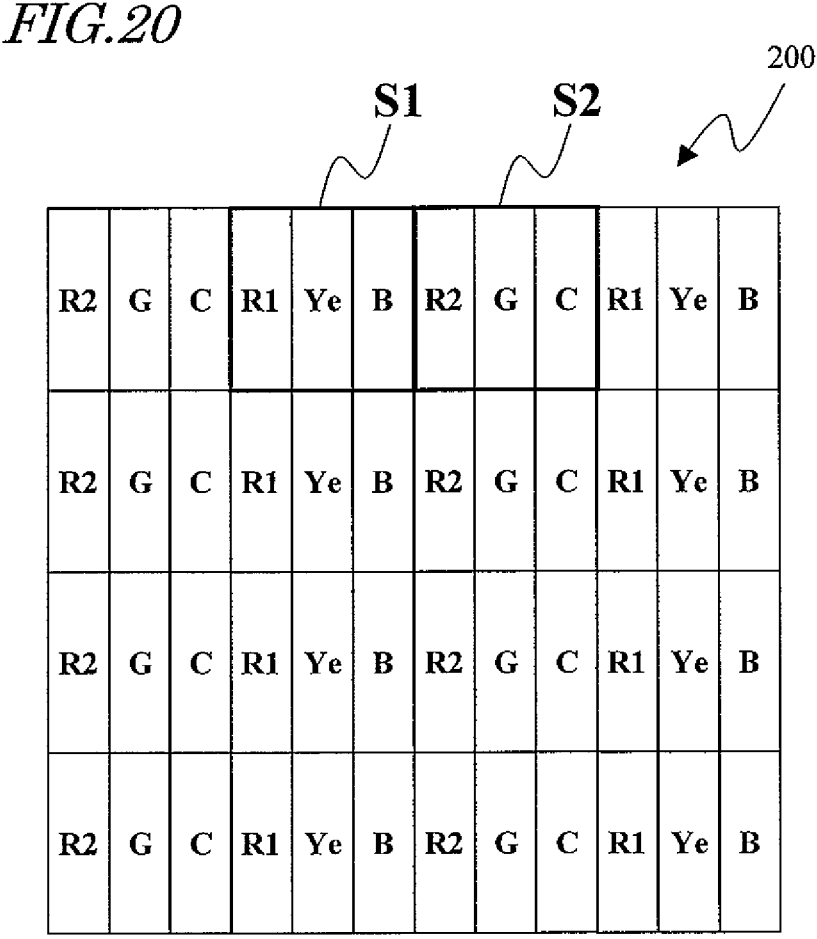
FIG. 20 illustrates a pixel arrangement for a multi-primary-color liquid crystal display device 200 as another preferred embodiment of the present invention.

FIG. 20 illustrates a pixel arrangement for an LCD (multi-primary-color liquid crystal display device) 200 as a second specific preferred embodiment of the present invention. Just like the LCD 100 shown in FIG. 1, the LCD 200 includes first and second red pixels R1, R2, green pixels G, blue pixels B, yellow pixels Ye, and cyan pixels C.

In the LCD 200, however, the first red, yellow, blue, second red, green and cyan pixels R1, Ye, B, R2, G and C are arranged cyclically within the same row so that the subsets S1 and S2 alternate with each other in the row direction. That is why even though a luminance is lent and borrowed between two subsets that are adjacent to each other in the column direction in the LCD 100, a luminance is lent and borrowed between two subsets that are adjacent to each other in the row direction in this LCD 200.

Figure 21:
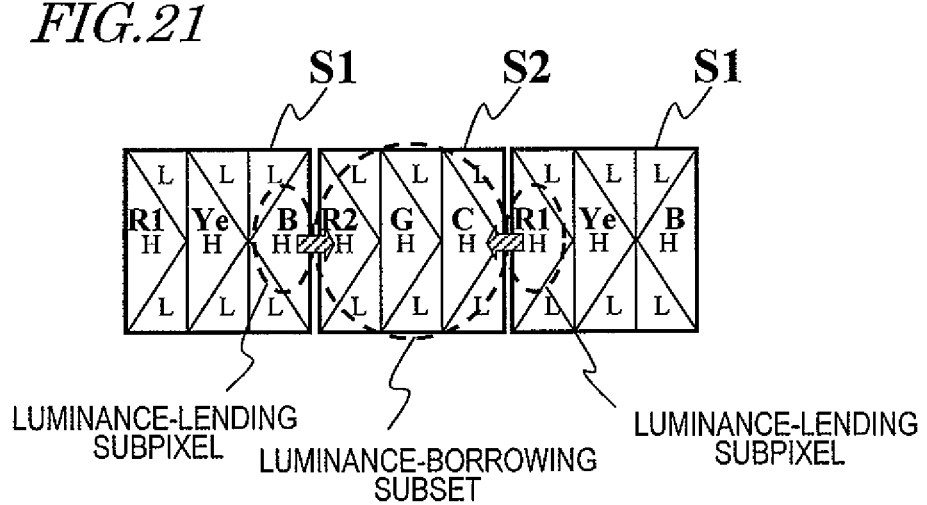
FIG. 21 schematically illustrates how to lend and borrow a luminance in the multi-primary-color liquid crystal display device 200.
Figure 22:
FIG. 22 schematically illustrates how to lend and borrow a luminance in the multi-primary-color liquid crystal display device 200.

FIGS. 21 and 22 schematically illustrate how to lend and borrow a luminance in this LCD 200. First of all, please note that the shape of the subpixels that each pixel has in this LCD 200 is different from that of the LCD 100. Specifically, although each pixel is split in the LCD 100 into two rectangular subpixels, each pixel is divided in this LCD 200 into an isosceles triangular subpixel, of which the base is defined by one of the two longer sides of the pixel, and a subpixel formed by the rest of the pixel (i.e., consisting of two right triangle). In this preferred embodiment, a display operation is conducted by using the former subpixel as a bright subpixel (identified by "H" in FIG. 21) and the latter subpixels as dark subpixels (identified by "L" in FIG. 21).

As shown in FIGS. 21 and 22, the subset S2 borrows a luminance from the respective bright subpixels of the first red pixel R1 and the blue pixel B that are included in subsets S1. More specifically, the subset S2 borrows a luminance from not only the bright subpixel of the first red pixel R1 belonging to the subset S1 on its right hand side but also the bright subpixel of the blue pixel B belonging to the subset S1 on its left hand side. In the LCD 100 of the first preferred embodiment, an arbitrary subset of the second type borrows a luminance from one of the two subsets of the first type that are adjacent to itself in one and the other sides thereof in a predetermined direction. On the other hand, in the LCD 200 of this preferred embodiment, an arbitrary subset of the second type borrows a luminance from both of the two subsets of the first type that are adjacent to itself in one and the other sides thereof in another predetermined direction.

Figure 23:
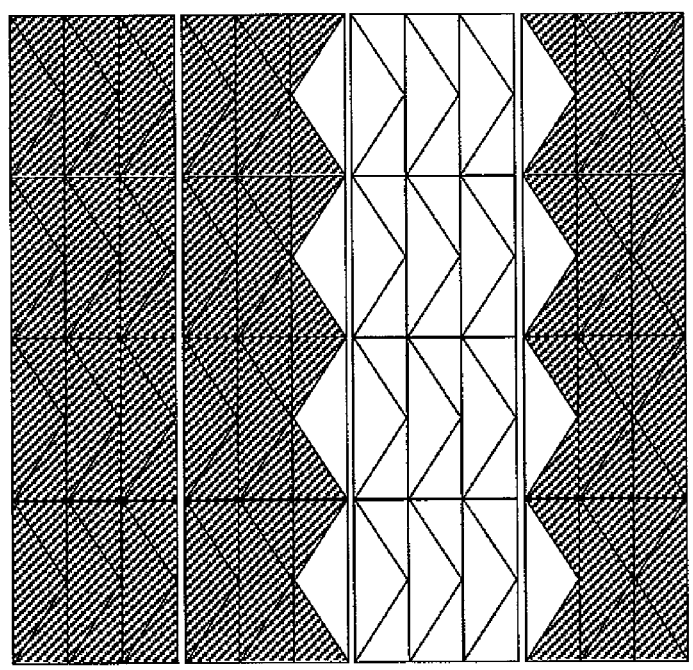
FIG. 23 illustrates what subpixels are lit by lending and borrowing a luminance as shown in FIG. 22.

FIG. 23 illustrates what subpixels need to be lit to display a vertical white line on a black background using the subsets S2. As can be seen from FIG. 23, not only entire pixels (i.e., both of their first and second subpixels) in each subset S2 on the column C3 but also some subpixels on the columns C2 and C4 are lit so that the rendering processing for lending a luminance is carried out on a subpixel-by-subpixel basis.

Figure 24:
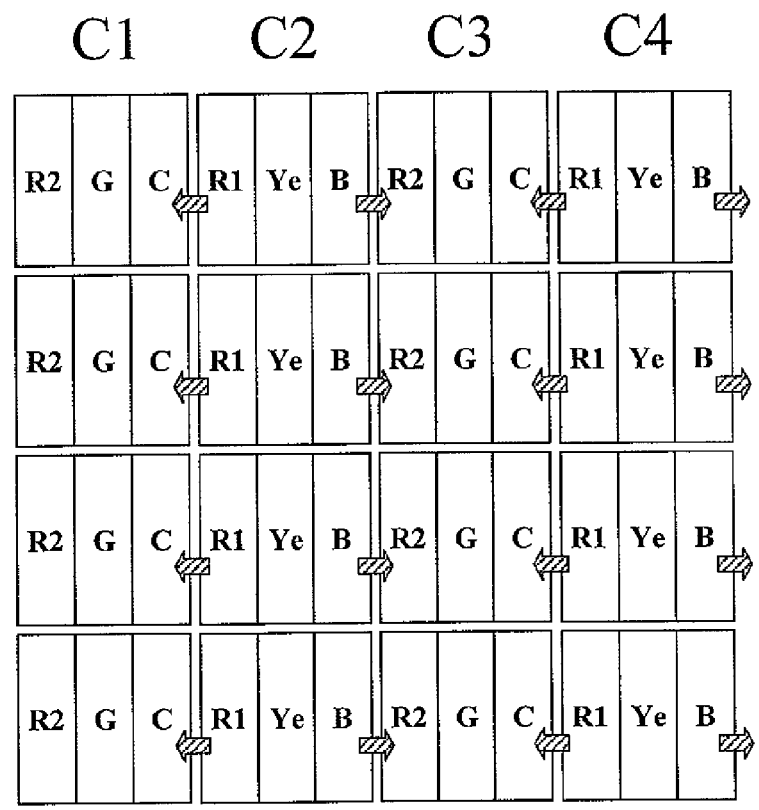
FIG. 24 schematically illustrates how to lend and borrow a luminance in a multi-primary-color liquid crystal display device, of which no pixel is divided into multiple subpixels.
Figure 25:
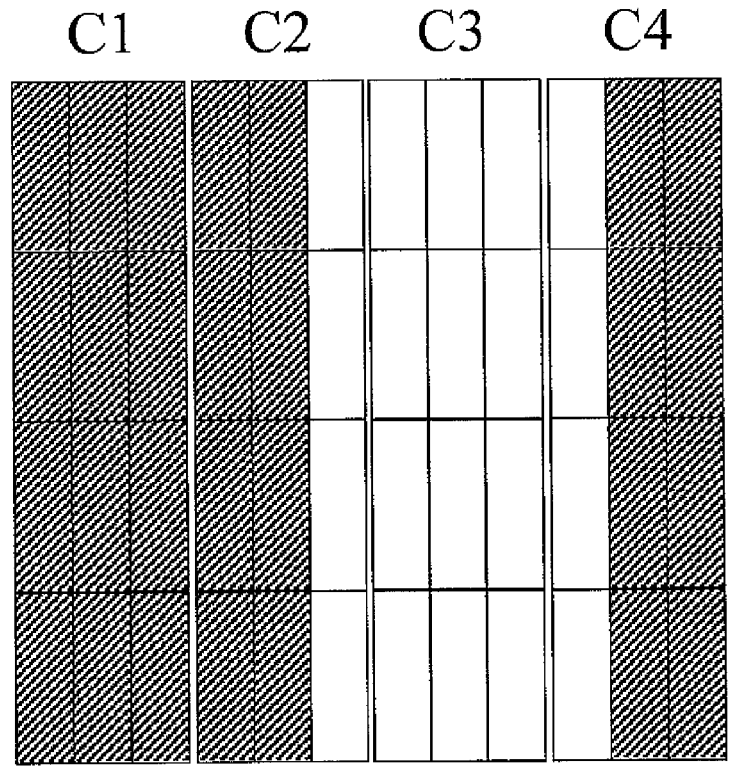
FIG. 25 illustrates what pixels are lit by lending and borrowing a luminance as shown in FIG. 24.

For the purpose of comparison, it will be described what pixels are lit in a situation where the rendering processing is carried out on a multi-primary-color liquid crystal display device in which no pixel is divided into multiple subpixels. For example, if the rendering processing in which each subset S2 borrows a luminance from the first red pixel R1 and the blue pixel B of its associated subsets S1 has been carried out as shown in FIG. 24, lighted pixels will be as shown in FIG. 25. As can be seen from FIG. 25, not only all pixels in each subset S2 on the column C3 but also some pixels on the columns C2 and C4 are lit, and the rendering processing for lending a luminance has been carried out on a pixel-by-pixel basis. And comparing FIGS. 23 and 25 to each other, it can be seen easily that the white line displayed can look thinner, and the display operation can get done more smoothly and with higher definition, by lending and borrowing a luminance on a subpixel-by-subpixel basis as is done in this preferred embodiment.

Also, in the example illustrated in FIG. 22, each of the respective luminance-lending bright subpixels of the first red and blue pixels R1 and B is adjacent to its associated subset S2. Furthermore, as for, the blue pixel B, its division pattern (i.e., a pattern that divides each pixel into multiple subpixels) is horizontally inverted compared to that of a pixel in any other color so that its bright subpixel is adjacent (i.e., located closer than its dark subpixels) to the subset S2. According to the division pattern adopted, it could sometimes be difficult to make every luminance-lending bright subpixel adjacent to a subset of the second type (i.e., a subset to be a luminance borrower). However, if mutually different division patterns are adopted for a pixel representing a particular primary color (e.g., a pixel including a luminance-lending subpixel) and for the other pixels, respectively, every luminance-lending bright subpixel can be adjacent to a subset of the second type.

Figure 26:
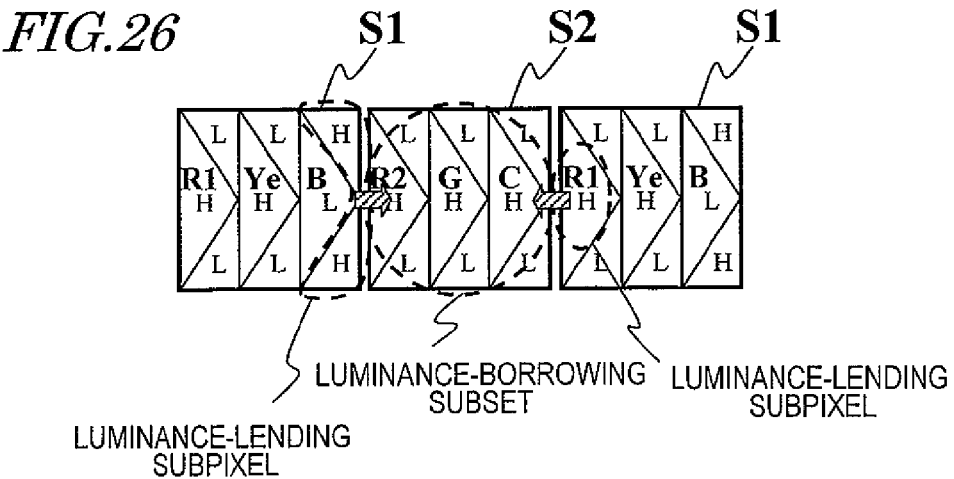
FIG. 26 schematically illustrates how to lend and borrow a luminance in the multi-primary-color liquid crystal display device 200.
Figure 27:
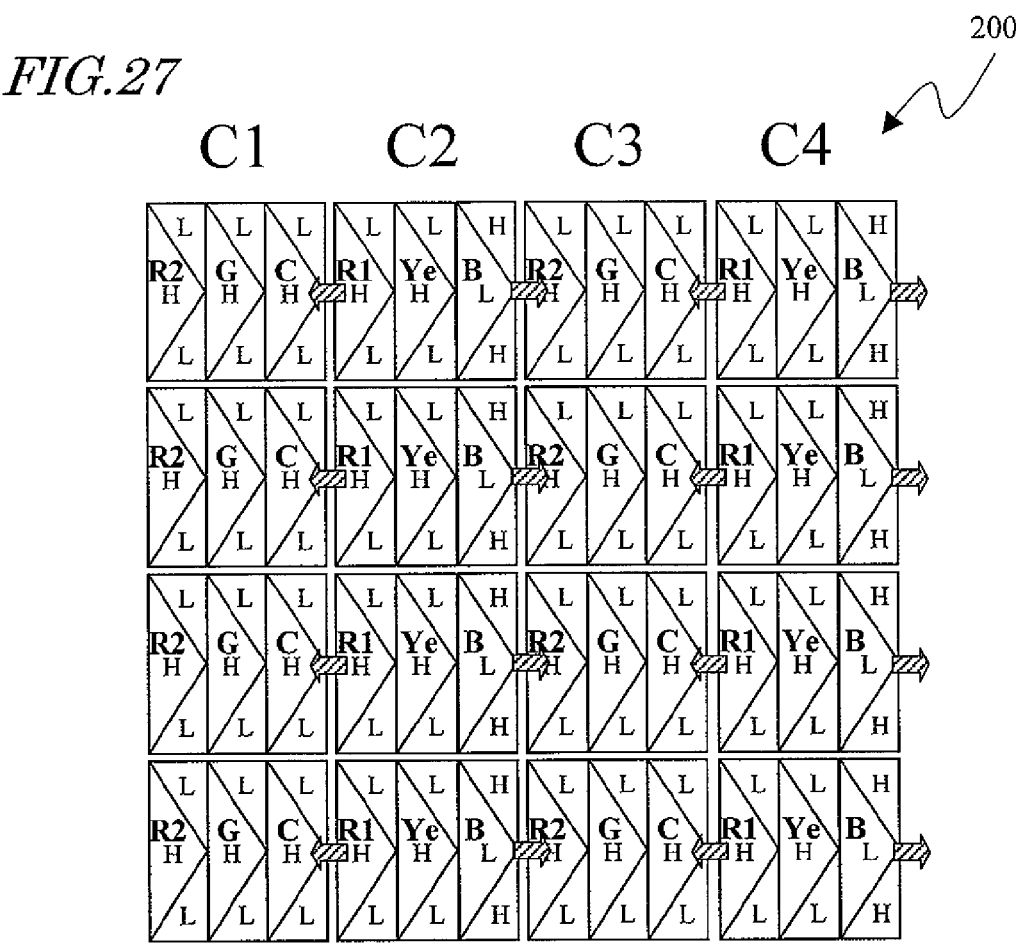
FIG. 27 schematically illustrates how to lend and borrow a luminance in the multi-primary-color liquid crystal display device 200.
Figure 28:
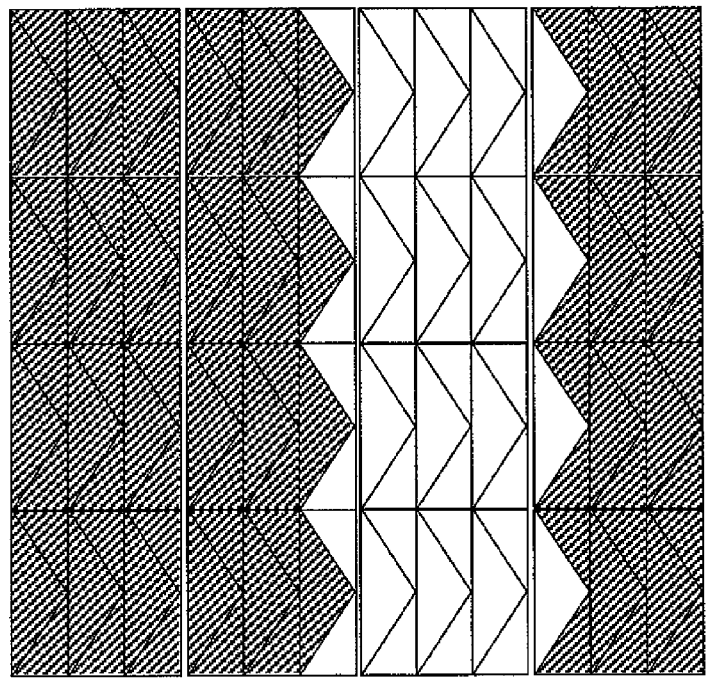
FIG. 28 illustrates what subpixels are lit by lending and borrowing a luminance as shown in FIG. 27.

Optionally, instead of inverting the division pattern of the blue pixel B, the bright and dark subpixels could be interchanged with each other only for the blue pixel B as shown in FIGS. 26 and 27. In this manner, even if the correlation between the luminance ranking and the mutually different shapes of multiple subpixels in a pixel representing a particular primary color (e.g., a pixel including a luminance-lending subpixel) is different from the other pixels, every luminance-lending bright subpixel can be adjacent to a subset of the second type. FIG. 28 illustrates what subpixels are lit in a situation where a vertical white line is displayed on a black background using the subsets S2. Comparing FIGS. 28 and 25 to each other, it can be seen that the white line also looks thinner in such a situation, too.

Figure 29:
FIG. 29 schematically illustrates how to lend and borrow a luminance in the multi-primary-color liquid crystal display device 200.

Furthermore, not both of the luminance-lending bright subpixels of the first red and blue pixels R1 and B need to be adjacent to the subset S2. Instead, the subset S2 can also borrow a luminance from a bright subpixel that is not adjacent to itself as shown in FIG. 29. In the example illustrated in FIG. 29, each bright subpixel of the first red pixel R1 is adjacent to its associated subset S2 but no bright subpixel of the blue pixel B is adjacent to any subset S2.

Figure 30:
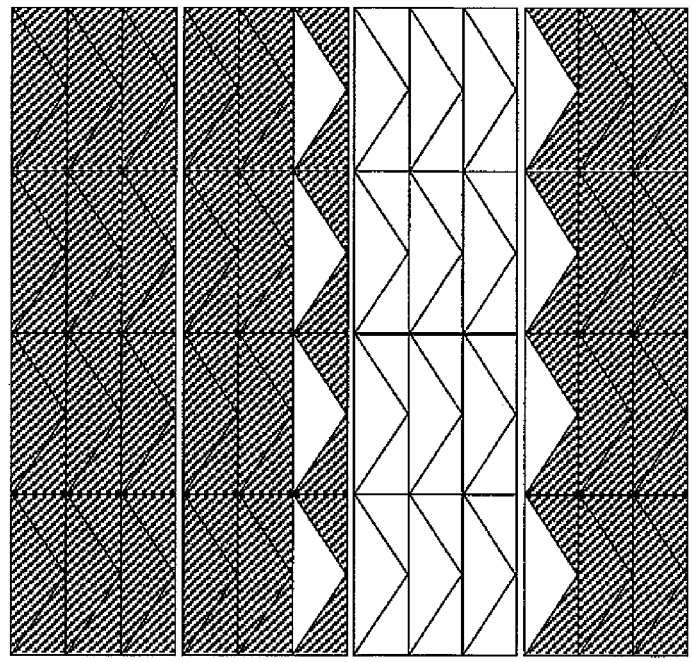
FIG. 30 illustrates what subpixels are lit by lending and borrowing a luminance as shown in FIG. 29.

FIG. 30 illustrates what subpixels are lit by lending and borrowing a luminance as shown in FIG. 29. As can be seen from FIG. 30, not only entire pixels (i.e., both of their first and second subpixels) in each subset S2 on the column C3 but also some subpixels on the columns C2 and C4 are lit so that the rendering processing for lending a luminance is carried out on a subpixel-by-subpixel basis. Unlike the examples illustrated in FIGS. 23 and 28, however, the lighted subpixels in each subset S1 include not just ones that are adjacent to its associated subset S2 but also ones that are not adjacent to the subset S2. Nevertheless, even if a luminance is lent and borrowed as shown in FIGS. 29 and 30, the decrease in resolution can still be less significant than a situation where a luminance is lent and borrowed on a pixel-by-pixel basis as shown in FIGS. 24 and 25. Naturally, to enhance the effect of checking the decrease in resolution, it is preferred that every luminance-lending bright subpixel be adjacent to a luminance-borrowing subset S2 as shown in FIGS. 22 and 23 or in FIGS. 27 and 28.

Figure 31:
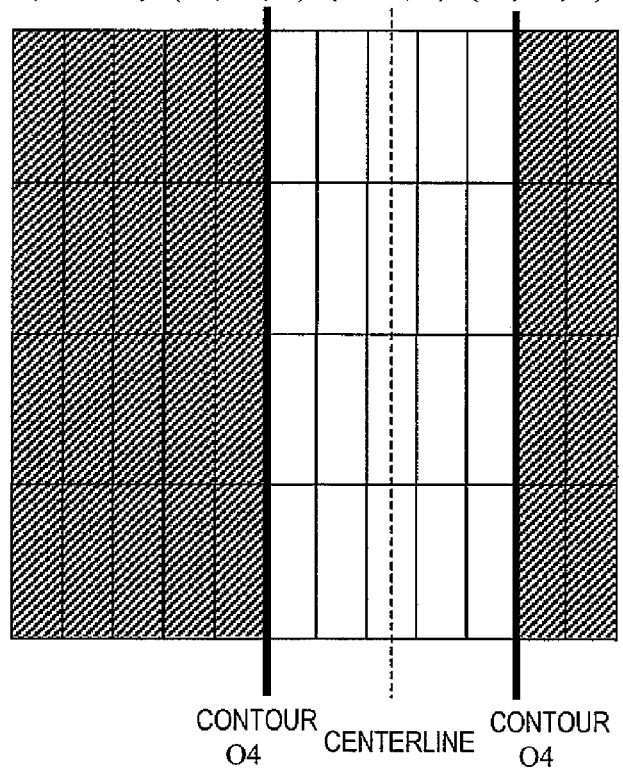
FIG. 31 illustrates the contour of a white line to be seen in the lighting state shown in FIG. 25.
Figure 32:
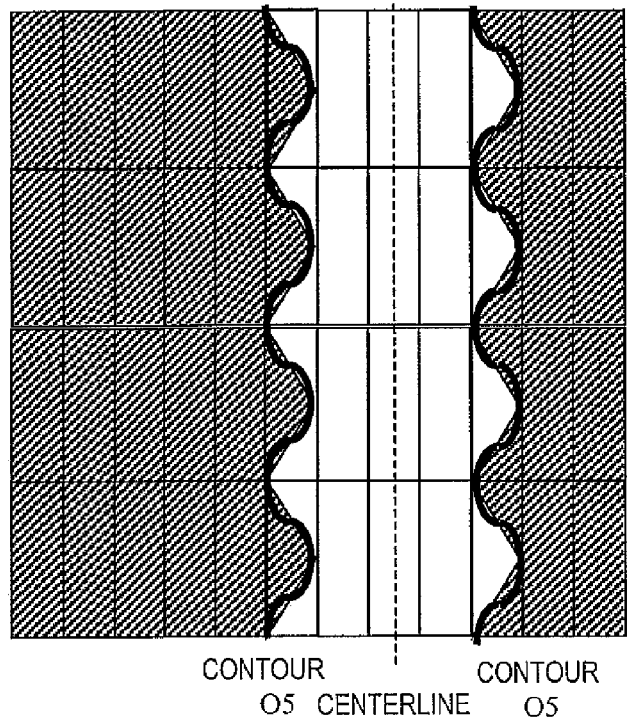
FIG. 32 illustrates the contour of a white line to be seen in the lighting state shown in FIG. 28.
Figure 33:
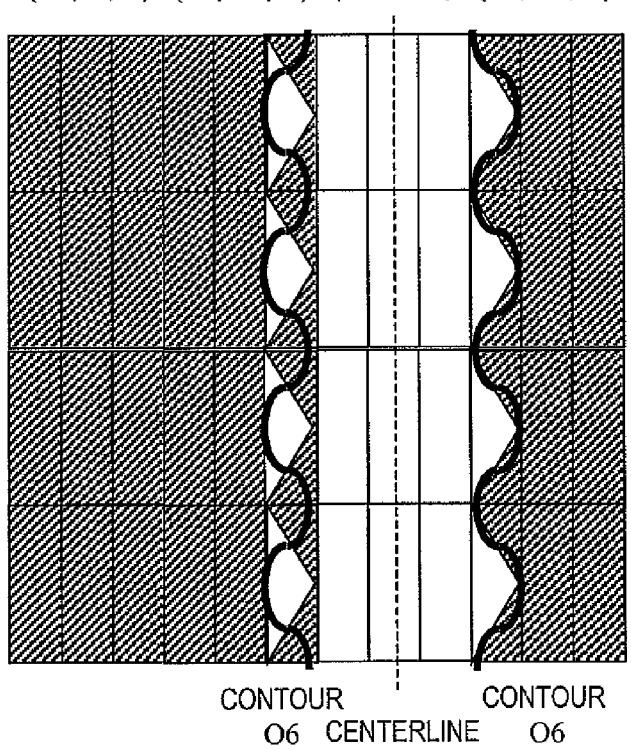
FIG. 33 illustrates the contour of a white line to be seen in the lighting state shown in FIG. 30.
Figure 34:
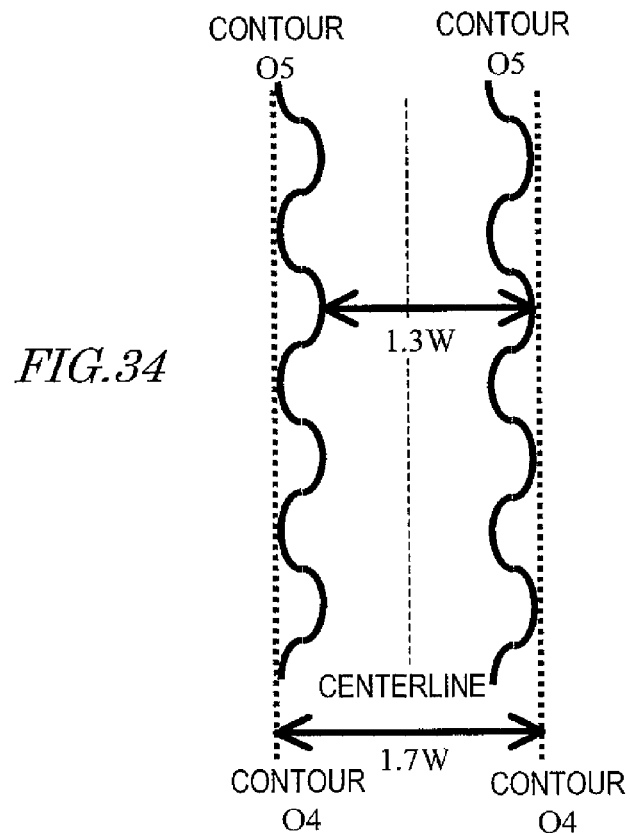
FIG. 34 illustrates, in combination, the contours O4 and O5 shown in FIGS. 31 and 32.
Figure 35:
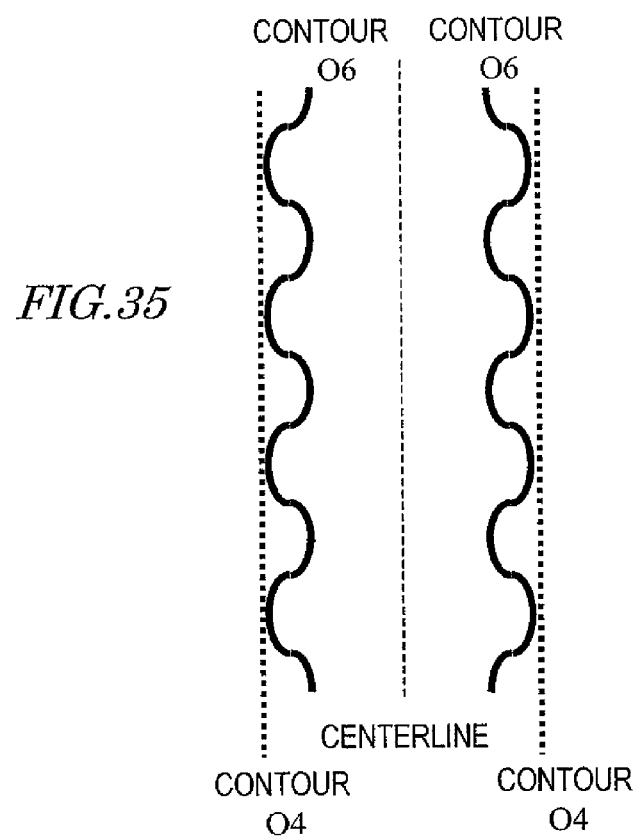
FIG. 35 illustrates, in combination, the contours O4 and O6 shown in FIGS. 31 and 33.

Such an effect will be described more specifically with reference to FIGS. 31 through 35. FIGS. 31, 32 and 33 illustrate the contours of the white line to be seen in the lighting states shown in FIGS. 25, 28 and 30, respectively. On the other hand, FIG. 34 illustrates, in combination, the contours O4 and O5 that are shown in FIGS. 31 and 32, respectively, while FIG. 35 illustrates, in combination, the contours O4 and O6 that are shown in FIGS. 31 and 33, respectively. FIGS. 31 through 35 also show the centerline of the column C3.

Comparing the results shown in FIGS. 31 and 32 to each other by reference to FIG. 34, it can be seen that the white line displayed looks thinner by lending and borrowing a luminance on a subpixel-by-subpixel basis rather than by doing that on a pixel-by-pixel basis. Specifically, supposing the width of a column of subsets is W, the white line to be seen in a situation where a luminance is lent and borrowed on a pixel-by-pixel basis will be approximately 1.7 W, but the one to be seen in a situation where a luminance is lent and borrowed on a subpixel-by-subpixel basis will be approximately 1.3 W as shown in FIG. 34. The same can be said even if the results shown in FIGS. 31 and 33 are compared to each other by reference to FIG. 35. Consequently, by carrying out the rendering processing on a subpixel-by-subpixel basis, the decrease in resolution can be much less significant, and the display operation can get done far more smoothly and with much higher definition, compared to a situation where the rendering processing is carried out on a pixel-by-pixel basis.

Figure 36:
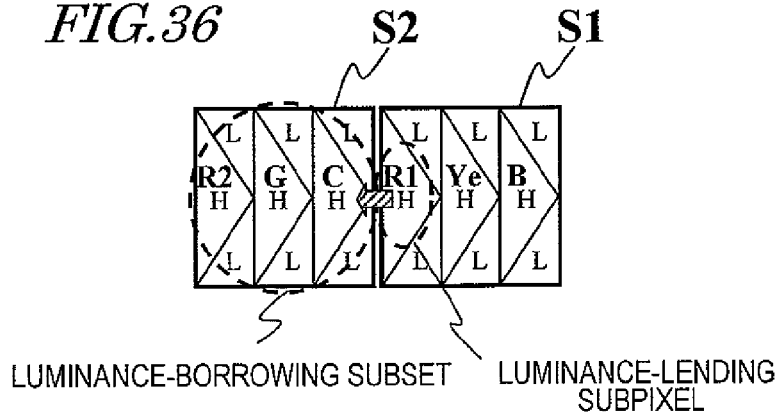
FIG. 36 schematically illustrates how to lend and borrow a luminance in the multi-primary-color liquid crystal display device 200.
Figure 37:
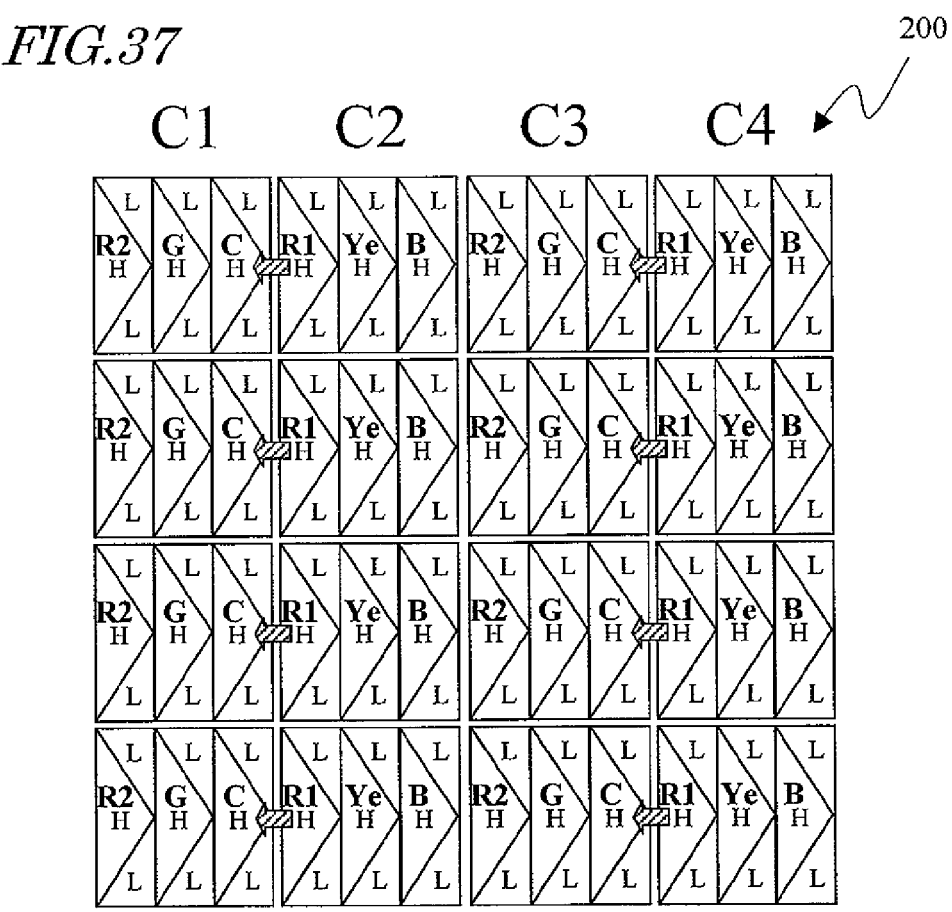
FIG. 37 schematically illustrates how to lend and borrow a luminance in the multi-primary-color liquid crystal display device 200.

It should be noted that according to this preferred embodiment, the subset S2 does not always have to borrow a luminance from both of the bright subpixels of the first red pixel R1 and the blue pixel B. For example, each subset S2 may borrow a luminance from only the bright subpixel of the first red pixel R1 belonging to its associated subset S1 but does not need to borrow a luminance from the bright subpixel of the blue pixel B as shown in FIGS. 36 and 37. In that case, it is shown in FIG. 38 what subpixels are lit in a situation where a vertical white line is displayed on a black background using the subsets S2. As can be seen from FIG. 38, not only entire pixels belonging to every subset S2 on the column C3 but also some subpixels belonging to each subset S1 on the column C4 are lit, but all subpixels belonging to every subset S1 on the column C2 are not lit.

The following Tables 3 and 4 and FIG. 39 show how the Y values and xy chromaticity values of respective pixels and the Y values (i.e., luminance values), xy chromaticity values and color temperatures of the colors white represented by the subsets S1 and S2 change before and after the rendering processing described above is carried out.

TABLE 3

| Before rendering | | Y | x | y | Y(w) | x(w) | y(w) | Tc(w)/K |
|---|---|---|---|---|---|---|---|---|
| S1 | R1 | 7.9 | 0.6581 | 0.3219 | 56.0 | 0.3340 | 0.2715 | 5360 |
|    | Ye | 43.1 | 0.4637 | 0.5248 | | | | |
|    | B  | 5.0 | 0.1471 | 0.0502 | | | | |
| S2 | R2 | 7.9 | 0.6581 | 0.3219 | 44.0 | 0.2842 | 0.3714 | 7529 |
|    | G  | 21.3 | 0.2521 | 0.6579 | | | | |
|    | C  | 14.8 | 0.152 | 0.2404 | | | | |
| total | | 100.0 | | | 100.0 | | | |

TABLE 4

| After rendering | | Y | x | y | Y(w) | x(w) | y(w) | Tc(w)/K |
|---|---|---|---|---|---|---|---|---|
| S1 | R1 | 5.4 (68%) | 0.6581 | 0.3219 | 53.5 | 0.3211 | 0.2695 | 6468 |
|    | Ye | 43.1 | 0.4637 | 0.5248 | | | | |
|    | B  | 5.0 | 0.1471 | 0.0502 | | | | |
| S2 | R2 | 7.9 | 0.6581 | 0.3219 | 46.5 | 0.3074 | 0.2683 | 6504 |
|    | G  | 21.3 | 0.2521 | 0.6579 | | | | |
|    | C  | 14.8 | 0.152 | 0.2404 | | | | |
|    | (R1) | 2.5 (32%) | 0.6581 | 0.3219 | | | | |
| total | | 100.0 | | | 100.0 | | | |

As can be seen from Tables 3 and 4 and FIG. 39, by carrying out the rendering processing (in which the first red pixel R1 in each subset S1 lends 32% of its own luminance to its associated subset S2 as shown in Table 4), the differences in luminance, chromaticity and color temperature between the respective colors white represented by the subsets S1 and S2 decreases.

Figure 40:
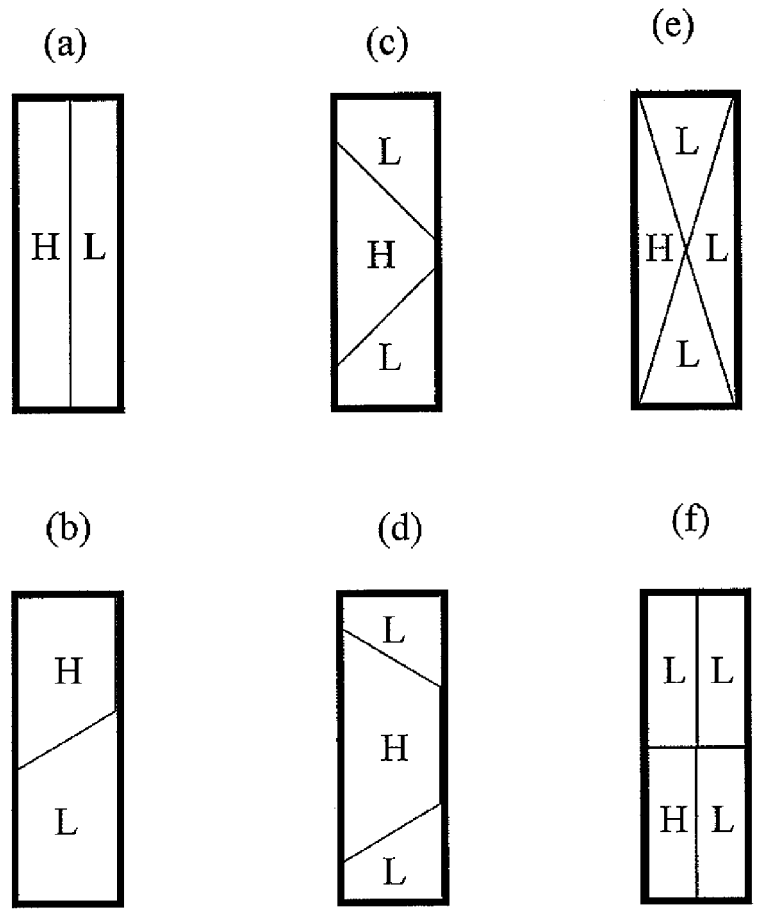
FIGS. 40(a) through (f) illustrate exemplary division patterns for respective pixels.

It should be noted that the division pattern of each pixel (including the pixel division number and the shapes of subpixels) does not have to be what has already been described but could be any of various patterns as shown in FIGS. 40(*a*) through 40(*f*). Specifically, the subpixels may have rectangular shapes as shown in FIGS. 40(*a*) and 40(*f*) or trapezoidal shapes as shown in FIGS. 40(*b*), 40(*c*) and 40(*d*) or triangular shapes as shown in FIG. 40(*e*), for example.

Figure 41:
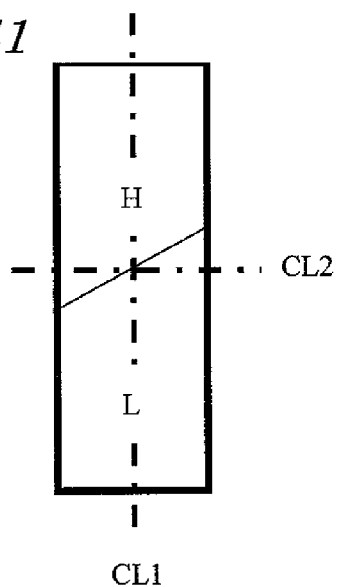
FIG. 41 illustrates what should be taken into consideration when the relative positions of a luminance-lending bright subpixel and a luminance-borrowing subset are determined.

Also, in this description, when the relative positions of a luminance-lending bright subpixel and a luminance-borrowing subset are determined, it is taken into consideration which of two portions of a bright subpixel, which are defined by drawing a centerline that divides a given pixel equally, has the greater area, and that bright subpixel is said to be "adjacent" to a subset that is located in contact with that portion of the bright subpixel with the greater area. For instance, in the example illustrated in FIG. 41, a portion of the bright subpixel on the left-hand side of the centerline CL1 has the larger area than the other portion thereof on the right-hand side of the centerline CL1, and a portion of the bright subpixel over the centerline CL2 has the larger area than the other portion thereof under the centerline CL2. That is why the bright subpixel shown in FIG. 41 is said to be adjacent to a subset on the left-hand side of the pixel and to a subset right over the pixel. Also, in the examples illustrated in FIGS. 40(*a*), 40(*c*), 40(*d*) and 40(*e*), the bright subpixel is adjacent to a subset on the left-hand side of the pixel. In the example illustrated in FIG. 40(*b*), the bright subpixel is adjacent to a subset on the left-hand side of the pixel and to a subset right over the pixel. And in the example illustrated in FIG. 40(*f*), the bright subpixel is adjacent to a subset on the left-hand side of the pixel and to a subset right under the pixel.

Embodiment 3

Figure 42:
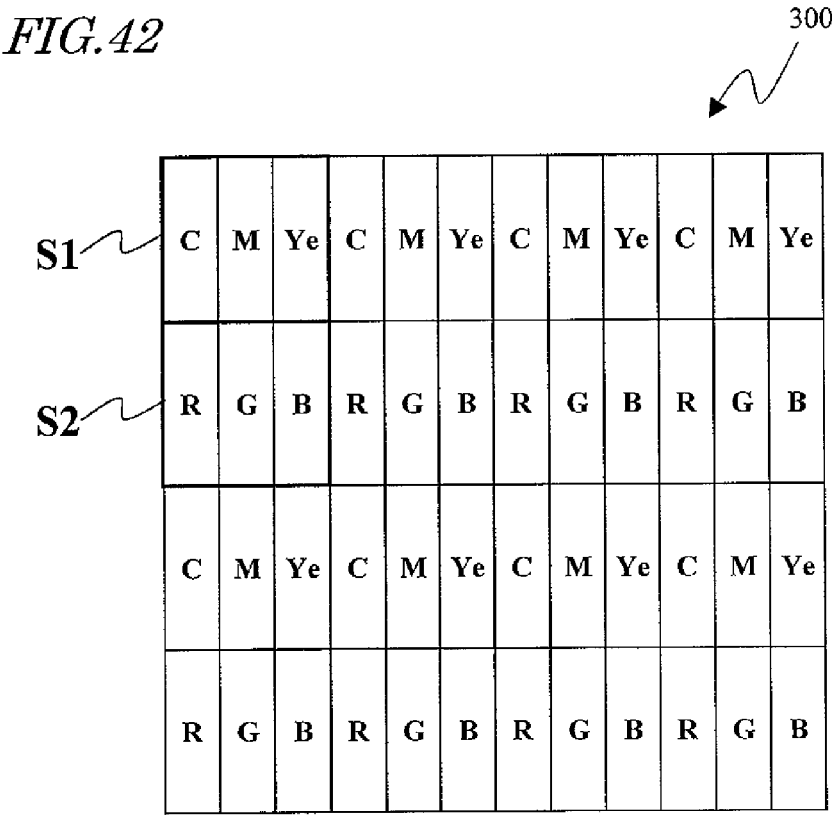
FIG. 42 illustrates a pixel arrangement for a multi-primary-color liquid crystal display device 300 as still another preferred embodiment of the present invention.

FIG. 42 illustrates an arrangement of pixels for an LCD (multi-primary-color liquid crystal display device) 300 as a third specific preferred embodiment of the present invention. As shown in FIG. 42, the LCD 300 includes red pixels R representing the color red, green pixels G representing the color green, blue pixels B representing the color blue, cyan pixels C representing the color cyan, magenta pixels M representing the color magenta, and yellow pixels Ye representing the color yellow. These pixels can form a number of subsets S1, each including cyan, magenta and yellow pixels C, M and Ye, and a number of subsets S2, each including red, green and blue pixels R, G and B. In this preferred embodiment, rows of pixels in which cyan, magenta and yellow pixels C, M and Ye are arranged cyclically and rows of pixels in which red, green and blue pixels R, G and B are arranged cyclically alternate with each other in the column direction. Thus, a number of subsets S1 or S2 of the same type are arranged continuously in the row direction, while these two different types of subsets S1 and S2 are arranged alternately in the column direction.

Figure 43:
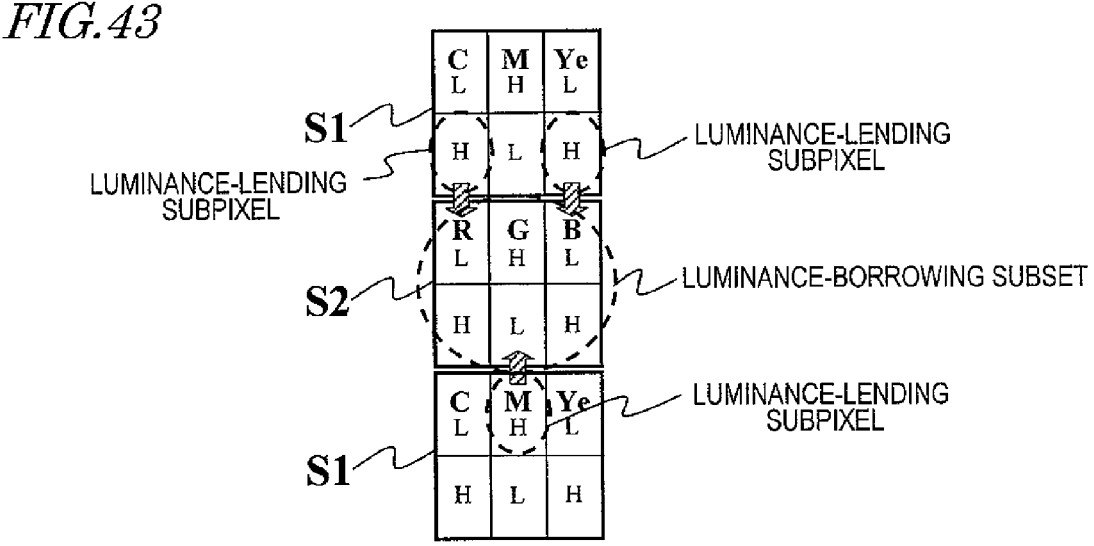
FIG. 43 schematically illustrates how to lend and borrow a luminance in the multi-primary-color liquid crystal display device 300.
Figures 44, 45:
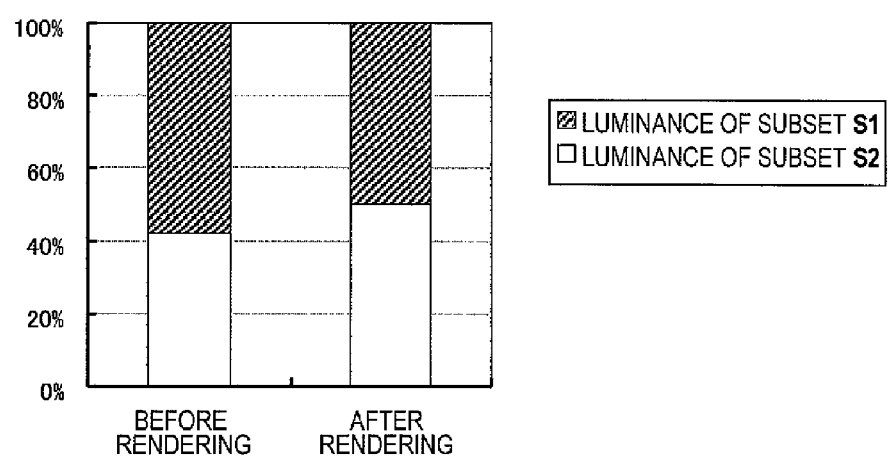
FIG. 44 schematically illustrates how to lend and borrow a luminance in the multi-primary-color liquid crystal display device 300.
FIG. 45 is a graph showing how the Y (luminance) values of respective colors white represented by subsets S1 and S2 change before and after the rendering processing (in which a luminance is lent and borrowed) is performed as shown in FIG. 44.

FIGS. 43 and 44 schematically illustrate how to lend and borrow a luminance in this LCD 300. As shown in FIGS. 43 and 44, each subset S2 borrows a luminance from respective bright subpixels of cyan, magenta and yellow pixels C, M and Ye belonging to its associated subsets S1. More specifically, each subset S2 not only borrows a luminance from the bright subpixels of cyan and yellow pixels C and Ye belonging to a subset S1 that is located on one side (i.e., over or under) of the subset S2 but also borrows a luminance from the bright subpixel of a magenta pixel M belonging to a subset S1 that is located on the other side. That is to say, in the LCD 300 of this preferred embodiment, an arbitrary subset of the second type borrows a luminance from both of two subsets of the first type that are adjacent to itself on one and the other sides thereof in a predetermined direction.

Figure 46:
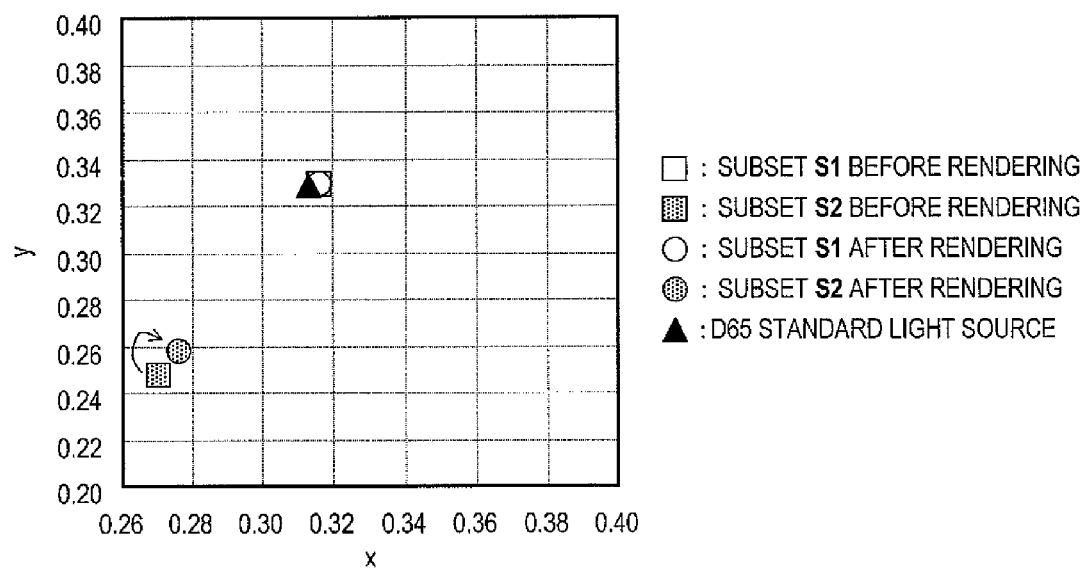
FIG. 46 is a graph showing how the xy chromaticity values of respective colors white represented by subsets S1 and S2 change before and after the rendering processing (in which a luminance is lent and borrowed) is performed as shown in FIG. 44.

The following Tables 5 and 6 and FIGS. 45 and 46 show how the Y values and xy chromaticity values of respective pixels and the Y values (i.e., luminance values), xy chromaticity values and color temperatures of the colors white represented by the subsets S1 and S2 change before and after the rendering processing described above is carried out.

TABLE 5

| Before rendering | | Y | x | y | Y(w) | x(w) | y(w) | Tc(w)/K |
|---|---|---|---|---|---|---|---|---|
| S1 | C | 13.4 | 0.1600 | 0.2800 | 58.1 | 0.3106 | 0.3298 | 6322 |
|  | M | 11.2 | 0.3200 | 0.1720 |  |  |  |  |
|  | Ye | 33.5 | 0.4300 | 0.5300 |  |  |  |  |
| S2 | R | 11.3 | 0.6300 | 0.3150 | 41.9 | 0.2703 | 0.2479 | 16309 |
|  | G | 25.0 | 0.2400 | 0.6280 |  |  |  |  |
|  | B | 5.6 | 0.1450 | 0.0600 |  |  |  |  |
|  | total | 100.0 |  |  | 100.0 |  |  |  |

TABLE 6

| After rendering | | Y | x | y | Y(w) | x(w) | y(w) | Tc(w)/K |
|---|---|---|---|---|---|---|---|---|
| S1 | R1 | 11.5 (86%) | 0.1600 | 0.2800 | 50.0 | 0.3160 | 0.3298 | 6322 |
|  | Ye | 9.6 (86%) | 0.3200 | 0.1720 |  |  |  |  |
|  | B | 28.8 (86%) | 0.4300 | 0.5300 |  |  |  |  |
| S2 | R | 11.3 | 0.6300 | 0.3150 | 50.0 | 0.2761 | 0.2583 | 13135 |
|  | G | 25.0 | 0.2400 | 0.6280 |  |  |  |  |
|  | B | 5.6 | 0.1450 | 0.0600 |  |  |  |  |
|  | (C) | 1.9 (14%) | 0.1600 | 0.2800 |  |  |  |  |
|  | (M) | 1.6 (14%) | 0.3200 | 0.1720 |  |  |  |  |
|  | (Ye) | 4.7 (14%) | 0.4300 | 0.5300 |  |  |  |  |
|  | total | 100.0 |  |  | 100.0 |  |  |  |

Before the rendering processing is carried out, the luminances, chromaticity values and color temperatures of the colors white represented by the subsets S1 and S2 are quite different from each other as can be seen from Table 5 and FIGS. 45 and 46. However, after the rendering processing has been carried out (the cyan, magenta and yellow pixels C, M and Ye of the subset S1 lend 14% of their own luminance to the subset S2 as can be seen from Table 6), the luminances of the colors white represented by the subsets S1 and S2 exactly agree with each other and their differences in chromaticity and color temperature have also decreased as can be seen from Table 6 and FIGS. 45 and 46.

Figure 47:
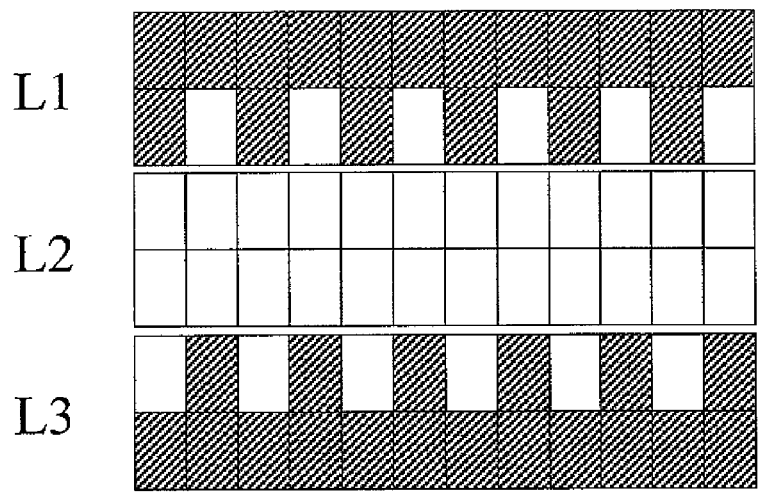
FIG. 47 illustrates what subpixels are lit by lending and borrowing a luminance as shown in FIG. 44.

FIG. 47 illustrates what subpixels need to be lit to display a horizontal white line on a black background using the subsets S2. As can be seen from FIG. 47, not only entire pixels (i.e., both of their first and second subpixels) in each subset S2 on the row L2 but also some subpixels on the rows L1 and L3 are lit so that the rendering processing for lending a luminance is carried out on a subpixel-by-subpixel basis.

Figure 48:
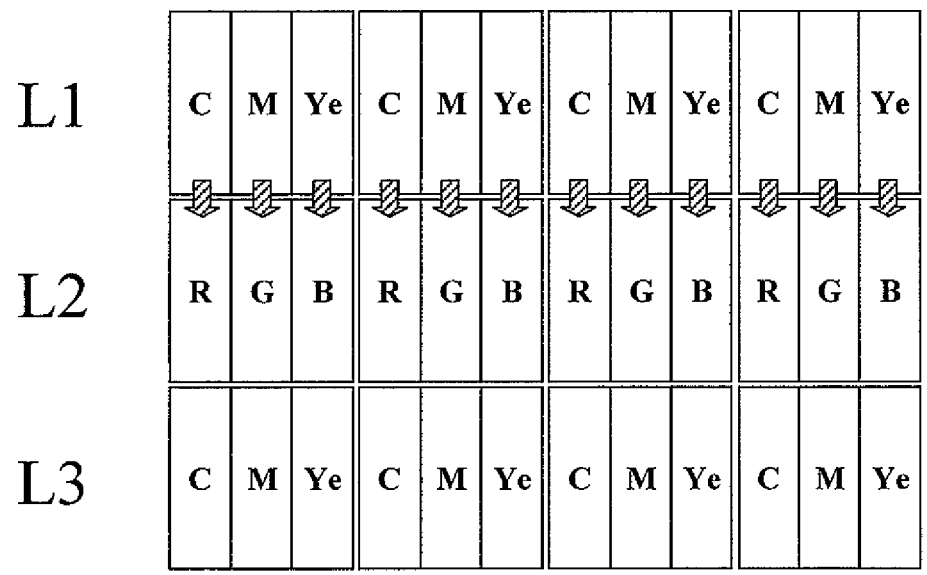
FIG. 48 schematically illustrates how to lend and borrow a luminance in a multi-primary-color liquid crystal display device, of which no pixel is divided into multiple subpixels.
Figure 49:
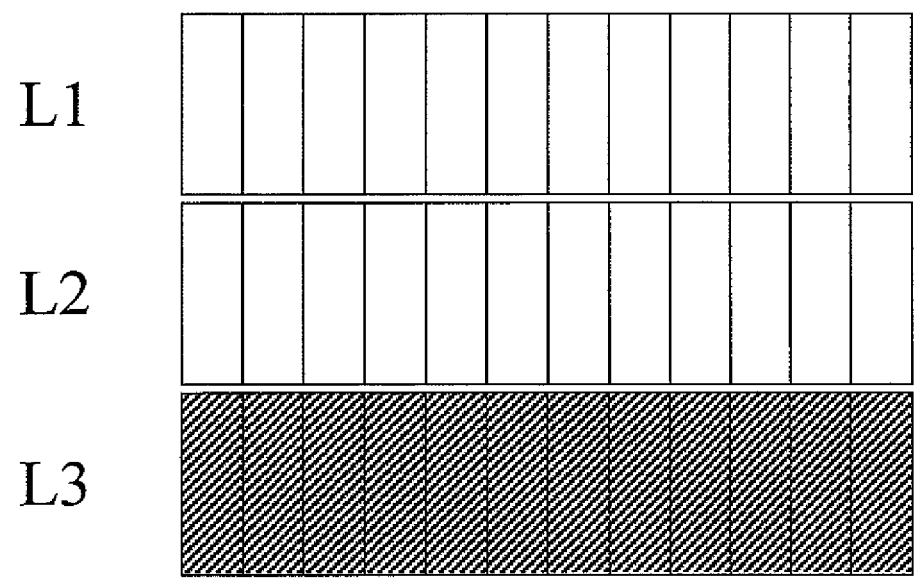
FIG. 49 illustrates what pixels are lit by lending and borrowing a luminance as shown in FIG. 48.

For the purpose of comparison, it will be described what pixels are lit in a situation where the rendering processing is carried out on a multi-primary-color liquid crystal display device in which no pixel is divided into multiple subpixels. For example, if the rendering processing in which each subset S2 borrows a luminance from the cyan, magenta and yellow pixels C, M and Ye of its associated subset S1 has been carried out as shown in FIG. 48, lighted pixels will be as shown in FIG. 49. As can be seen from FIG. 49, not only all pixels in each subset S2 on the row L2 but also all pixels in each subset S1 on the row L1 are lit, and the rendering processing for lending a luminance has been carried out on a pixel-by-pixel basis. And comparing FIGS. 47 and 49 to each other, it can be seen easily that the white line displayed can look thinner, and the display operation can get done more smoothly and with higher definition, by lending and borrowing a luminance on a subpixel-by-subpixel basis as is done in this preferred embodiment.

Figure 50:
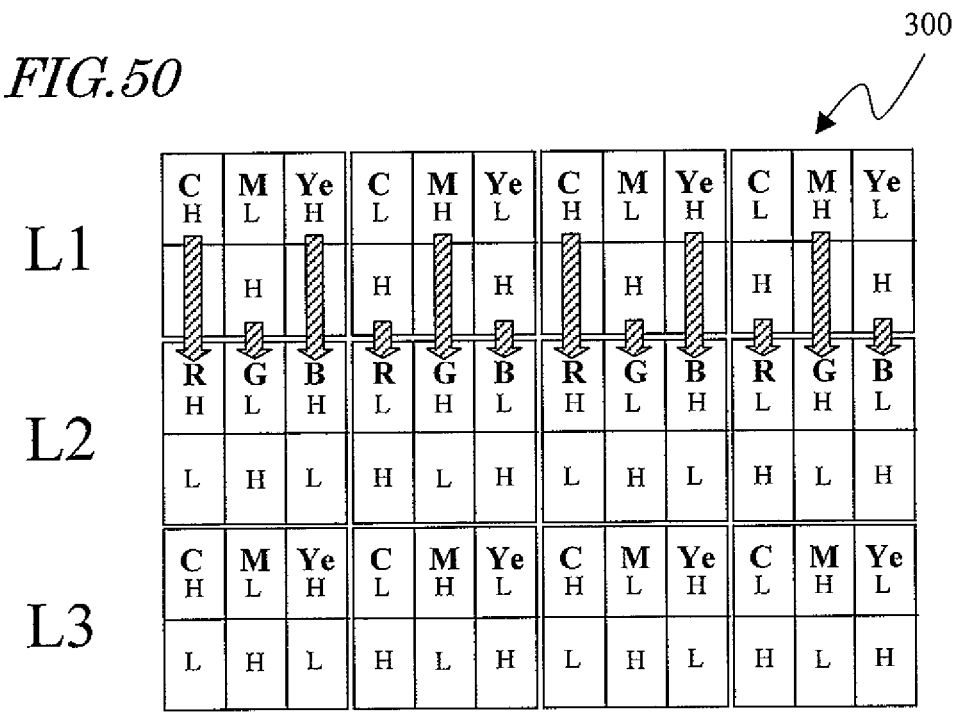
FIG. 50 schematically illustrates how to lend and borrow a luminance in the multi-primary-color liquid crystal display device 300.

In the example illustrated in FIG. 44, the bright subpixels of each set of cyan, magenta and yellow pixels C, M and Ye that lend their luminance are all adjacent to its associated subset S2. Instead, the subset S2 can also borrow a luminance from a bright subpixel that is not adjacent to itself as shown in FIG. 50. In the example illustrated in FIG. 50, looking at a certain subset S2, either the respective bright subpixels of the cyan and yellow pixels C and Ye or that of the magenta pixel M are/is adjacent to the subset S2 but the other subpixel(s) is/are not.

Figure 51:
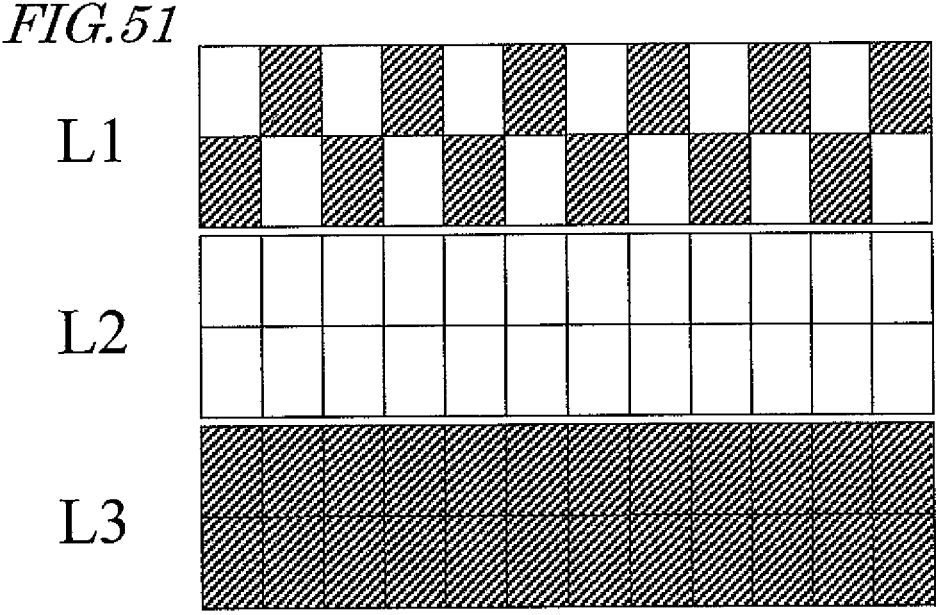
FIG. 51 illustrates what subpixels are lit by lending and borrowing a luminance as shown in FIG. 50.

FIG. 51 illustrates what subpixels are lit by lending and borrowing a luminance as shown in FIG. 50. As can be seen from FIG. 51, not only entire pixels (i.e., both of their first and second subpixels) in each subset S2 on the row L2 but also some subpixels in its associated subset S1 on the row L1 are lit so that the rendering processing for lending a luminance is carried out on a subpixel-by-subpixel basis. Unlike the example illustrated in FIG. 47, however, the lighted subpixels in each subset S1 include not just ones that are adjacent to its associated subset S2 but also ones that are not adjacent to the subset S2. Nevertheless, even if a luminance is lent and borrowed as shown in FIGS. 50 and 51, the decrease in resolution can still be less significant than a situation where a luminance is lent and borrowed on a pixel-by-pixel basis as shown in FIGS. 48 and 49. Naturally, to enhance the effect of checking the decrease in resolution, it is preferred that every luminance-lending bright subpixel be adjacent to a luminance-borrowing subset S2 as shown in FIGS. 44 and 47.

Embodiment 4

Figure 52:
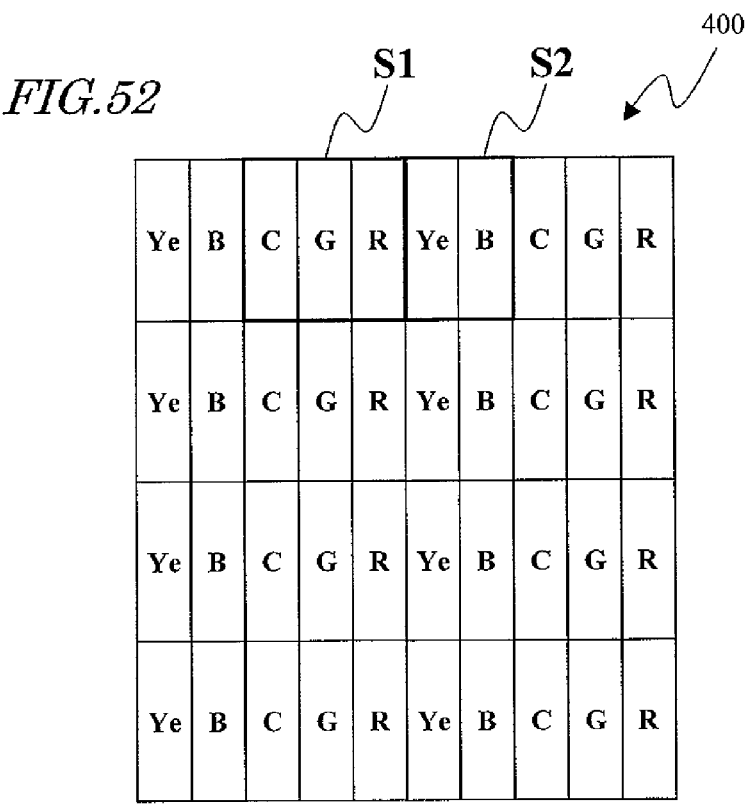
FIG. 52 illustrates a pixel arrangement for a multi-primary-color liquid crystal display device 400 as yet another preferred embodiment of the present invention.

FIG. 52 illustrates an arrangement of pixels for an LCD (multi-primary-color liquid crystal display device) 400 as a fourth specific preferred embodiment of the present invention. As shown in FIG. 52, the LCD 400 includes red pixels R representing the color red, green pixels G representing the color green, blue pixels B representing the color blue, cyan pixels C representing the color cyan, and yellow pixels Ye representing the color yellow. These pixels can form a number of subsets S1, each including red, green and cyan pixels R, G and C, and a number of subsets S2, each including blue and yellow pixels B and Ye. In this preferred embodiment, cyan, green, red, yellow and blue pixels C, G, R, Ye and B are cyclically arranged in this order within the same row so that the subsets S1 and S2 alternate with each other in the row direction.

Figure 53:
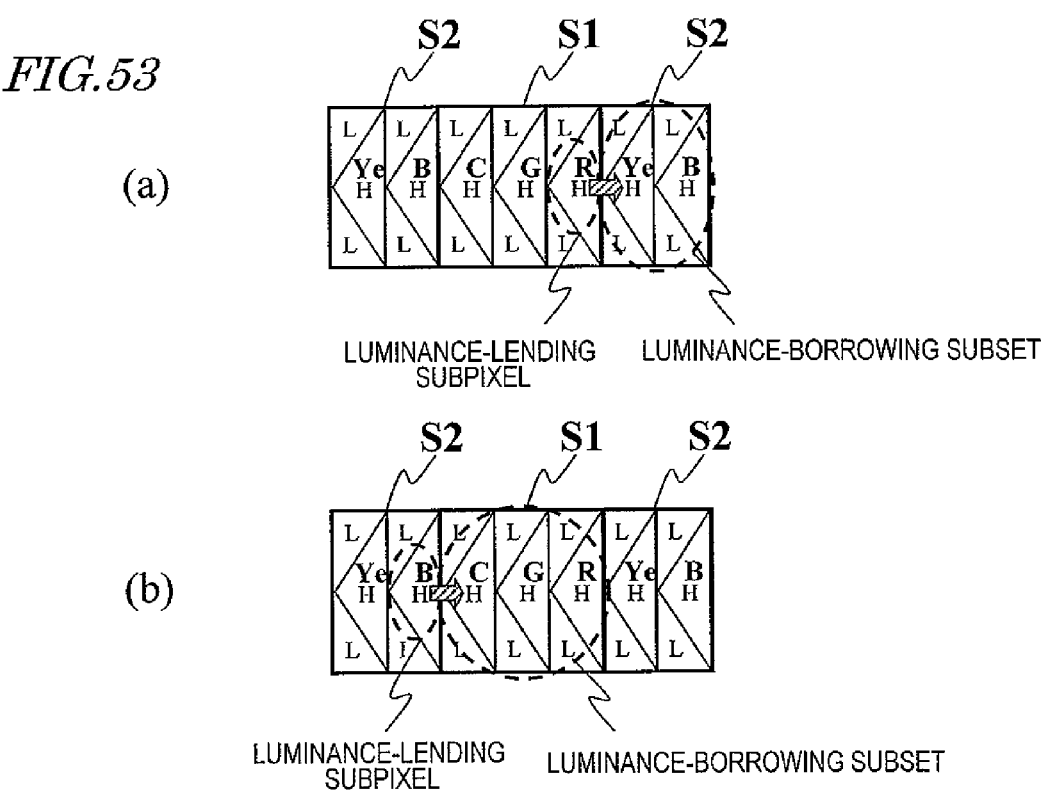
FIGS. 53(a) and 53(b) schematically illustrate how to lend and borrow a luminance in the multi-primary-color liquid crystal display device 400.

FIGS. 53 and 54 schematically illustrate how to lend and borrow a luminance in this LCD 400. As shown in FIGS. 53(*a*) and 54, each subset S2 borrows a luminance from the bright subpixel of the red pixel R belonging to its associated subset S1. In addition, as shown in FIGS. 53(*b*) and 54, each subset S1 borrows a luminance from the bright subpixel of the blue pixel B belonging to its associated subset S2. In the LCDs 100, 200 and 300 of the first, second and third preferred embodiments described above, one of the two different types of subsets borrows a luminance from the other type of subset one-sidedly. In the LCD 400 of this preferred embodiment, however, the two different types of subsets mutually lend and borrow a luminance to/from each other. Specifically, in the example illustrated in FIG. 53(*a*), the subset S1 is the "first type of subset" to lend a luminance, while the subset S2 is the "second type of subset" to borrow a luminance. Conversely, in the example illustrated in FIG. 53(*b*), the subset S2 is the "first type of subset" to lend a luminance, while the subset S1 is the "second type of subset" to borrow a luminance.

Figure 55:
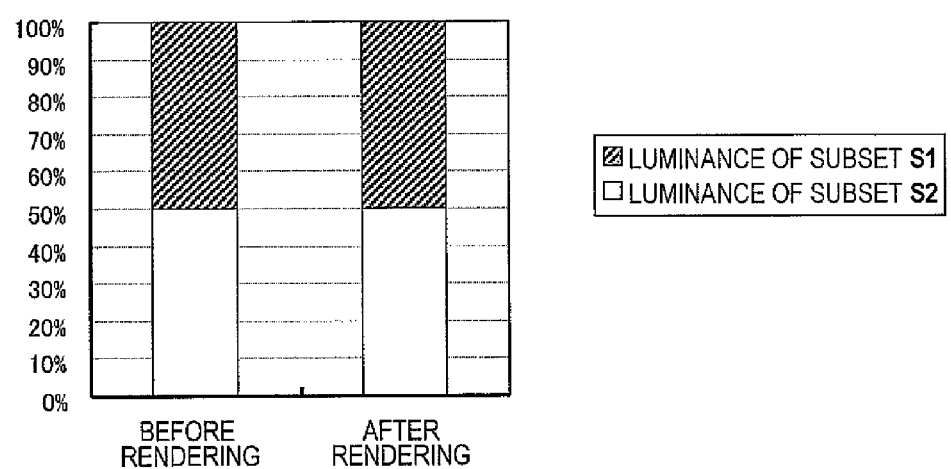
FIG. 55 is a graph showing how the Y (luminance) values of respective colors white represented by subsets S1 and S2 change before and after the rendering processing (in which a luminance is lent and borrowed) is performed as shown in FIG. 54.

The following Tables 7 and 8 and FIGS. 55 and 56 show how the Y values and xy chromaticity values of respective pixels and the Y values (i.e., luminance values), xy chromaticity values and color temperatures of the colors white represented by the subsets S1 and S2 change before and after the rendering processing described above is carried out.

TABLE 7

| Before rendering | | Y | x | y | Y(w) | x(w) | y(w) | Tc(w)/K |
|---|---|---|---|---|---|---|---|---|
| S1 | R | 12.5 | 0.6600 | 0.3235 | 49.8 | 0.3305 | 0.3818 | 5567 |
|  | G | 21.1 | 0.2578 | 0.6622 | | | | |
|  | C | 16.2 | 0.1567 | 0.2703 | | | | |
| S2 | Ye | 44.5 | 0.5198 | 0.0098 | 50.2 | 0.2913 | 0.2618 | 10285 |
|  | B | 5.7 | 0.0537 | 0.7994 | | | | |
| total | | 100.0 | | | 100.0 | | | |

TABLE 8

| After rendering | | Y | x | y | Y(w) | x(w) | y(w) | Tc(w)/K |
|---|---|---|---|---|---|---|---|---|
| S1 | (B) | 0.97 (17%) | 0.0537 | 0.7994 | 49.9 | 0.3017 | 0.3423 | 6984 |
|  | R | 11.6 (93%) | 0.6600 | 0.3235 | | | | |
|  | G | 21.1 | 0.2578 | 0.6622 | | | | |
|  | C | 16.2 | 0.1567 | 0.2703 | | | | |
| S2 | (R) | 0.88 (7%) | 0.6600 | 0.3235 | 50.1 | 0.3118 | 0.2840 | 7085 |
|  | Ye | 44.5 | 0.5198 | 0.0098 | | | | |
|  | B | 4.7 (83%) | 0.0537 | 0.7994 | | | | |
| total | | 100.0 | | | 100.0 | | | |

Before the rendering processing is carried out, the chromaticity values and color temperatures of the colors white represented by the subsets S1 and S2 are quite different from each other as can be seen from Table 7 and FIG. 56. However, after the rendering processing (in which the red pixel R of the subset S1 lends 7% of its own luminance to the subset S2 and the blue pixel B of the subset S2 lends 17% of its own luminance to the subset S1 as shown in Table 8) has been carried out, the differences in chromaticity and color temperature between the colors white represented by the subsets S1 and S2 have decreased as can be seen from Table 8 and FIG. 56. In this example, as can be seen from Table 7 and FIG. 55, the luminances of their colors white agree with each other from the beginning between the subsets S1 and S2, and therefore, the luminance of the colors white hardly changes before and after the rendering processing.

FIG. 57 illustrates what subpixels need to be lit to display a vertical white line on a black background using the subsets S2. As can be seen from FIG. 57, not only entire pixels (i.e., both of their first and second subpixels) in each subset S2 on the column C3 but also some subpixels in its associated subset S1 on the column C2 are lit so that the rendering processing for lending a luminance is carried out on a subpixel-by-subpixel basis. FIG. 58 illustrates what subpixels need to be lit to display a vertical white line on a black background using the subsets S1. As can be seen from FIG. 58, not only entire pixels (i.e., both of their first and second subpixels) in each subset S1 on the column C2 but also some subpixels in its associated subset S2 on the column C1 are lit so that the rendering processing for lending a luminance is carried out on a subpixel-by-subpixel basis. As can be seen, by lending and borrowing a luminance on a subpixel-by-subpixel basis in this manner, the white line displayed can look thinner and the display operation can get done more smoothly and with higher definition.

In the example illustrated in FIG. 54, the bright subpixel of each red pixel R that lends a luminance to its associated subset S2 is adjacent to that subset S2, and the bright subpixel of each blue pixel B that lends a luminance to its associated subset S1 is adjacent to that subset S1. However, each of the subsets S1 and S2 may borrow a luminance from a bright subpixel that is not adjacent to itself as shown in FIG. 59. Specifically, in the example illustrated in FIG. 59, the bright subpixel of each red pixel R is not adjacent to its associated subset S2 and that of each blue pixel B is not adjacent to its associated subset S1, either.

FIGS. 60 and 61 illustrate what subpixels will be lit when a luminance is lent and borrowed as shown in FIG. 59. As can be seen from FIG. 60, not only entire pixels (i.e., both of their first and second subpixels) in each subset S2 on the column C3 but also some subpixels in its associated subset S1 on the column C2 are lit, and therefore, the rendering processing for lending a luminance has also been carried out on a subpixel-by-subpixel basis. However, unlike the situation shown in FIG. 57, the lighted subpixels in the subsets S1 are not adjacent to any subset S2. Also, as can be seen from FIG. 61, not only entire pixels (i.e., both of their first and second subpixels) in each subset S1 on the column C2 but also some subpixels in its associated subset S2 on the column C1 are lit, and therefore, the rendering processing for lending a luminance has also been carried out on a subpixel-by-subpixel basis. However, unlike the situation shown in FIG. 58, the lighted subpixels in the subsets S2 are not adjacent to any subset S1.

Even if a luminance is lent and borrowed as shown in FIGS. 60 and 61, the decrease in resolution can still be less significant than a situation where a luminance is lent and borrowed on a pixel-by-pixel basis. Naturally, to enhance the effect of checking the decrease in resolution, it is preferred that every luminance-lending bright subpixel be adjacent to a luminance-borrowing subset as shown in FIGS. 54, 57 and 58.

Embodiment 5

FIG. 62 illustrates an arrangement of pixels for an LCD (multi-primary-color liquid crystal display device) 500 as a fifth specific preferred embodiment of the present invention. Just like the LCD 400 of the fourth preferred embodiment described above, the LCD 500 includes red, green, blue, cyan and yellow pixels R, G, B, C and Ye, and cyan, green, red, blue and yellow pixels C, G, R, B and Ye are cyclically arranged in this order within the same row. In this preferred embodiment, however, a row of pixels is arranged so as to shift by a half pitch from each of two adjacent rows of pixels. That is why the subsets S1 and S2 are arranged alternately not only in the row direction but also in the column direction as well. In other words, the subsets S1 and S2 are arranged so as to form a checkerboard pattern.

FIG. 63 schematically illustrates how to lend and borrow a luminance in this LCD 500. As shown in FIG. 63, each subset S2 borrows a luminance from the bright subpixel of the red pixel R belonging to its associated subset S1. In addition, each subset S1 borrows a luminance from the bright subpixel of the blue pixel B belonging to its associated subset S2.

FIG. 64 illustrates what subpixels need to be lit to display an oblique white line on a black background using the subsets S2. As can be seen from FIG. 64, not only entire pixels (i.e., both of their first and second subpixels) in each subset S2 but also some subpixels in its associated subset S1 are lit so that the rendering processing for lending a luminance is carried out on a subpixel-by-subpixel basis. FIG. 65 illustrates what subpixels need to be lit to display an oblique white line on a black background using the subsets S1. As can be seen from FIG. 65, not only entire pixels (i.e., both of their first and second subpixels) in each subset S1 but also some subpixels in its associated subset S2 are lit so that the rendering processing for lending a luminance is carried out on a subpixel-by-subpixel basis.

In the example illustrated in FIG. 63, a luminance is supposed to be lent and borrowed between two subsets that are adjacent to each other in the row direction. However, a luminance may also be lent and borrowed between two subsets that are adjacent to each other in the column direction as shown in FIG. 66. The subpixels to be lit in a situation where a luminance is lent and borrowed as shown in FIG. 66 are shown in FIGS. 67 and 68. Specifically, FIG. 67 illustrates a situation where an oblique white line is displayed on a black background using the subsets S2, while FIG. 68 illustrates a situation where an oblique white line is displayed on a black background using the subsets S1. As can be seen from FIGS. 67 and 68, not only entire pixels in one type of subset but also some subpixels in the other type of subset are lit so that the rendering processing for lending a luminance is carried out on a subpixel-by-subpixel basis.

Embodiment 6

FIG. 69 illustrates an arrangement of pixels for an LCD (multi-primary-color liquid crystal display device) 600 as a sixth specific preferred embodiment of the present invention. Just like the LCD 100 of the first preferred embodiment described above, the LCD 600 includes first and second red, green, blue, yellow and cyan pixels R1, R2, G, B, Ye and C. In this preferred embodiment, however, the first red, yellow, blue, second red, green and cyan pixels R1, Ye, B, R2, G and C are cyclically arranged in this order within the same row. In addition, according to this preferred embodiment, a row of pixels is arranged so as to shift by a half pitch from each of two adjacent rows of pixels. That is why the subsets S1 and S2 are arranged alternately not only in the row direction but also in the column direction as well. In other words, the subsets S1 and S2 are arranged so as to form a checkerboard pattern.

FIGS. 70 and 71 schematically illustrate how to lend and borrow a luminance in this LCD 600. As shown in FIGS. 70 and 71, each subset S2 borrows a luminance from the respective bright subpixels of the first red and blue pixels R1 and B belonging to its associated subset S1.

FIG. 72 illustrates what subpixels need to be lit to display an oblique white line on a black background using the subsets S2. As can be seen from FIG. 72, not only entire pixels (i.e., both of their first and second subpixels) in each subset S2 but also some subpixels in its associated subset S1 are lit so that the rendering processing for lending a luminance is carried out on a subpixel-by-subpixel basis.

In the example illustrated in FIGS. 70 and 71, a luminance is supposed to be lent and borrowed between two subsets that are adjacent to each other in the column direction. However, a luminance may also be lent and borrowed between two subsets that are adjacent to each other in the row direction as shown in FIGS. 73 and 74. Specifically, in the example illustrated in FIGS. 70 and 71, each subset S2 borrows a luminance from the respective bright subpixels of the first red and blue pixels R1 and B belonging to its adjacent subset S1 in the column direction. On the other hand, in the example illustrated in FIGS. 73 and 74, each subset S2 borrows a luminance from the respective bright subpixels of the first red and blue pixels R1 and B belonging to its adjacent subset S1 in the row direction. The subpixels to be lit in a situation where a luminance is lent and borrowed as shown in FIGS. 73 and 74 are shown in FIG. 75. Specifically, FIG. 75 illustrates a situation where an oblique white line is displayed on a black background using the subsets S2. As can be seen from FIG.

75, not only entire pixels (i.e., both of their first and second subpixels) in one type of subset S2 but also some subpixels in the other type of subset S1 are lit so that the rendering processing for lending a luminance is carried out on a subpixel-by-subpixel basis.

Next, it will be described what driving method is preferably adopted to minimize a "flicker" on the screen. In a typical LCD, the voltage applied to the liquid crystal layer of a pixel is set to be an AC voltage (such a method is sometimes called an "AC driving method") to cope with a reliability problem. That is to say, the applied voltage is defined so that a pixel electrode and a counter electrode invert their potential levels at regular time intervals and that the electric field applied to the liquid crystal layer inverts its direction (i.e., the direction of electric lines of force) at regular time intervals. In a typical LCD in which the counter electrode and pixel electrodes are arranged on two different substrates, the electric field applied to the liquid crystal layer inverts its direction from toward the light source to toward the viewer, and vice versa.

The interval at which the electric field applied to the liquid crystal layer inverts its direction is typically 33.333 ms, which is twice as long as one frame period of 16.667 ms, for example. That is to say, in a liquid crystal display device, every time a picture (i.e., an image frame) is presented, the electric field applied to the liquid crystal layer inverts its direction. For that reason, in presenting a still picture, unless the electric field intensities (or applied voltages) exactly match each other between the two electric field directions (i.e., if the electric field changes its intensity every time it changes its direction), the luminance of each pixel will change with such a variation in electric field intensity, thus producing a flicker on the screen.

In other words, to minimize such a flicker, the electric field intensities (or applied voltages) in those two electric field directions need to exactly match each other. In LCDs to be mass-produced on an industrial basis, however, it is difficult to exactly match the electric field intensities in those two directions. That is why they try to minimize the flicker by arranging pixels that have mutually opposite electric field directions adjacent to each other within a display area because the luminances of the pixels would be spatially averaged in that case. Such a method is generally called either a "dot inversion drive" or a "line inversion drive". It should be noted that these "inversion drive" methods include not just the "one dot inversion" in which the polarities are inverted on a pixel-by-pixel basis in a "checkerboard pattern" so to speak (i.e., every row AND every column) and the "one line inversion" in which the polarities are inverted on a line-by-line basis but also a "two-row, one-column dot inversion" in which the polarities are inverted every other row and every column, and various other patterns. Thus, any of those various methods is appropriately adopted as needed.

In the LCD 600 of this preferred embodiment, six different kinds of pixels are arranged regularly as shown in FIG. 76 in the row direction (i.e., the direction in which a number of source lines are arranged at a predetermined pitch and which is identified by "SL" that means a source line direction in FIG. 76). That is why if the dot inversion drive was adopted, every primary color but the color red would have an electric field applied to the liquid crystal layer in the same direction along the row. In FIG. 76, the directions (or polarities) of the electric field applied to the liquid crystal layer are identified by the positive (+) and negative (−) signs. That is to say, the (+) and (−) directions are two opposite directions in which the electric field is applied to the liquid crystal layer. In the example illustrated in FIG. 76, the polarity of the green and blue pixels G and B is always negative (−) and that of the cyan and yellow pixels C and Ye is always positive (+). For that reason, if a display operation is performed in a single color, the flicker will be seen easily.

On the other hand, if the line inversion drive is performed every other column (i.e., if a two-source-line inversion drive is performed) as shown in FIG. 77, the direction (i.e., polarity) of the electric field will be inverted for every primary color. In the example shown in FIG. 77, each of the green, yellow and blue pixels G, Ye and B invert their polarity from positive (+) into negative (−) from left to right and the cyan pixels C invert their polarity from negative (−) into positive (+) from left to right. Consequently, the flicker can be minimized even if a display operation is performed in a single color.

As can be seen, in a situation where the subsets of the first and second types are arranged alternately in a predetermined direction (which may be either the row direction or the column direction) and pixels are also arranged within each subset in that direction, if the sum of the number of pixels that form the first type of subset and that of pixels that form the second type of subset is an even number (e.g., six in the example shown in FIGS. 76 and 77), the electric field will be applied in the same direction to the liquid crystal layer for each primary color and a flicker will be produced easily when a display operation is conducted in a single color. That is why the direction of the electric field applied to the liquid crystal layer of each pixel is preferably inverted every other pixel in the direction in which the two different types of subsets are arranged. Then, the direction of the electric field applied to the liquid crystal layer can be inverted for every primary color and the flicker can be minimized.

In the example illustrated in FIG. 77, the bright subpixels are not arranged in a checkerboard pattern, and the bright subpixels change their positions within pixels every other column in the row direction. That is to say, the correlation between the luminance ranking of subpixels and the arrangement of subpixels in the column direction changes every two columns in the row direction. Naturally, even if the inversion drive is performed as shown in FIG. 77, the bright subpixels may also be arranged in a checkerboard pattern. However, in a situation where a configuration in which a storage capacitor is provided for each of multiple subpixels and a different effective voltage is applied to each subpixel by capacitance division is adopted as shown in FIG. 4 and where the two-source-line inversion drive is adopted, the bright subpixels preferably change their positions within pixels every other column in the row direction as shown in FIG. 77. This is because such an arrangement is easier to realize.

FIGS. 78 and 79 illustrate how a luminance is lent and borrowed in the arrangement shown in FIG. 77. As shown in FIGS. 78 and 79, each subset S2 borrows a luminance from the bright subpixels of first red and blue pixels R1 and B belonging to its associated subset S1.

FIG. 80 illustrates what subpixels need to be lit to display an oblique white line on a black background using the subsets S2. As can be seen from FIG. 80, not only entire pixels (i.e., both of their first and second subpixels) in each subset S2 but also some subpixels in its associated subset S1 are lit so that the rendering processing for lending a luminance is carried out on a subpixel-by-subpixel basis.

As described above for the first through sixth preferred embodiments of the present invention, the multi-primary-color liquid crystal display device of the present invention performs rendering processing for lending and borrowing a luminance on a subpixel-by-subpixel basis, thereby getting a display operation done with higher definition with the decrease in resolution minimized. It should be noted that the number of primary colors to be used by the multi-primarycolor liquid crystal display device of the present invention for display purposes, the number and kinds of pixels included in each subset, and the specific arrangements of respective subsets and pixels are never limited to the ones that have already been described as examples for the first through sixth preferred embodiments of the present invention.

INDUSTRIAL APPLICABILITY

The multi-primary-color liquid crystal display device of the present invention can get a display operation done far more smoothly and with much higher definition than a conventional device. The present invention is broadly applicable to any multi-primary-color liquid crystal display device in general that conducts a display operation in four or more primary colors.

The invention claimed is:

1. A multi-primary-color liquid crystal display device that performs a display operation in at least four primary colors, the device comprising:
a plurality of pixels that are different colors and are included in at least two different types of subsets of pixels, each of the at least two different types of subsets of pixels includes at least two different color pixels of the plurality of pixels; wherein
the multi-primary-color liquid crystal display device is arranged to perform rendering processing in which at least one of the plurality of pixels that defines a first one of the at least two different types of subsets of pixels lends a luminance to a second one of the at least two different types of subsets of pixels,
each and every one of the plurality of pixels includes a first subpixel and a second subpixel that have a same color as the one of the plurality of pixels containing the first subpixel and the second subpixel, the first subpixel having a higher luminance and the second subpixel having a lower luminance, and
the second one of the at least two different types of subsets of pixels borrows a luminance from the first subpixel of at least one pixel of the first one of the at least two different types of subsets of pixels.

2. The multi-primary-color liquid crystal display device of claim 1, wherein the subpixel that has the higher luminance in the at least one pixel of the first one of the at least two different types of subsets of pixels which lends the luminance to the second one of the at least two different types of subsets of pixels is adjacent to the second one of the at least two different types of subsets of pixels.

3. The multi-primary-color liquid crystal display device of claim 2, wherein in dividing each of the plurality of pixels into the first and second subpixels, a pattern applied to a pixel of the plurality of pixels representing a particular primary color is different from a pattern applied to another pixel of the plurality of pixels.

4. The multi-primary-color liquid crystal display device of claim 3, wherein the pixel of the plurality of pixels representing the particular primary color includes a subpixel that lends a luminance to the second one of the at least two different types of subset of pixels.

5. The multi-primary-color liquid crystal display device of claim 2, wherein the first and second subpixels have mutually different shapes, and
wherein a correlation between a luminance ranking of the first and second subpixels and shapes of the first and second subpixels in the pixel of the plurality of pixels representing the particular primary color is different from another pixel of the plurality of pixels.

6. The multi-primary-color liquid crystal display device of claim 5, wherein the pixel of the plurality of pixels representing the particular primary color includes the subpixel that lends the luminance to the second one of at least two different types of subsets of pixels.

7. The multi-primary-color liquid crystal display device of claim 1, wherein a plurality of the first one of the at least two different types of subsets of pixels and a plurality of the second one of the at least two different types of subsets of pixels are arranged in matrix.

8. The multi-primary-color liquid crystal display device of claim 7, wherein the first one of the at least two different types of subsets of pixels and the second one of the at least two different types of subsets of pixels are arranged alternately in a predetermined direction, and
wherein an arbitrary one of the pixels of the second one of the at least two different types of subsets of pixels borrows a luminance from one of the first one of the at least two different types of subsets of pixels that is adjacent on first and second sides thereof, respectively, in the predetermined direction.

9. The multi-primary-color liquid crystal display device of claim 7, wherein the first one of the at least two different types of subsets of pixels and the second one of the at least two different types of subsets of pixels are arranged alternately in a predetermined direction, and
wherein an arbitrary one of the pixels of the second one of the at least two different types of subsets of pixels borrows a luminance from two of the plurality of the first one of the at least two different types of subsets of the pixels that are adjacent on first and second sides thereof, respectively, in the predetermined direction.

10. The multi-primary-color liquid crystal display device of claim 7, wherein each of the plurality of pixels includes a liquid crystal layer and a plurality of electrodes arranged to apply an electric field to the liquid crystal layer, and
wherein the first one of the at least two different types of subsets of pixels and the second one of the at least two different types of subsets of pixels are alternately arranged in a predetermined direction, and
wherein the pixels included in each of the plurality of the first one of the at least two different types pixels and the pixels included in each of the plurality of the second one of the at least two different types of subsets and pixels are also arranged in the predetermined direction within their subset, and
wherein a sum of a number of pixels included in each of the plurality of the first one of the at least two different types of subsets of pixels and that of pixels included in each of the plurality of the second one of the at least two different types of subsets of pixels is an even number, and
wherein a direction of an electric field applied to the liquid crystal layer of each said pixel of the plurality of pixels is inverts every two pixels in the predetermined direction.

11. The multi-primary-color liquid crystal display device of claim 1, wherein the at least four primary colors include red, green and blue.

12. The multi-primary-color liquid crystal display device of claim 11, wherein the at least four primary colors further include yellow and cyan.

13. The multi-primary-color liquid crystal display device of claim 12, wherein one of the first and second ones of the at least two different types of subsets of pixels includes a first red pixel representing the color red, a blue pixel representing the color blue, and a yellow pixel representing the color yellow, while the other type of subset includes a second red pixel representing the color red, a green pixel representing the color green, and a cyan pixel representing the color cyan.

14. The multi-primary-color liquid crystal display device of claim 12, wherein one of the first and second ones of the at least two different types of subsets of pixels includes a red pixel representing the color red, a green pixel representing the color green, and a cyan pixel representing the color cyan, while the other type of subset includes a blue pixel representing the color blue and a yellow pixel representing the color yellow.

15. The multi-primary-color liquid crystal display device of claim 12, wherein the at least four primary colors further include magenta.

16. The multi-primary-color liquid crystal display device of claim 15, wherein one of the first and second ones of the at least two different types of subsets of pixels includes a red pixel representing the color red, a green pixel representing the color green, and a blue pixel representing the color blue, while the other type of subset includes a cyan pixel representing the color cyan, a magenta pixel representing the color magenta, and a yellow pixel representing the color yellow.

17. The multi-primary-color liquid crystal display device of claim 1, wherein the rendering processing is carried out so that a difference in luminance, chromaticity and/or color temperature between respective white colors represented by the first and second ones of the at least two different types of subsets of pixels decreases compared to a situation where the rendering processing is not carried out.

* * * * *